United States Patent
Nakamura

(10) Patent No.: US 8,762,927 B2
(45) Date of Patent: Jun. 24, 2014

(54) PROCESSING METHOD OF ELECTRIC INFORMATION IN CAD SYSTEM, PROCESSING DEVICE OF ELECTRIC INFORMATION IN CAD SYSTEM, PROGRAM AND COMPUTER-READABLE STORAGE MEDIUM

(75) Inventor: Satoshi Nakamura, Kanagawa (JP)

(73) Assignee: Zuken Inc., Yokohama-shi, Kanagawa (JP)

( * ) Notice: Subject to any disclaimer, the term of this patent is extended or adjusted under 35 U.S.C. 154(b) by 854 days.

(21) Appl. No.: 12/440,685

(22) PCT Filed: Oct. 10, 2007

(86) PCT No.: PCT/JP2007/069775
§ 371 (c)(1),
(2), (4) Date: Apr. 15, 2009

(87) PCT Pub. No.: WO2008/047650
PCT Pub. Date: Apr. 24, 2008

(65) Prior Publication Data
US 2010/0005438 A1    Jan. 7, 2010

(30) Foreign Application Priority Data
Oct. 11, 2006    (JP) ................ 2006-278014

(51) Int. Cl.
*G06F 17/50*    (2006.01)
*G06F 9/455*    (2006.01)

(52) U.S. Cl.
USPC ........... 716/137; 716/104; 716/106; 716/110; 716/111; 716/119; 716/122; 716/125; 716/136; 716/138; 716/139

(58) Field of Classification Search
USPC ......... 716/104, 106, 110, 111, 119, 122, 125, 716/136, 137, 138, 139
See application file for complete search history.

(56) References Cited

U.S. PATENT DOCUMENTS

| | | | | |
|---|---|---|---|---|
| 5,745,371 A | * | 4/1998 | Shouen .................... | 716/102 |
| 6,173,433 B1 | * | 1/2001 | Katoh et al. .............. | 716/122 |
| 6,304,790 B1 | * | 10/2001 | Nakamura et al. ........ | 700/97 |
| 6,480,846 B2 | * | 11/2002 | Kuribayashi et al. ..... | 707/737 |
| 6,584,608 B1 | * | 6/2003 | Kumada et al. .......... | 716/129 |
| 6,691,301 B2 | * | 2/2004 | Bowen .................... | 717/114 |
| 6,875,920 B2 | * | 4/2005 | Nakamura et al. ........ | 174/549 |
| 6,915,249 B1 | * | 7/2005 | Sato et al. ............... | 703/14 |
| 7,024,419 B1 | * | 4/2006 | Klenk et al. ........ | 707/999.102 |
| 7,072,825 B2 | * | 7/2006 | Wang et al. .............. | 703/28 |

(Continued)

FOREIGN PATENT DOCUMENTS

| JP | 04-127274 | 4/1992 |
|---|---|---|
| JP | 8-166985 A | 6/1996 |

(Continued)

*Primary Examiner* — Helen Rossoshek
(74) *Attorney, Agent, or Firm* — Muncy, Geissler, Olds & Lowe, P.C.

(57) ABSTRACT

Designing operation efficiency is improved by automatically transmitting and receiving circuit-related information and layout-related information required for designing each printed board between printed boards, for designing a plurality of printed boards at the same time. In an electric information processing method in a CAD system, the printed boards are designed at the same time by transmitting and receiving the circuit design information relating to the printed boards and the layout design information relating to the printed boards between the circuits and layouts relating to the printed boards.

6 Claims, 54 Drawing Sheets

(56) References Cited

U.S. PATENT DOCUMENTS

| | | | |
|---|---|---|---|
| 7,089,530 B1 * | 8/2006 | Dardinski et al. | 717/105 |
| 7,114,132 B2 * | 9/2006 | Yaguchi | 716/115 |
| 7,142,939 B2 * | 11/2006 | Nonaka et al. | 700/121 |
| 7,246,045 B1 * | 7/2007 | Rappaport et al. | 703/2 |
| 7,340,693 B2 * | 3/2008 | Martin et al. | 716/102 |
| 7,386,833 B2 * | 6/2008 | Granny et al. | 717/109 |
| 7,409,666 B2 * | 8/2008 | Almeida et al. | 716/137 |
| 7,441,221 B2 * | 10/2008 | Kawamichi et al. | 716/137 |
| 7,454,732 B2 * | 11/2008 | McElvain et al. | 716/125 |
| 7,526,741 B2 * | 4/2009 | Lee et al. | 716/106 |
| 7,546,232 B2 * | 6/2009 | Brooks et al. | 702/183 |
| 7,546,571 B2 * | 6/2009 | Mankin et al. | 716/137 |
| 7,581,197 B2 * | 8/2009 | Arunachalam | 716/119 |
| 7,613,599 B2 * | 11/2009 | Bade et al. | 703/14 |
| 7,627,838 B2 * | 12/2009 | Keswick | 716/132 |
| 7,805,690 B2 * | 9/2010 | Willis | 716/103 |
| 7,890,927 B2 * | 2/2011 | Eldridge et al. | 717/110 |
| 7,930,662 B1 * | 4/2011 | Sundararajan et al. | 716/104 |
| 7,970,596 B2 * | 6/2011 | Bade et al. | 703/13 |
| 8,185,849 B2 * | 5/2012 | Nakamura | 716/103 |
| 8,438,524 B1 * | 5/2013 | Kohli et al. | 716/120 |
| 8,525,849 B2 * | 9/2013 | Nakamura et al. | 345/619 |
| 2003/0033588 A1 * | 2/2003 | Alexander | 717/107 |
| 2003/0105620 A1 * | 6/2003 | Bowen | 703/22 |
| 2004/0044970 A1 * | 3/2004 | Anderson et al. | 716/1 |
| 2004/0111248 A1 * | 6/2004 | Granny et al. | 703/22 |
| 2004/0128638 A1 | 7/2004 | Kerzman et al. | |
| 2004/0153301 A1 * | 8/2004 | Isaacs et al. | 703/14 |
| 2004/0153868 A1 * | 8/2004 | Nonaka et al. | 714/47 |
| 2005/0080502 A1 * | 4/2005 | Chernyak et al. | 700/97 |
| 2005/0091626 A1 | 4/2005 | Okano et al. | |
| 2006/0101368 A1 * | 5/2006 | Kesarwani et al. | 716/11 |
| 2006/0136786 A1 * | 6/2006 | Nonaka et al. | 714/39 |
| 2007/0246250 A1 * | 10/2007 | Tomita et al. | 174/258 |
| 2009/0326874 A1 * | 12/2009 | Nakamura et al. | 703/1 |
| 2010/0180248 A1 * | 7/2010 | Nakamura | 716/11 |

FOREIGN PATENT DOCUMENTS

| | | |
|---|---|---|
| JP | 09-288690 | 11/1997 |
| JP | 11-184908 | 7/1999 |
| JP | 2006-252285 | 9/2006 |
| JP | 2006-252303 A | 9/2006 |

\* cited by examiner

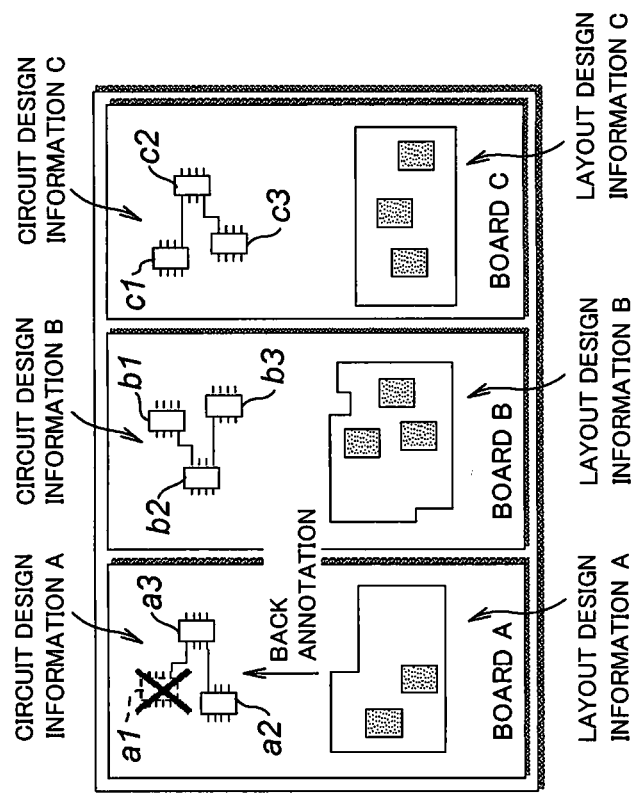

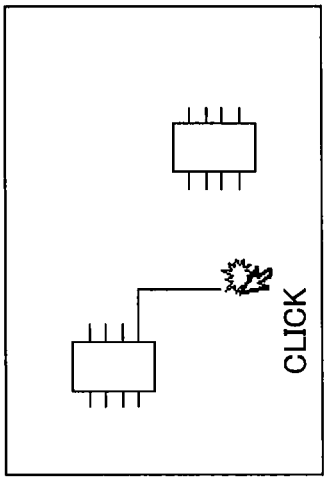
FIG. 8(a)
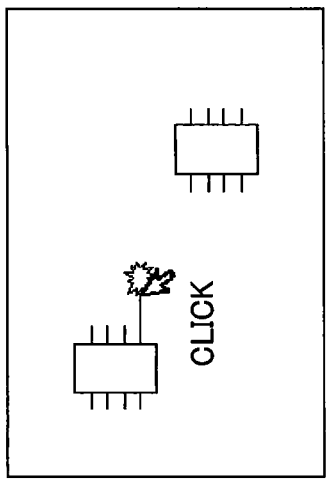
FIG. 8(b)
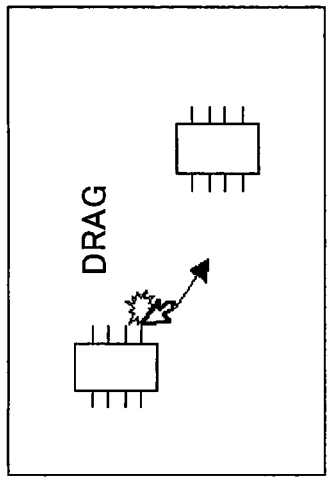
FIG. 8(c)
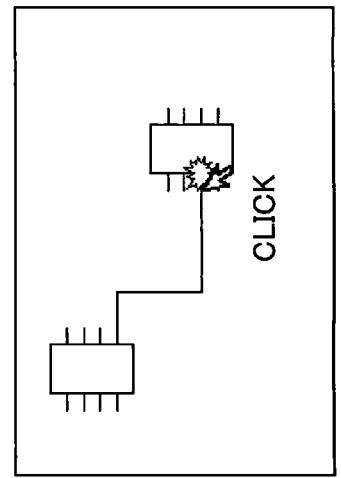
FIG. 8(d)
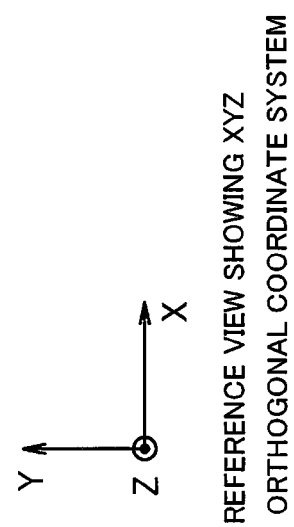
REFERENCE VIEW SHOWING XYZ ORTHOGONAL COORDINATE SYSTEM

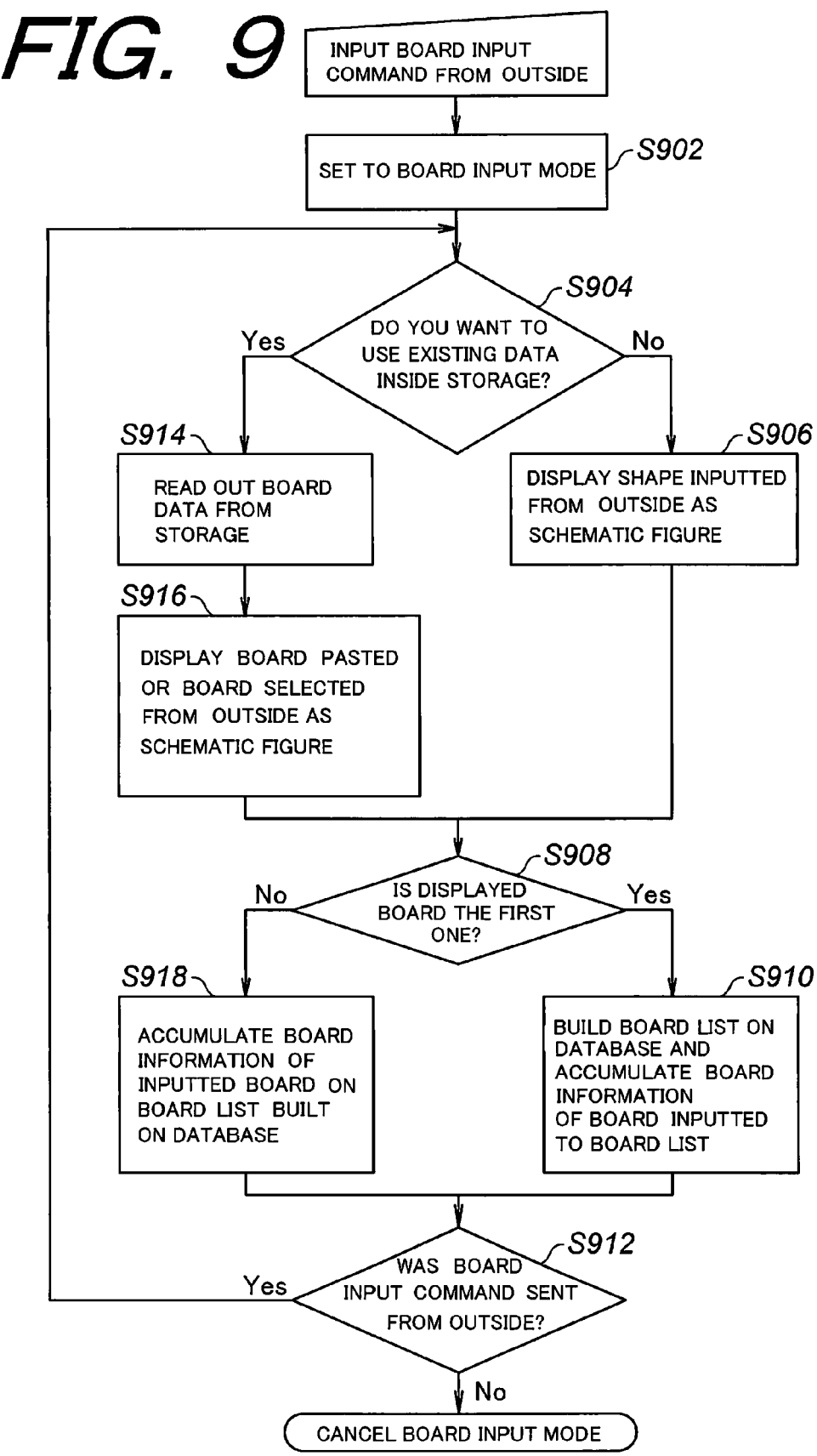

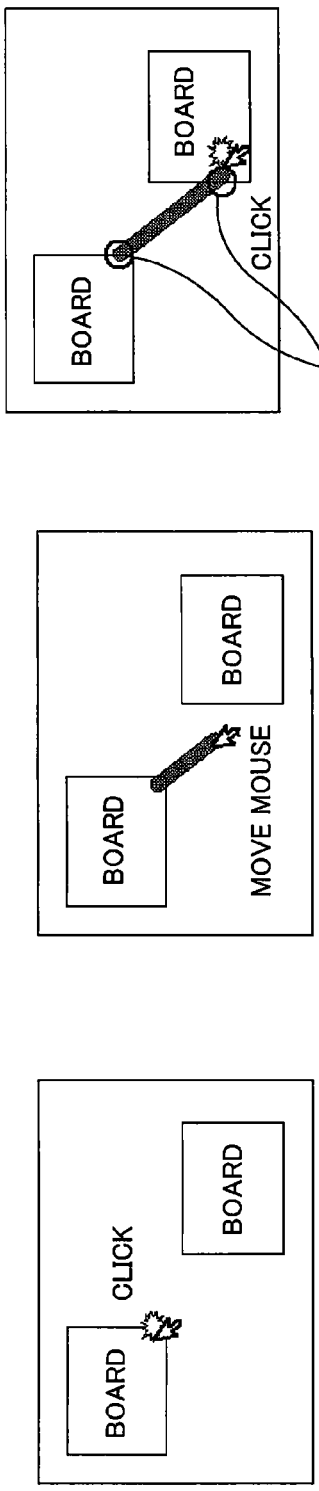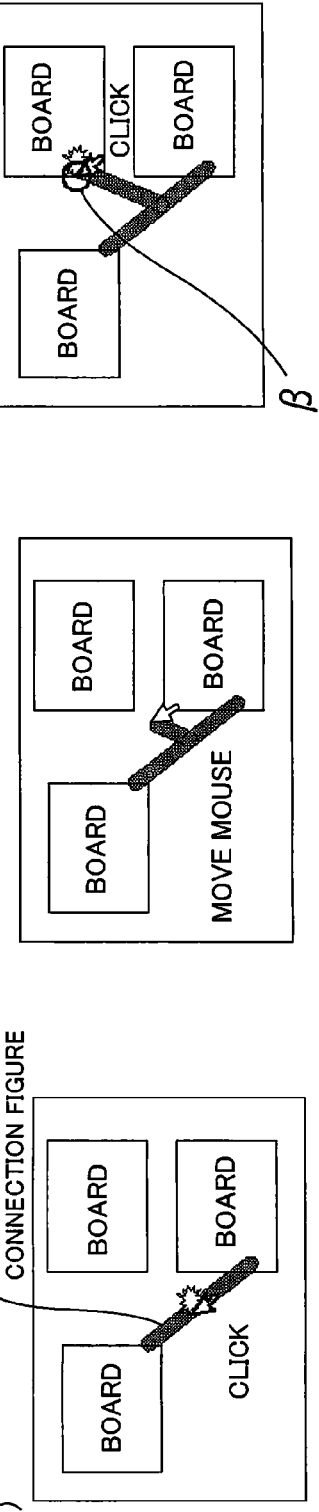

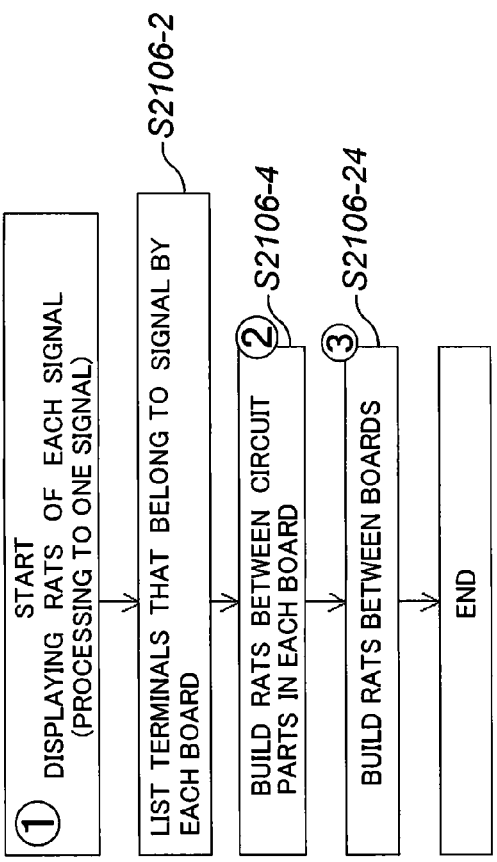
FIG. 23(a)
FIG. 23(b)
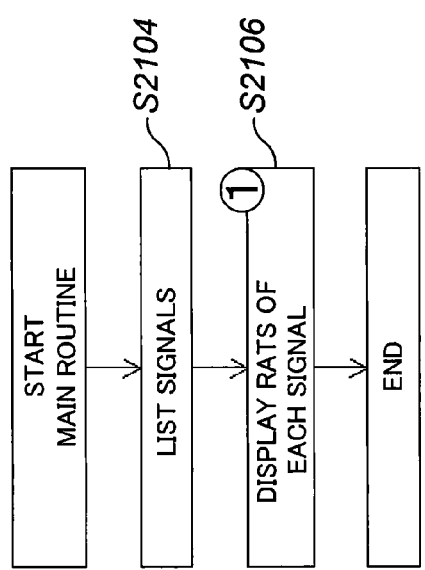
FIG. 23(c)
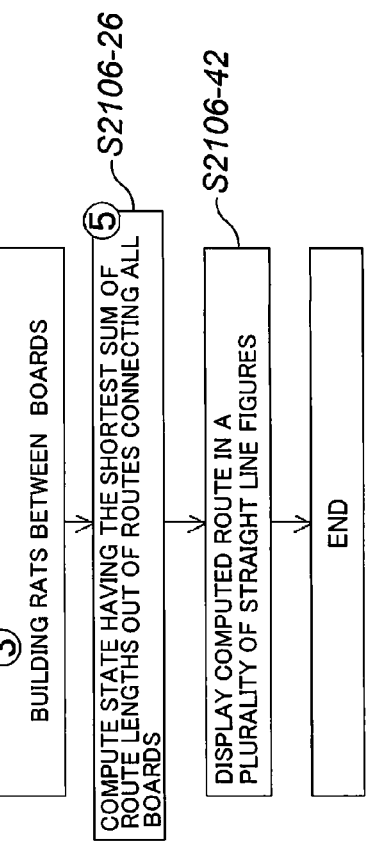
FIG. 23(d)
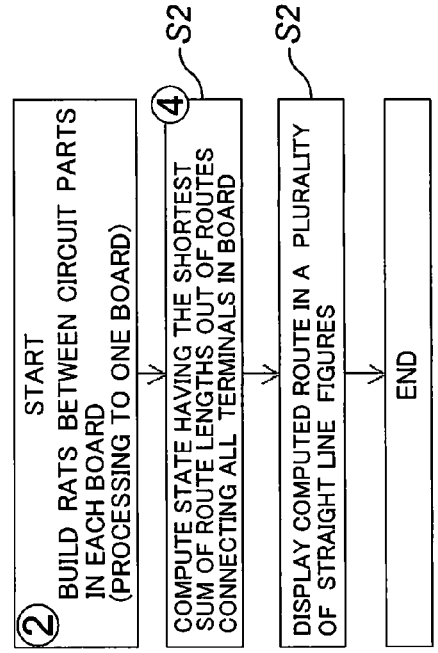

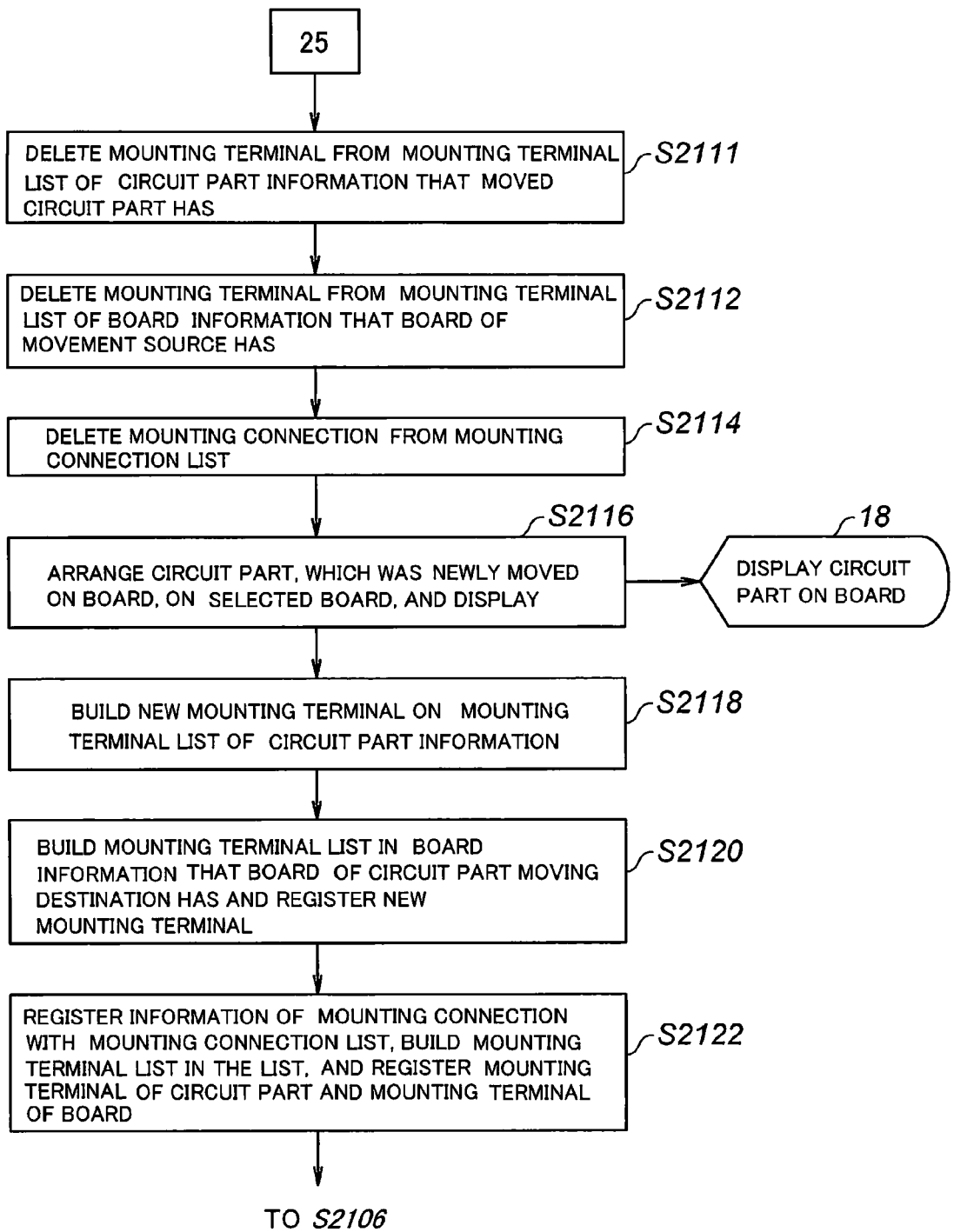

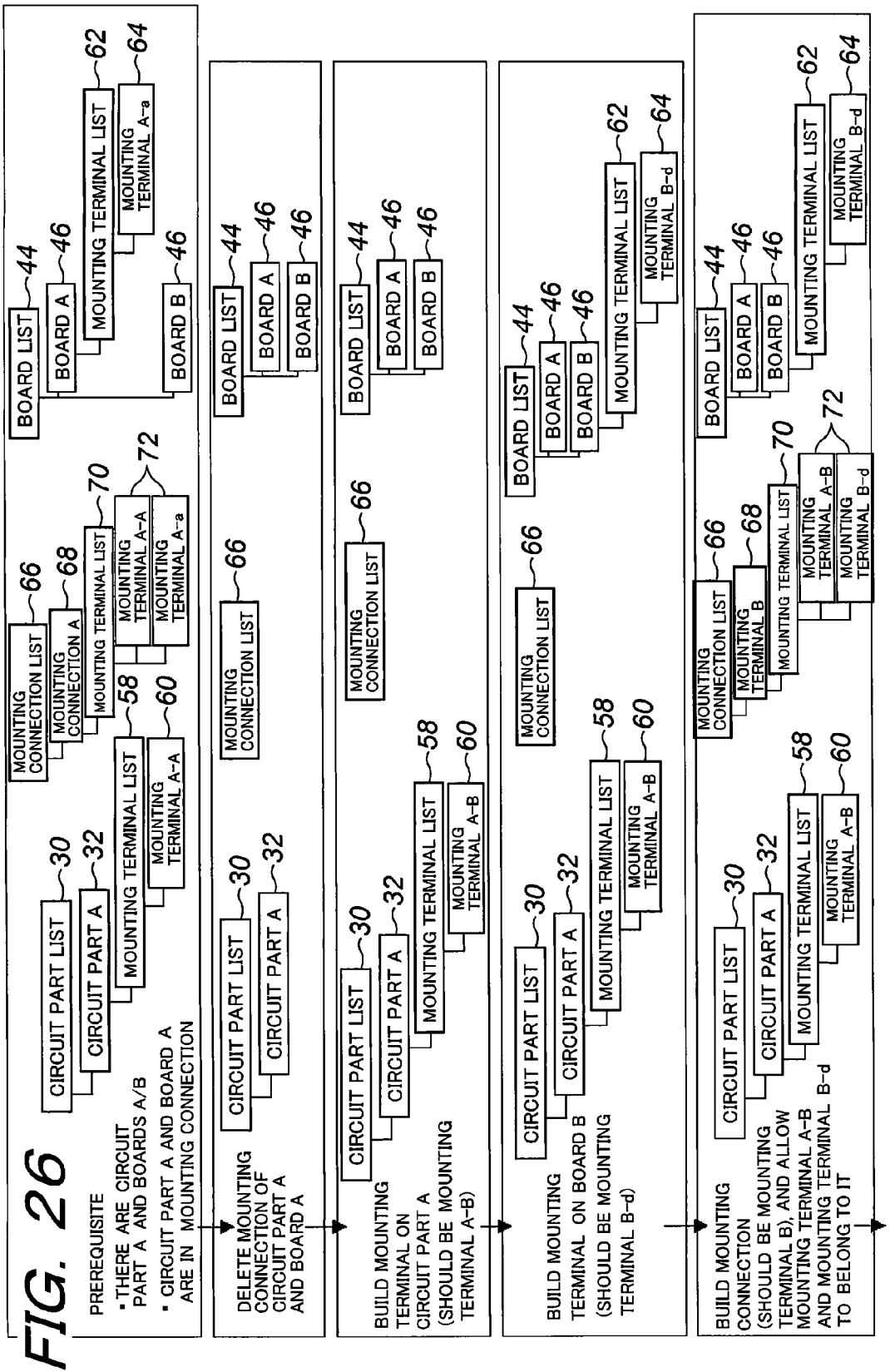

FIG. 30(a)
EXAMPLE OF BOARD (PRIOR ART)

BOARD A — DATABASE MODEL A — INFORMATION OF BOARD A
BOARD B — DATABASE MODEL B — INFORMATION OF BOARD B
BOARD C — DATABASE MODEL C — INFORMATION OF BOARD C

FIG. 30(b)
EXAMPLE OF BOARD (PRESENT INVENTION)

BOARD A, BOARD B, BOARD C — DATABASE MODEL D — INFORMATION OF BOARD A, BOARD B AND BOARD C

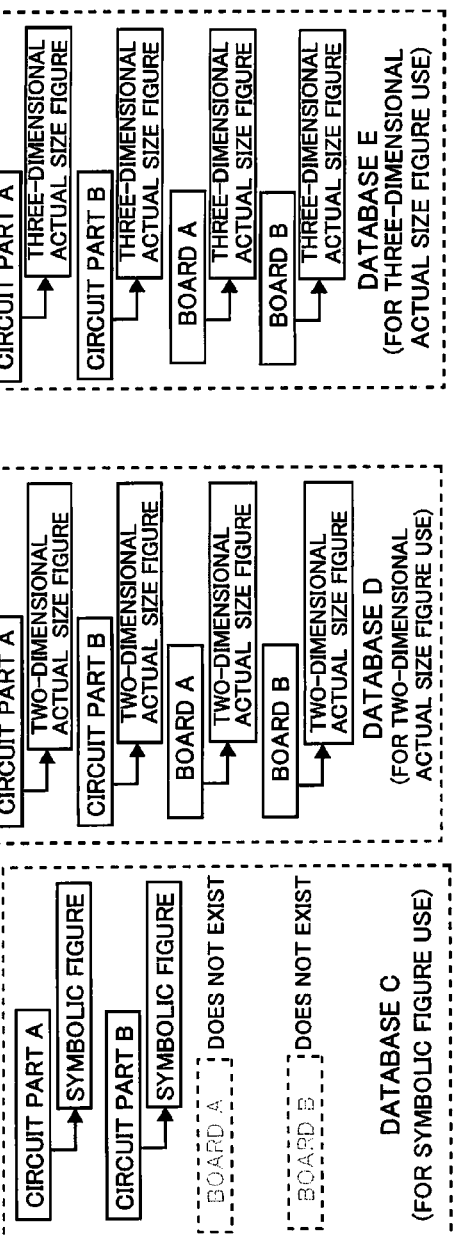
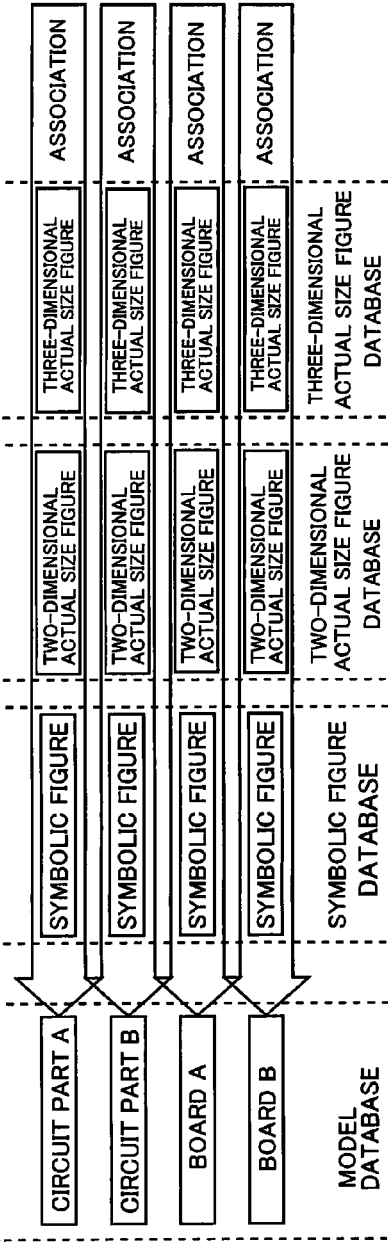
FIG. 31(a) PRIOR ART
FIG. 31(b) PRESENT INVENTION

FIG. 32 (a) EXAMPLE

| ELEMENT BLOCK | ELECTRIC TERMINAL | ELECTRIC CONNECTION INFORMATION | MOUNTING TERMINAL | MOUNTING CONNECTION INFORMATION |
|---|---|---|---|---|
| CIRCUIT PART | CIRCUIT PART TERMINAL | INTER-CIRCUIT-PART CONNECTION | MOUNTING TERMINAL (CIRCUIT PART TO BOARD) | MOUNTING CONNECTION (CIRCUIT PART TO BOARD) |
| BOARD | BOARD TERMINAL | INTER-BOARD CONNECTION | | |
| INTERCONNECT | | | | |

FIG. 32 (b) MODIFIED EXAMPLE 1 (SEMICONDUCTOR SYSTEM)

| SEMICONDUCTOR CHIP | SEMICONDUCTOR CHIP TERMINAL | CONNECTION BETWEEN SEMICONDUCTOR CHIPS | MOUNTING TERMINAL (CHIP TO PACKAGE BOARD) | MOUNTING CONNECTION (CHIP TO PACKAGE BOARD) |
|---|---|---|---|---|
| PACKAGE BOARD | PACKAGE BOARD TERMINAL | CONNECTION BETWEEN PACKAGE BOARDS | | |
| BUS | | | | |

FIG. 32 (c) MODIFIED EXAMPLE 2 (AUTOMOBILE)

| BOARD/ MODULE PART | BOARD/MODULE PART TERMINAL | CONNECTION BETWEEN BOARD/MODULE PART | MOUNTING TERMINAL (BOARD/MODULE PART TO ENCLOSURE PART) | MOUNTING CONNECTION (BOARD/MODULE PART TO ENCLOSURE PART) |
|---|---|---|---|---|
| ENCLOSURE PART | | | ENCLOSURE PART TERMINAL | INTER-ENCLOSURE-PART CONNECTION |
| OUTER/ INTERCONNECT | | | | |

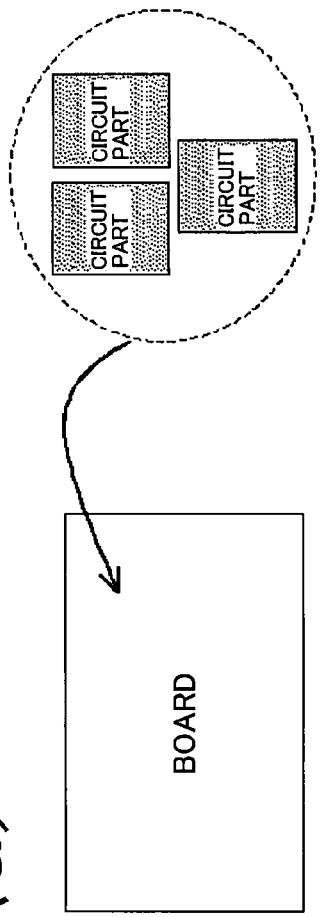
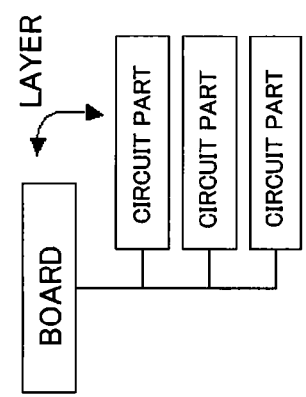
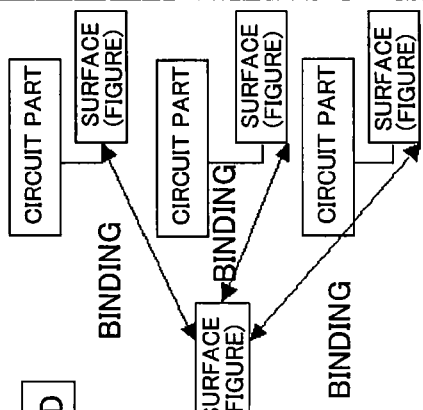
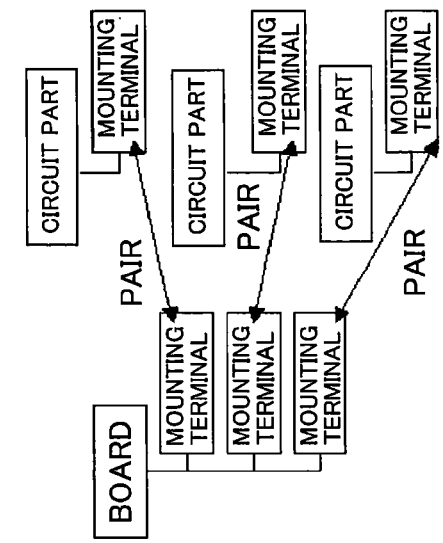

PROCESSING METHOD OF ELECTRIC INFORMATION IN CAD SYSTEM, PROCESSING DEVICE OF ELECTRIC INFORMATION IN CAD SYSTEM, PROGRAM AND COMPUTER-READABLE STORAGE MEDIUM

TECHNICAL FIELD

The present invention relates to a processing method, a processing equipment, a program and a computer-readable storage medium, more particularly, the invention relates to a processing method of electric information in a CAD (Computer Aided Design) system, a processing equipment, a program and a computer-readable storage medium.

BACKGROUND ART

Conventionally, design of printed circuit boards has been performed by using a printed circuit board designing equipment being a CAD system that is a designing equipment supported by a computer.

Meanwhile, in designing a printed circuit board, it is necessary to take a function realized by the printed circuit board, circuit parts that need to be mounted on a board in order to realize the function, and the size of an enclosure arranging the printed circuit board thereon in consideration, consider the layout of the printed circuit board such that circuit parts can be installed in the enclosure having an actually decided size, and perform circuit design and layout design.

According to conventional printed circuit board designing equipments, it was possible to simultaneously perform circuit design and layout design regarding a single printed circuit board. More specifically, in the conventional printed circuit board designing equipment, design environment where circuit design and layout design are simultaneously performed only in a single printed circuit board was provided, circuit design and layout design could not be simultaneously performed for a plurality of printed circuit boards.

For this reason, in the case of simultaneously performing the design of a plurality of printed circuit boards, as information necessary in design processing of each printed circuit board, design information being theoretical information that constitutes circuits relating to a plurality of printed circuit boards (circuit design information to be described later, for example) and design information being physical information that constitutes layouts relating to the above-described plurality of printed circuit boards (layout design information to be described later, for example) need to be appropriately sent and received between each printed circuit board, such sending and receiving of design information has to be performed by designers themselves taking many procedures, and there was a problem that work efficiency of design work deteriorated drastically.

For example, in the case of parallelly designing three printed circuit boards of a board A, a board B and a board C, design of each printed circuit board is performed while appropriately referring to circuit design information A for designing connection of circuit parts installed on the board A, circuit design information B for designing connection of circuit parts installed on the board B and circuit design information C for designing connection of circuit parts installed on the board C, layout design information A for designing the arrangement of circuit parts on the board A, layout design information B for designing the arrangement of circuit parts on the board B and layout design information C for designing the arrangement of circuit parts on the board C.

Herein, FIGS. 1(a)(b)(c)(d) show conceptual explanatory views of the board A, the board B and the board C on a design stage. In the initial state shown in FIG. 1(a), three circuit parts (a1, a2, a3) reflecting the circuit design information A exist on the board A, and these circuit parts (a1, a2, a3) severally have four terminals on both sides, that is, eight in total. Further, one terminal of the circuit part a1 is connected with one terminal of the circuit part a2 and one terminal of the circuit part a2 is connected with one terminal of the circuit part a3 reflecting the circuit design information A. Then, the circuit parts (a1, a2, a3) are severally arranged on the board A reflecting the layout design information A.

Similarly, three circuit parts (b1, b2, b3) each having eight terminals reflecting the circuit design information B exist on the board B. Further, one terminal of the circuit part b1 is connected with one terminal of the circuit part b2 and one terminal of the circuit part b2 is connected with one terminal of the circuit part b3 reflecting the circuit design information B. Then, the circuit parts (b1, b2, b3) are severally arranged on the board B reflecting the layout design information B.

Furthermore, three circuit parts (c1, c2, c3) each having eight terminals reflecting the circuit design information C exist on the board C. Further, one terminal of the circuit part c1 is connected with one terminal of the circuit part c2 and one terminal of the circuit part c2 is connected with one terminal of the circuit part c3 reflecting the circuit design information C. Then, the circuit parts (c1, c2, c3) are severally arranged on the board C reflecting the layout design information C.

Herein, description will be made for sending and receiving of the circuit design information and the layout design information between each printed circuit board, which are generated in the case of moving the circuit part a1 being one of the circuit parts of the board A from the board A to the board C, and connecting the terminals of the circuit part a1 with the terminals of the circuit part c3 from the initial state shown in FIG. 1(a).

More specifically, from the initial state shown in FIG. 1(a) showing the state where the circuit design information and the layout design information before moving the circuit part is moved are reflected, a designer performs processing of deleting the information of the circuit part a1 from the layout design information A on the board A to change the layout of the board A from a printed circuit board equipped with three circuit parts to a printed circuit board equipped with two circuit parts (refer to FIG. 1(b)).

With this change, in the layout design information A, only the circuit part a2 and the circuit part a3 exist on the board A. On the other hand, three circuit parts being the circuit parts (a1, a2 and a3) exist in the circuit part information A at this point.

Then, a back annotation processing for reflecting the change of the layout design information A on the circuit design information A is performed, and the information of the circuit part a1 is deleted from the circuit design information A (refer to FIG. 1(c)).

FIG. 1(d) shows the state where the information of the circuit part a1 was deleted from the layout design information A on the board A, and the information of the circuit part a1 was deleted from the circuit design information A by the back annotation processing.

Next, referring to FIGS. 2(a)(b)(c), description will be made for the procedure of adding the information of the circuit part a1, which was deleted from the board A, to the board C to the circuit part information and the layout design information that are in the state shown in FIG. 1(d).

Firstly, the designer performs a processing in which the information of the circuit part a1 is taken out from the circuit part information A and the information of the circuit part a1 taken out from the circuit part information A is added to the circuit design information C of the board C (refer to FIG. 2(a)).

Next, the designer performs a processing of adding the information of the circuit design information C so as to connect a terminal of the circuit part c3 of the board C with the a terminal of the circuit part a1, as shown in FIG. 2(b).

By the processing above, the information of the circuit part a1 is newly added to the circuit design information C of the board C and information that the circuit part c3 is connected with the circuit part a1 is added, and the circuit design information C is updated.

Then, a forward annotation processing in which the updated circuit design information C of the board C is reflected on the layout design information C is performed, and the arrangement of the circuit part a1 is added to the layout design information C (refer to FIG. 2(c)).

As described above, in Prior Art, the layout design information and the circuit design information of each printed circuit board independently exist and are not coordinated to each other, so that each information cannot be automatically exchanged with another printed circuit board beyond each printed circuit board, so the designer needed to perform the sending and receiving processing of information between each printed circuit board by taking many procedures, and work efficiency of design work was deteriorated.

Further, in many cases, in designing a plurality of printed circuit boards, designers are different in each printed circuit board and the designers are separated in each printed circuit board, so that there was a problem that a lot of time was spent in information communication between each designer just to move one circuit part from a printed circuit board to another printed circuit board.

It is to be noted that prior art that the present applicant knows at the point of filing a patent is as described above and not an invention according to document publicly known invention, so there is no prior art information to be described.

DISCLOSURE OF THE INVENTION

Problem to be Solved by the Invention

The present invention has been created in view of the various problems that the Prior Art has, and it is an object of the invention to provide a processing method, a processing equipment, a program and a computer-readable storage medium in which, in simultaneously performing design of a plurality of printed circuit boards, automatic sending and receiving of circuit-related information and layout-related information design processing of each printed circuit board necessary between each printed circuit board are enabled, and work efficiency of design work is improved.

Further, it is another object of the present invention to provide a processing method, a processing equipment, a program and a computer-readable storage medium, in which efficiency of information communication across printed circuit boards in designing a plurality of printed circuit boards is improved.

Further, it is another object of the present invention to provide a processing method, a processing equipment, a program and a computer-readable storage medium, in which editing between printed circuit boards can be easily performed.

Means for Solving the Problems

To achieve the above-described objects, the present invention is that design of a plurality of printed circuit boards can be performed simultaneously by performing designing while design information relating to the circuit and the layout of a plurality of printed circuit boards are exchanged between the circuits and layouts of the plurality of printed circuit boards.

According to the present invention, a plurality of printed circuit boards can be simultaneously designed, and work efficiency can be improved.

Further, according to the invention, since printed circuit boards can be designed while a state closer to a product is imaged, accuracy of the constitution of mounting objects increases, rework in detail design is eliminated, and it becomes possible to shorten lead time of product design.

More specifically, the processing method according to the present invention is a processing method of electric information in a CAD system, design of the above-described plurality of printed circuit boards is performed in parallel by sending and receiving design information of circuits relating to the above-described plurality of printed circuit boards and design information of layouts relating to the above-described plurality of printed circuit boards between the circuits and the layouts relating to a plurality of printed circuit boards.

Further, the processing method according to the present invention has: the first displaying step of displaying theoretical information that constitutes circuits relating to a plurality of printed circuit boards; the second displaying step of displaying physical information that constitutes layouts relating to the above-described plurality of printed circuit boards; an arranging operation detecting step of performing detection of an arranging operation of the above-described theoretical information to predetermined board display information out of a plurality of board display information being the physical information according to the above-described plurality of printed circuit boards; and a display controlling step of performing control of displaying physical information corresponding to the above-described theoretical information on the above-described predetermined board display information when the detection of an arranging operation is performed by the above-described arranging operation detecting step.

Further, the processing method according to the present invention has a deleting operation detecting step of performing detection of an operation of deleting a part or all of the physical information of the above-described plurality of board display information.

Further, the processing method according to the present invention has a re-arranging operation detecting step of performing detection of an operation to re-arrange physical information displayed on the first board display information out of the above-described plurality of board display information on the second board display information different from the above-described first board display information.

Further, the processing method according to the present invention has changing step of changing the size of a particular board display information based on occupancy area of physical information that is displayed on the above-described particular board display information out of the above-described plurality of board display information.

Further, the processing method according to the present invention has: a displaying step of displaying physical information that constitutes layouts relating to a plurality of printed circuit boards; a connecting operation detecting step of performing detection of an operation to connect between arbitrary board display information out of a plurality of board display information being the physical information according to the above-described plurality of printed circuit boards; and a display controlling step of performing control of displaying inter-board connection display information being the physical information connecting between the above-described arbitrary board display information on the above-described displaying step when the detection of a connecting operation is performed by the above-described connecting operation detecting step.

Further, the processing method according to the present invention has: the first displaying step of displaying theoretical information that constitutes circuits relating to a plurality of printed circuit boards; the second displaying step of displaying physical information that constitutes layouts relating to the above-described plurality of printed circuit boards; an arranging operation detecting step of performing detection of an arranging operation of the above-described theoretical information to predetermined board display information out of a plurality of board display information being the physical information according to the above-described plurality of printed circuit boards; a connecting operation detecting step of performing detection of an operation to connect between arbitrary board display information out of a plurality of board display information being the physical information according to the above-described plurality of printed circuit boards; and a display controlling step of performing control of displaying physical information corresponding to the above-described theoretical information on the above-described predetermined board display information when the detection of an arranging operation is performed by the above-described arranging operation detecting step and performing control of displaying inter-board connection display information being the physical information connecting between the above-described arbitrary board display information on the above-described second displaying step when the detection of a connecting operation is performed by the above-described connecting operation detecting step.

Further, the processing equipment according to the present invention is a processing equipment of electric information in a CAD system, in which design of the above-described plurality of printed circuit boards is performed in parallel by sending and receiving design information of circuits relating to the above-described plurality of printed circuit boards and design information of layouts relating to the above-described plurality of printed circuit boards between the circuits and the layouts relating to a plurality of printed circuit boards.

Further, the processing equipment according to the present invention has: the first displaying means for displaying theoretical information that constitutes circuits relating to a plurality of printed circuit boards; the second displaying means for displaying physical information that constitutes layouts relating to the above-described plurality of printed circuit boards; arranging operation detecting means for performing detection of an arranging operation of the above-described theoretical information to predetermined board display information out of a plurality of board display information being the physical information according to the above-described plurality of printed circuit boards; and display controlling means for performing control of displaying physical information corresponding to the above-described theoretical information on the above-described predetermined board display information when the detection of an arranging operation is performed by the above-described arranging operation detecting means.

Further, the processing equipment according to the present invention has deleting operation detecting means for performing detection of an operation of deleting a part or all of the physical information of the above-described plurality of board display information.

Further, the processing equipment according to the present invention has re-arranging operation detecting means for performing detection of an operation to re-arrange physical information displayed on the first board display information out of the above-described plurality of board display information on the second board display information different from the above-described first board display information.

Further, the processing equipment according to the present invention has changing means for changing the size of a particular board display information based on occupancy area of physical information that is displayed on the above-described particular board display information out of the above-described plurality of board display information.

Further, the processing equipment according to the present invention has: displaying means for displaying physical information that constitutes layouts relating to a plurality of printed circuit boards; connecting operation detecting means for performing detection of an operation to connect between arbitrary board display information out of a plurality of board display information being the physical information according to the above-described plurality of printed circuit boards; and display controlling means for performing control of displaying inter-board connection display information being the physical information connecting between the above-described arbitrary board display information on the above-described displaying step when the detection of a connecting operation is performed by the above-described connecting operation detecting means.

Further, the processing equipment according to the present invention has: the first displaying means for displaying theoretical information that constitutes circuits relating to a plurality of printed circuit boards; the second displaying means for displaying physical information that constitutes layouts relating to the above-described plurality of printed circuit boards; arranging operation detecting means for performing detection of an arranging operation of the above-described theoretical information to predetermined board display information out of a plurality of board display information being the physical information according to the above-described plurality of printed circuit boards; connecting operation detecting means for performing detection of an operation to connect between arbitrary board display information out of a plurality of board display information being the physical information according to the above-described plurality of printed circuit boards; and display controlling means for performing control of displaying physical information corresponding to the above-described theoretical information on the above-described predetermined board display information when the detection of an arranging operation is performed by the above-described arranging operation detecting means and performing control of displaying inter-board connection display information being the physical information connecting between the above-described arbitrary board display information on the above-described second displaying means when the detection of a connecting operation is performed by the above-described connecting operation detecting means.

Further, the program according to the present invention is a program for allowing a computer to execute the processing method according to the present invention.

Further, the program according to the present invention is a program for allowing a computer to function as the processing equipment according to the present invention.

Further, the computer-readable storage medium according to the present invention is a computer-readable storage medium in which the program according to the present invention is recorded.

Effect of the Invention

Since the present invention is constituted as it has been described above, it becomes possible to automatically sending and receiving circuit-related information and layout-related information, which are necessary in the design processing of each printed circuit board, between each printed circuit board in simultaneously performing design of a plurality of printed circuit boards, and an excellent effect is exerted that work efficiency of design work can be improved.

Further, since the present invention is constituted as it has been described above, an excellent effect is exerted that the efficiency of design information communication crossing printed circuit boards can be improved in designing a plurality of printed circuit boards.

Further, since the present invention is constituted as it has been described above, an excellent effect is exerted that it becomes possible to easily perform editing between printed circuit boards.

BRIEF DESCRIPTION OF THE DRAWINGS

FIGS. 8(a), (b), (c), and (d) are schematic explanatory views showing a procedure when a designer inputs inter-circuit-part connection by using a mouse.

FIG. 9 is a flowchart showing processing routines executed when the input of board is performed.

FIGS. 15(a), (b), (c), (d), (e), and (f) are schematic explanatory views showing a procedure when the designer inputs inter-board connection by using the mouse.

FIG. 23 shows a processing in the case of displaying rats on step S2106 of FIG. 21 in detail.

FIG. 25 is a flowchart showing a processing which is performed in the case of moving a circuit part from a board after mounting connection.

FIG. 26 is a conceptual explanatory view showing a data structure built on database in the case of moving a circuit part from a board after mounting connection.

FIG. 28(*b*) is a conceptual explanatory view showing a data structure of database after inputting wiring figures on a screen.

FIG. 30(*a*) is a conceptual explanatory view showing the structure of a database model of an electric part designing equipment in conventional board CAD, and FIG. 30 (*b*) is a conceptual explanatory view showing the structure of a database model of an electric part designing equipment in the board CAD of the present invention.

FIG. 31(*a*) is a conceptual explanatory view showing the database structure of an electric part designing equipment in the conventional board CAD, and FIG. 31(*b*) is a conceptual explanatory view showing the structure of the database model of the electric part designing equipment in the board CAD of the present invention.

FIG. 32(*a*) shows various parts used in the example of the present invention in a table, FIG. 32(*b*) shows various parts, which are used in designing a semiconductor system as a modified example of the present invention, in a table, and FIG. 32(*c*) shows various parts, which are used in designing a semiconductor system as another modified example of the present invention in a table.

FIG. 33 (*a*) is a conceptual explanatory view explaining connection between a board and circuit parts, FIG. 33 (*b*) is a conceptual explanatory view in which a method expressed in layer relation is used as mounting connection means, FIG. 33(*c*) is a conceptual explanatory view in which a method expressed in binding condition is used as the mounting connection means, and FIG. 33(*d*) is a conceptual explanatory view in which a method expressed in connection of mounting terminals as the mounting connection means.

EXPLANATION OF NUMERICAL CHARACTERS

Figure 1A:
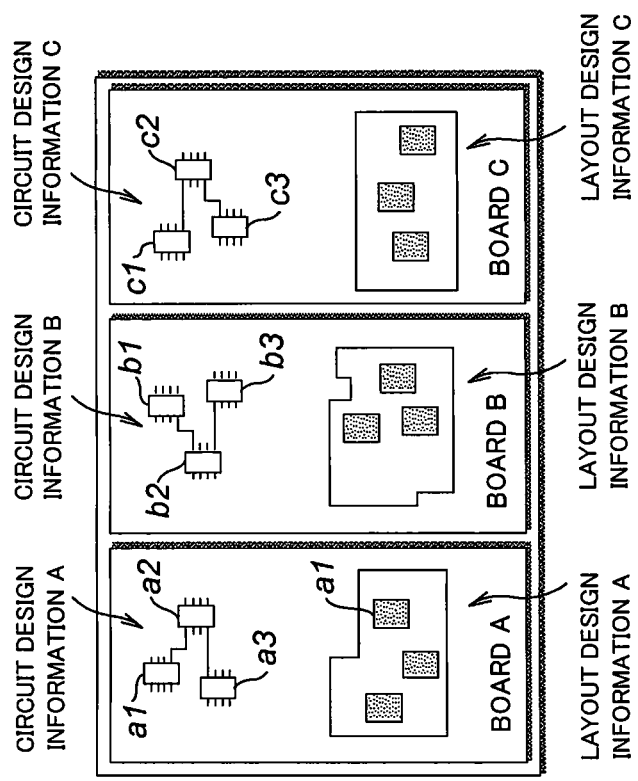
FIGS. 1(a), (b), (c), and (d) are conceptual explanatory views showing a design procedure of a board A, a board B and a board C in conventional board design technology.
Figure 1:
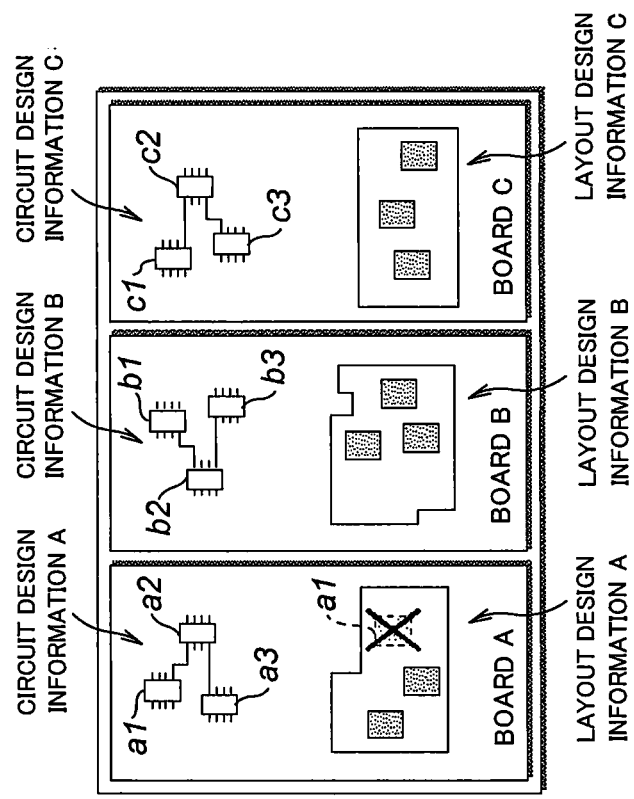
Figure 1D:
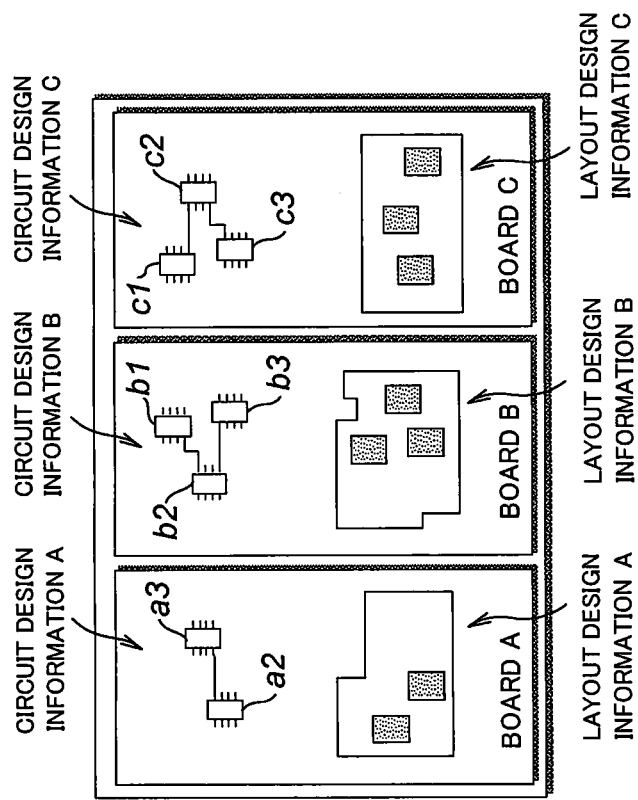
Figure 2A:
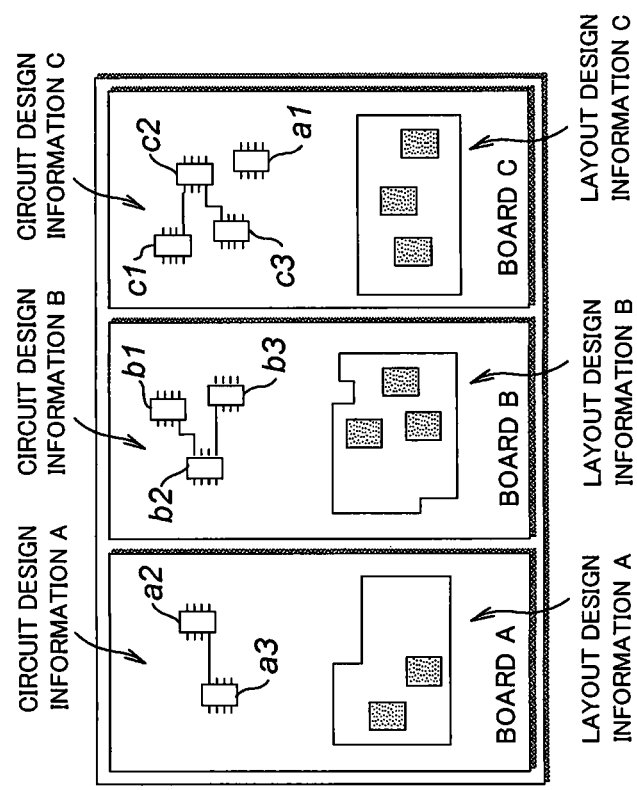
FIGS. 2(a), (b), and (c) are conceptual explanatory views showing a design procedure of the board A, the board B and the board C in the conventional board design technology.
Figure 2B:
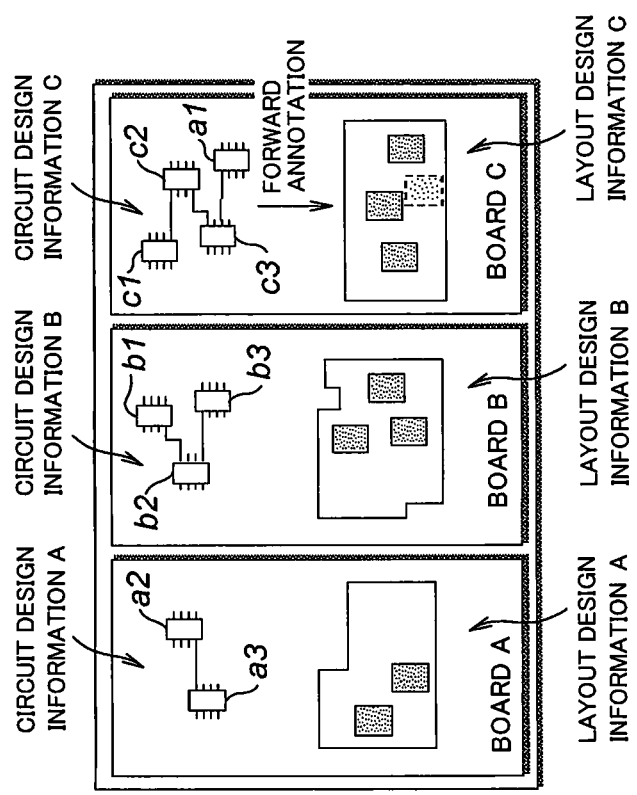
Figure 2C:
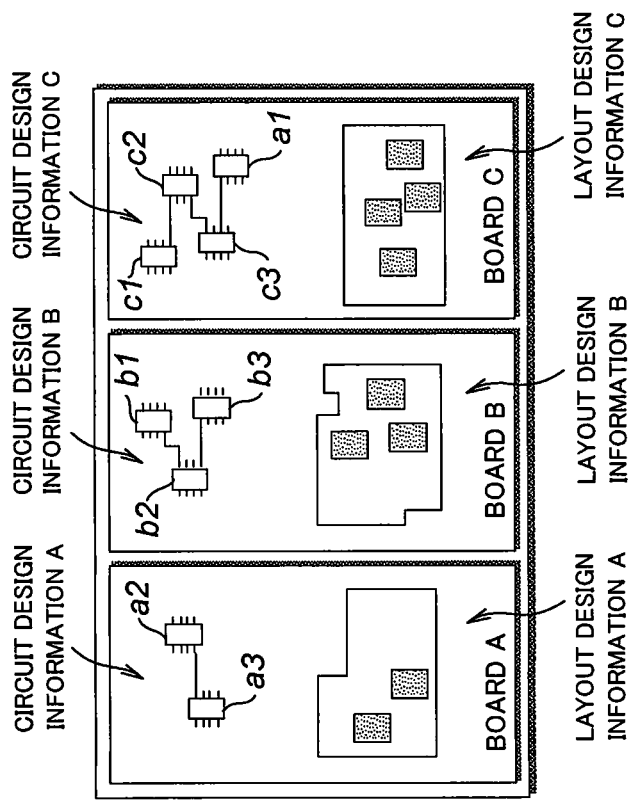

10 Processing equipment of electric information
12 Central processing unit (CPU)
14 Bus
16 Storage
18 Display unit
20 Pointing device
22 Character input device
24 Window
24*a* Circuit design information screen
24*b* Layout design information screen
26 Circuit part library window
26*a* Inside upper frame
26*b* Inside lower frame
28 Schematic figure
30 Circuit part list
32 Circuit part information
34 Display method
36 Circuit part connection list
38 Circuit part connection information
40 Circuit part terminal list
42 Connection terminal information
44 Board list
46 Board information
48 Inter-board connection list
50 Inter-board connection information
Board terminal
Board terminal list
Board terminal information
Mounting terminal list
60 Mounting terminal information
62 Mounting terminal list
64 Board mounting terminal information
66 Mounting connection list
68 Mounting connection information
70 Mounting terminal list
Mounting terminal information

BEST MODE FOR IMPLEMENTING THE INVENTION

In the following, referring to the attached drawings, description will be made in detail for an embodiment example of the processing method, the processing equipment, the program and the computer-readable storage medium according to the present invention.

Figure 3:
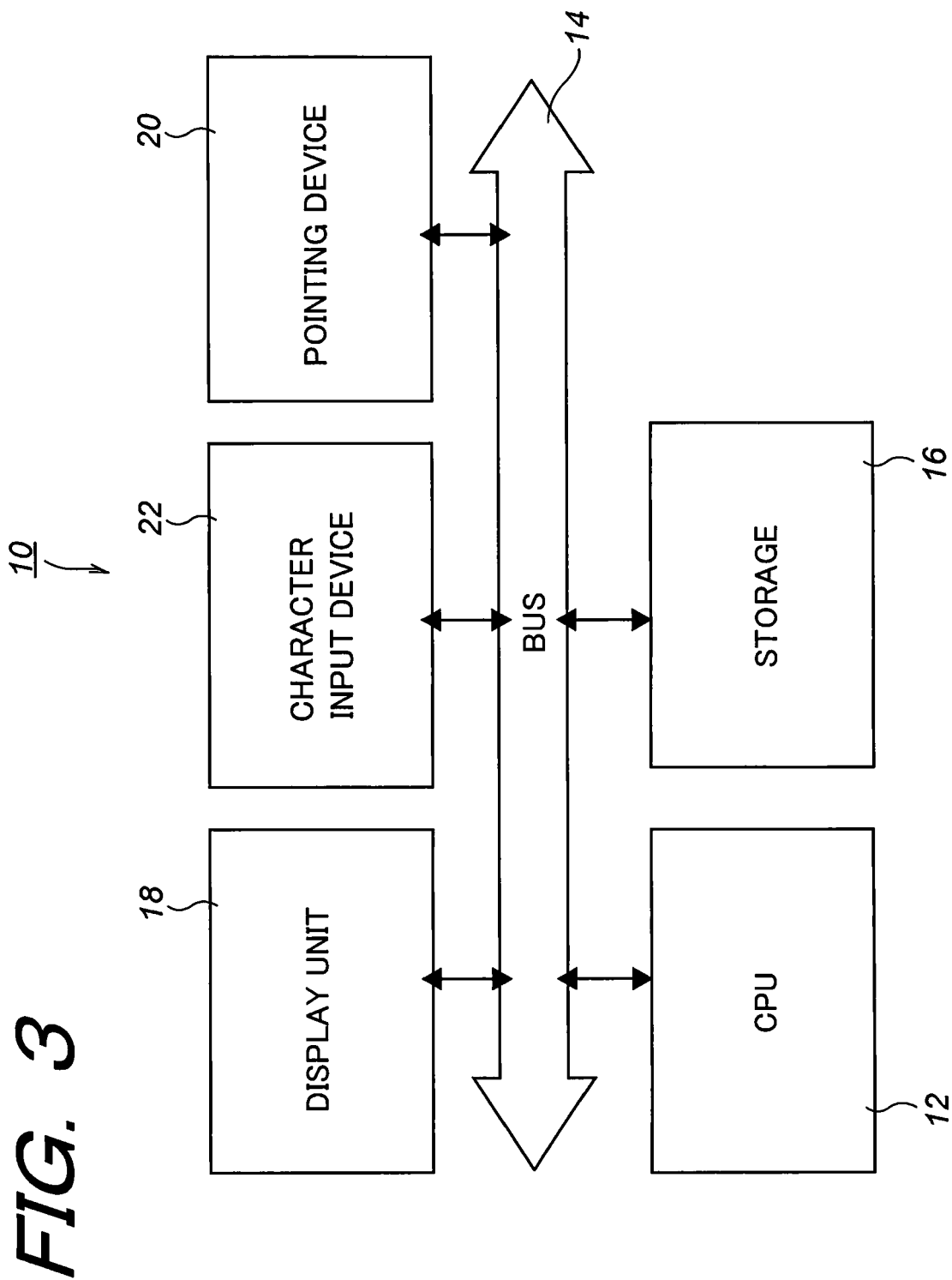
FIG. 3 is a block diagram showing the constitution of a processing equipment of electric information in board CAD according to the present invention.

FIG. 3 shows the block constitution view showing the system constitution of an embodiment example of the processing equipment of electric information in a CAD system by the present invention.

More specifically, the processing equipment of electric information (hereinafter, simply referred to as a processing equipment) 10 by the present invention is constituted so as to control the entire operation of the equipment by using a central processing unit (CPU) 12.

To this CPU 12, a storage 16 that is constituted of a read-on memory (ROM) storing a program for controlling the CPU 12 (described later) or various information therein, a random access memory (RAM) equipped with a storage region or the like used as the working area of the CPU 12, or the like, a display unit 18 equipped with a screen such as a CRT and a liquid crystal panel that performs various displays based on the control of the CPU 12, a pointing device 20 such as a mouse that designates an arbitrary position on the screen of the display unit 18, and a character input device 22 such as a keyboard for inputting an arbitrary character are connected via a bus 14.

In the above-described constitution, description will be made for the contents of a processing executed by the processing equipment 10 referring to each drawing from FIG. 4 to FIG. 29.

Meanwhile, in the processing equipment 10, by the operation of input means such as the pointing device 20 and the character input device 22 by a user who performs design work, the user can input an instruction that he/she desires, a display state on the display unit 18 changes in response to an operation of the pointing device 20 or the character input device 22 by the user.

In the following, as an example of the processing executed by the processing equipment 10, a processing procedure necessary in arranging three circuit parts severally for three printed circuit boards will be described.

It is to be noted that a window 24 divided into two at the center is displayed on the screen of the display unit 18 as shown in FIG. 4(*a*). Herein, the left side of the window 24 is a circuit design information screen 24*a* on which theoretical information that constitutes circuits relating to a plurality of printed circuit boards is displayed. On the other hand, the right side of the window 24 is a layout design information screen 24*b* on which physical information that constitutes layouts relating to the above-described plurality of printed circuit boards is displayed.

Then, in this processing equipment 10, by the user's input of predetermined instruction by using the pointing device 20 or the character input device 22, a predetermined program in response to the instruction is read out from the storage 16, and a processing described below will be executed.

(1) Input of Circuit Part by the User (Processing Routines when the Input of Circuit Part is Performed (FIG. 5))

Figure 5:
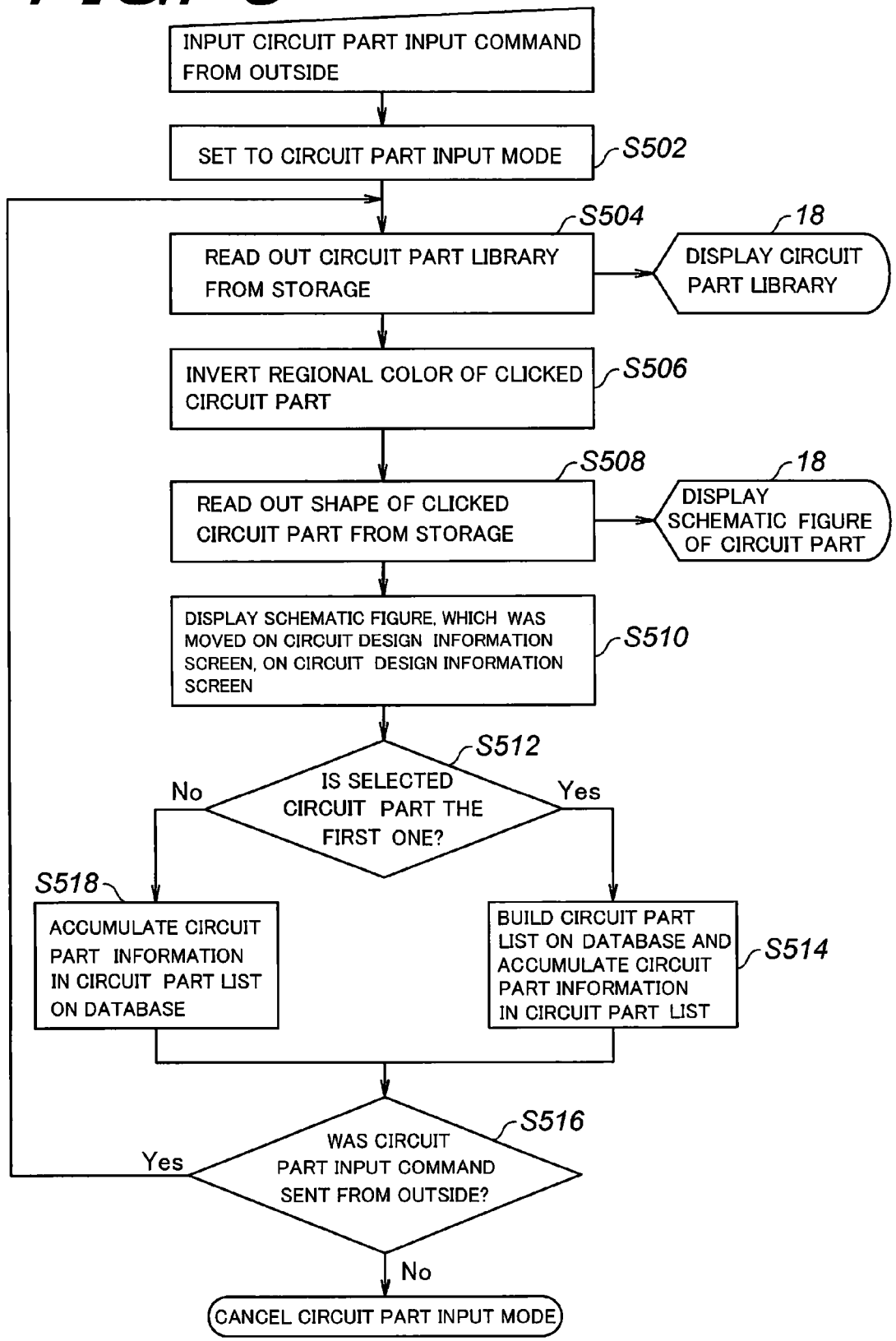
FIG. 5 is a flowchart showing a processing routine executed in performing the input of circuit parts.

FIG. 5 show the flowchart of processing routines regarding the setting of circuit parts. When the user inputs a circuit part input command by using the pointing device 20 or the character input device 22, a circuit part input mode in which processing routines regarding setting of circuit parts are executed becomes ready (step S502).

More specifically, when the circuit part input mode is set by the input of a circuit part input command using the pointing device 20 or the character input device 22 in the processing of step S502, read-out of a circuit part library stored in the storage 16 is performed, a new circuit part library window 26 is displayed on the screen of the display unit 18 as the circuit part library, and circuit parts shown by circuit part information, which is stored in the circuit part library of the storage 16, are displayed in the circuit part library window 26 (step S504).

Specifically, inside an upper frame 26*a* of the circuit part library window 26, a plurality of circuit parts specified by circuit part information being information showing the shape, size, function or the like of various circuit parts stored in the circuit part library of the storage 16 are displayed in a tree. Further, inside a lower frame 26*b* of the circuit part library window 26, the schematic FIG. 28 of a circuit part selected from the upper frame 26*a* is displayed (refer to FIG. 4(*a*)).

Next, the user selects one circuit part from the tree in the upper frame 26*a* on the screen of the display unit 18. In selecting a part, when the user clicks inside a region, where the name of the circuit part to be selected is displayed, by using the pointing device 20 such as a mouse, the selected regional color is inverted (step S506), and the tree is constituted that the currently selected circuit part can be easily recognized by visual observation.

In the embodiment, the circuit part A was selected first, and the regional color of the selected circuit part A is inverted as shown in FIG. 4(*a*). This processing is performed on step S506.

Figure 28A:
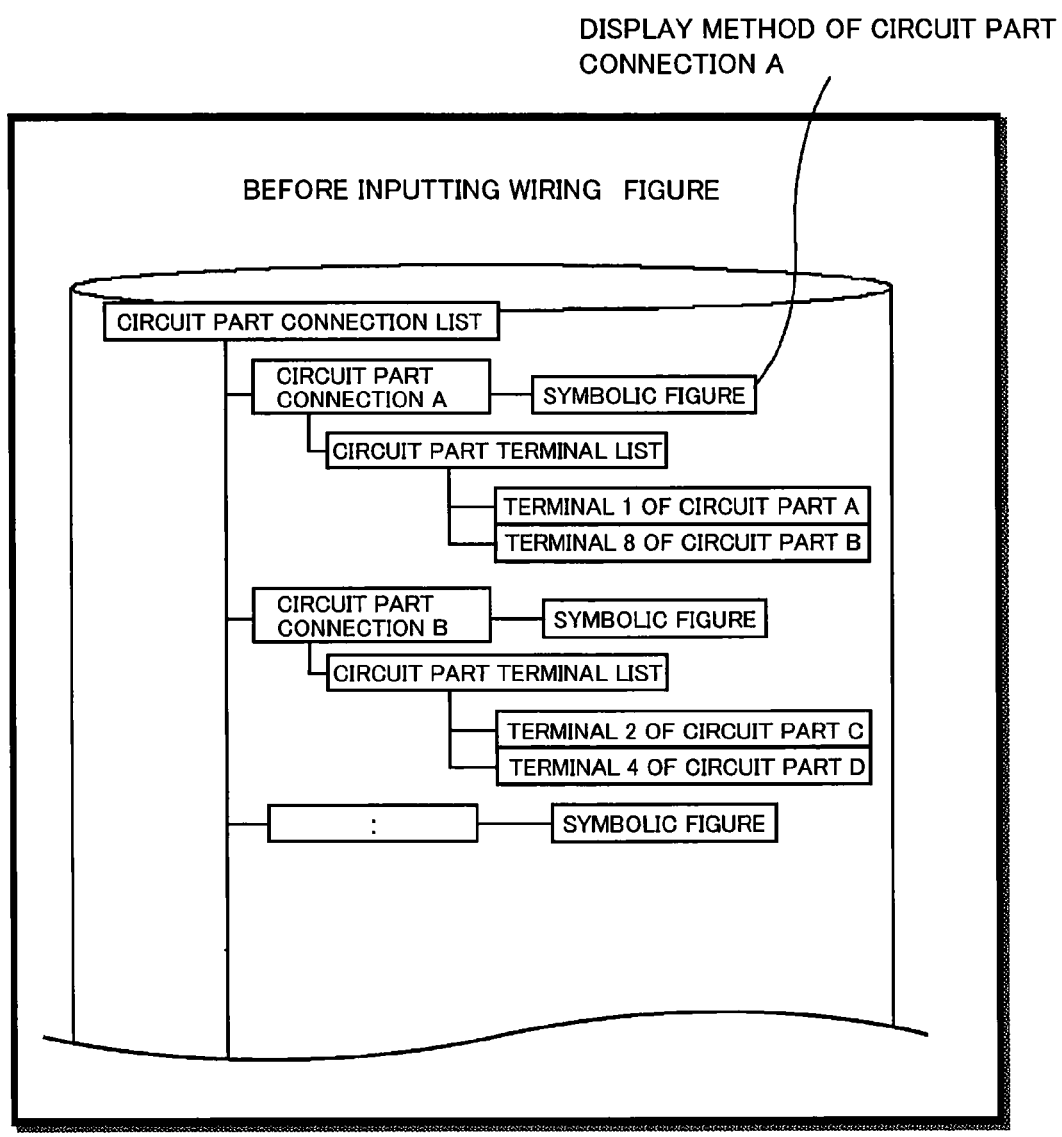
FIG. 28(*a*) is a conceptual explanatory view showing a data structure of database before inputting wiring figures on a screen.
Figure 28B:
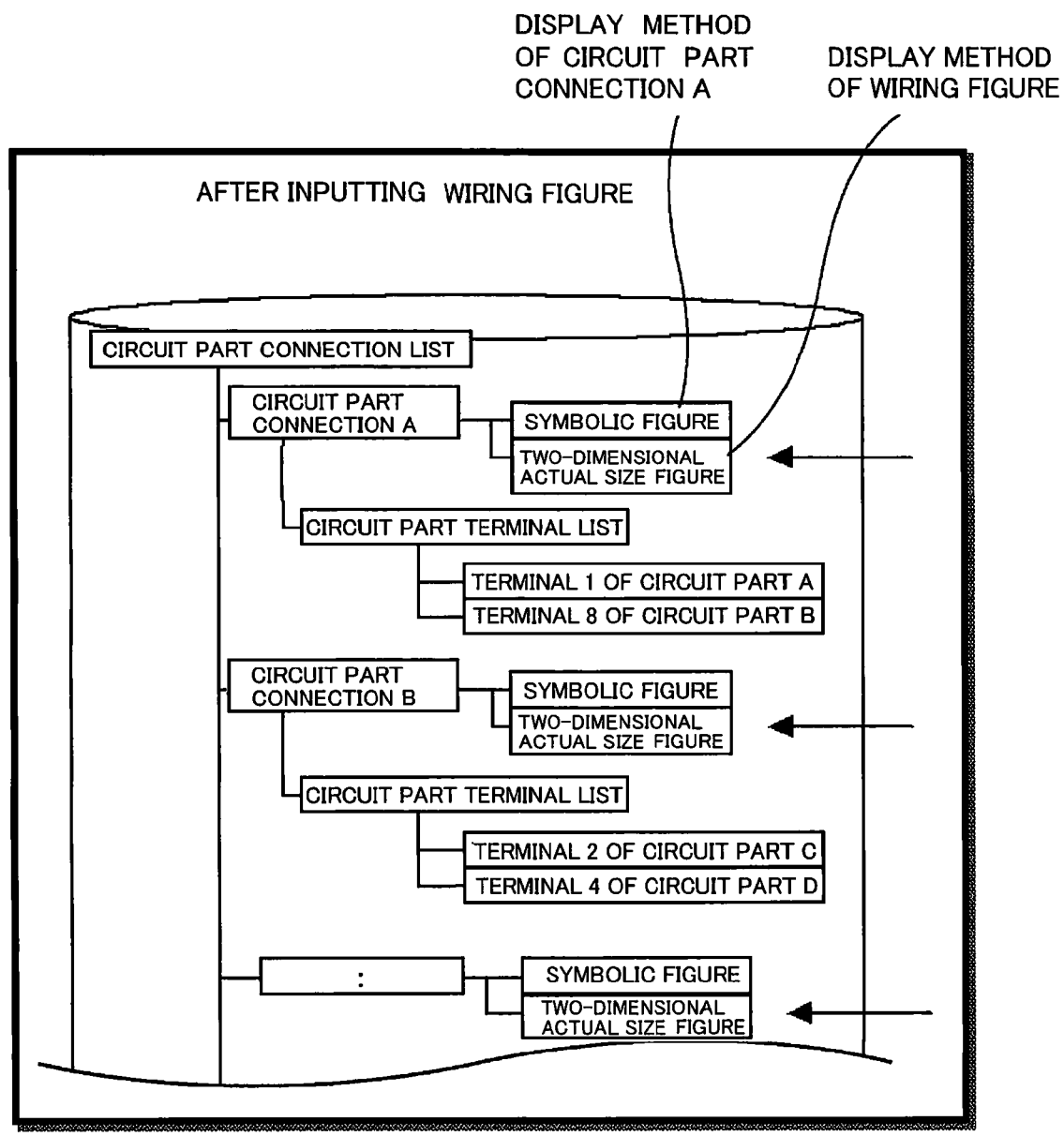

Then, information of the schematic FIG. 28 of the circuit part A having eight terminals is read out from the storage 16, and displayed in the lower frame 26*b* of the circuit part library window 26 (step S508).

Next, the user clicks the schematic FIG. 28 of the circuit part A, which is displayed in the lower frame 26*b* of the circuit part library window 26, by the pointing device 20, drags the pointing device 20, more specifically, moves the figure on the circuit design information screen 24*a* as he/she keeps on clicking the device (refer to FIG. 4(*a*)), and releases a button of the mouse on the circuit design information screen 24*a*, and then, the schematic FIG. 28 of the circuit part A is displayed on the circuit design information screen 24*a* (step S510). FIG. 4(*b*) shows the display state by the processing of step S510.

The schematic FIG. 28 of the circuit part A displayed on the circuit design information screen 24*a* can be moved by dragging by using the pointing device 20.

Meanwhile, in the designing equipment 10, a figure selectable as the schematic FIG. 28 is a symbolic figure, a two-dimensional actual size figure and a three-dimensional actual size figure, and the symbolic figure is used as the schematic FIG. 28 of a circuit part in this embodiment.

On the subsequent step S512, judgment whether or not a circuit part selected in this processing routine is the first one is performed.

In this judgment processing, in the case where the selected circuit part is judged to be the first one, procedure advances to the processing of step S514, a circuit part list 30 is built on database, processing of registering information that the circuit part A is displayed in the schematic FIG. 28 on the circuit part list 30 is performed.

More particularly, the circuit part list 30 is built in such a manner that a data structure as shown in FIG. 4(*c*) is equipped in database inside the storage 16. More specifically, the name of the circuit part (circuit part A) is stored as circuit part information 32 in a layer under the circuit part list 30, and the name of a display method 34 of the schematic FIG. 28 of the circuit parts (symbolic figure) on the screen is stored in a layer further below.

Herein, the circuit part list 30 was newly built on database specifically and information that the circuit part A was displayed in the circuit part list 30 as a symbolic figure was stored as the circuit part information 32.

It is to be noted that the circuit part list 30 is one on which the information of parts that the designer set to display on the circuit design information screen 24*a* as circuit parts are listed, and all circuit parts displayed on the circuit design information screen 24*a* are placed on this list.

According to the processing above, the user selects the circuit part A and the circuit part A is displayed on the screen as a symbolic figure. Then, the circuit part list is created on database and circuit part information that the symbolic figure is allocated on a display screen as the circuit part A is stored.

Subsequently, when the processing of step S514 ends, procedure advances to the processing of step S516, judgment whether or not there is another circuit part input command from outside is performed.

In this embodiment, since other circuit parts are inputted in addition to the circuit part A, the judgment processing on step S516 judges that there is a circuit part input command from outside, procedure returns to step S504 again and the above-described processing is executed repeatedly.

Returning to the processing of step S504, the user, in order to select another circuit part, clicks a circuit part B displayed on the circuit part library window 26 by using the pointing device 20. In the circuit part B selected by the user by the processing of the step S506, the regional color of the circuit part B in the upper frame 26*a* is inverted, and the schematic FIG. 28 of the circuit part B is displayed in the lower frame 26*b* of the circuit part library window 26 by the processing of step S508.

When the schematic FIG. 28 displayed in the lower frame 26*b* is moved on the circuit design information screen 24*a* by the user, the processing of step S510 is performed.

In this case, since the selected circuit part is not the first one, judgment is made that the selected circuit part is not the first one in the judgment processing of step S512, and procedure advanced to the processing of step S518.

Then, in the processing of step S518, the name of the circuit part (circuit part B) is accumulated as a new circuit part information 32 in a layer under the circuit part list 30 that is already built on database by the processing of step S514, and the name of a display method 34 of the schematic FIG. 28 on the screen of the circuit part (symbolic figure) is stored in a layer further below.

After this, procedure advances to the processing of step S516, and judgment whether or not there is another circuit part input command from outside is performed.

In this embodiment, since circuit parts are inputted in addition to the circuit part A and the circuit part B, judgment is made that there is a circuit part input command from outside in the judgment processing of step S516, the above-described processing is executed repeatedly returning to step S504 again.

Herein, in this embodiment, since design is performed by using nine circuit parts in total, it is necessary to repeatedly perform processing from the step S504 to step 516 for seven times more in order to input the remaining seven circuit parts (circuit part C, circuit part D, circuit part E, circuit part F, circuit part G, circuit part H, circuit part I).

However, because the input of circuit part C, circuit part D, circuit part E, circuit part F, circuit part G, circuit part H and circuit part I and processing of database building associated with the input are the same processing as the circuit part B, their description will be omitted.

Figure 4A:
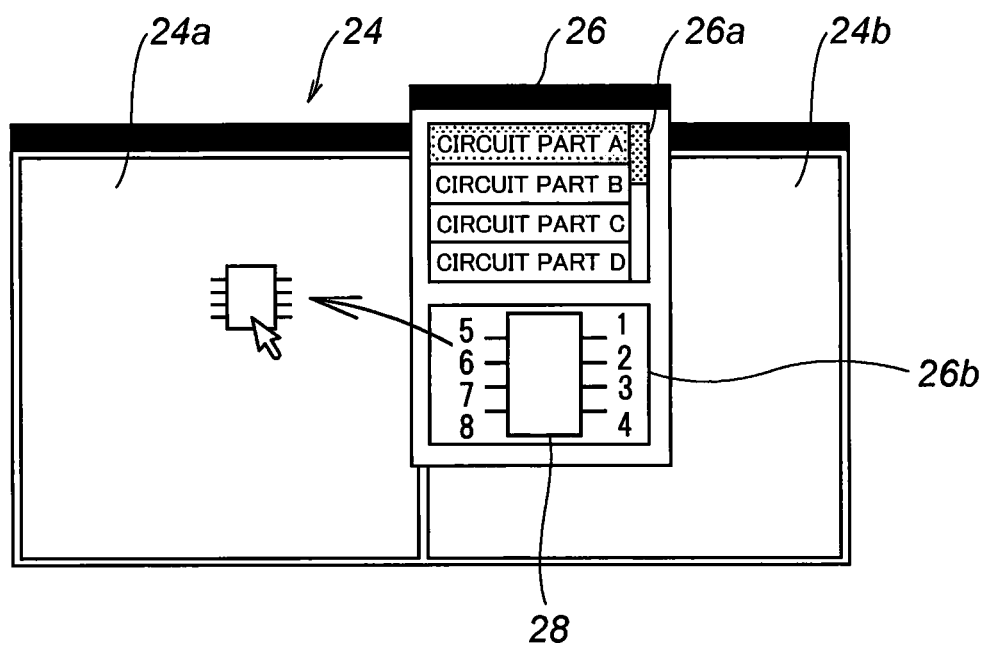
FIG. 4(a) is an explanatory view showing a circuit part input screen by an electric part designing equipment in board CAD according to the present invention.
Figure 4B:
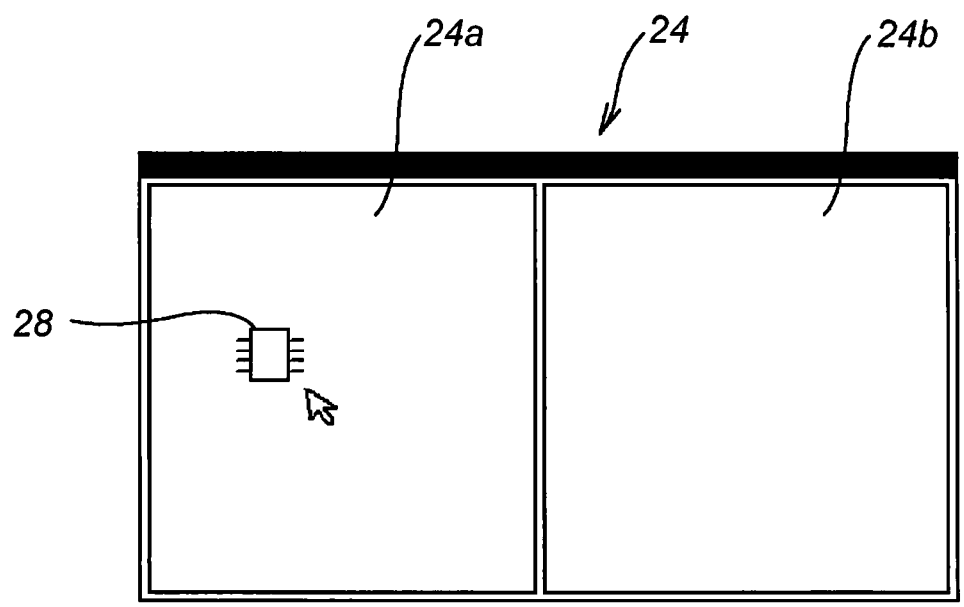
FIG. 4(b) is an explanatory view showing a circuit part input screen by an electric part designing equipment in board CAD according to the present invention.
Figure 4C:
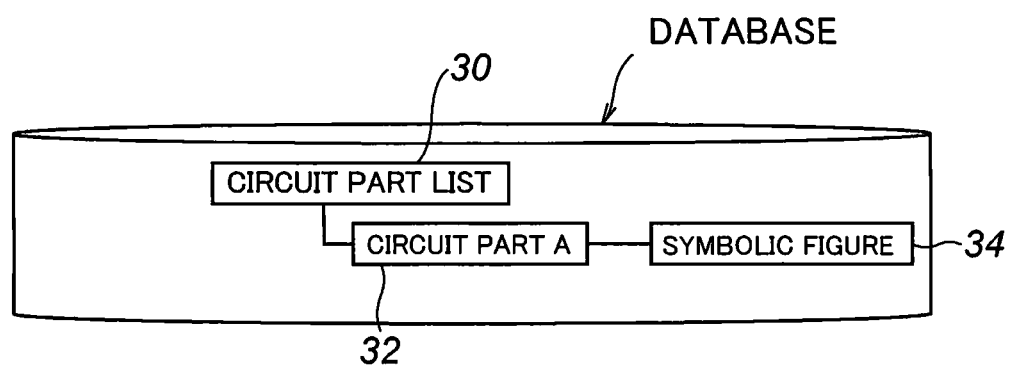
FIG. 4(c) is a conceptual explanatory view illustrating the data structure of database during circuit part input.
Figure 4D:
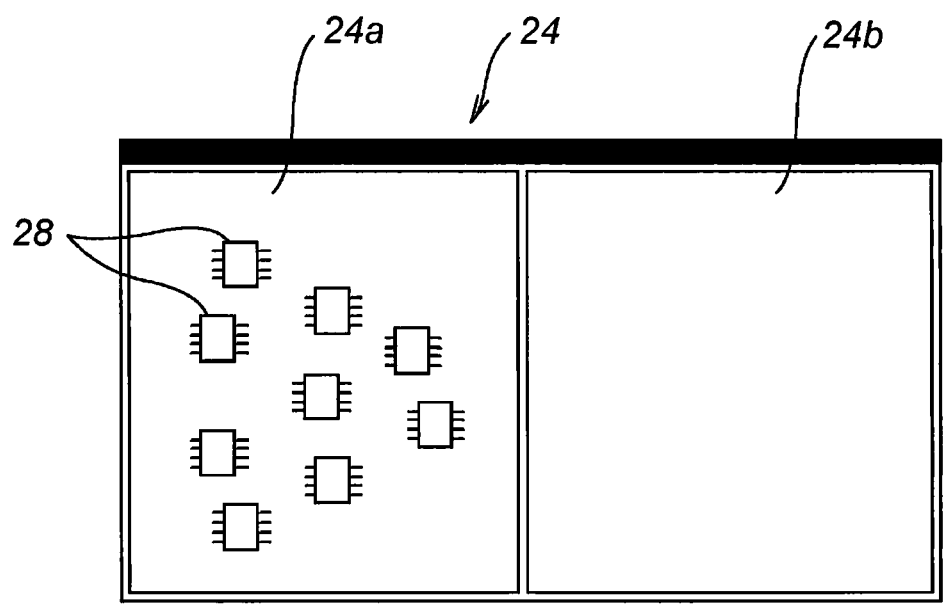
FIG. 4(d) is an explanatory view showing a screen in the case where input of circuit parts by an electric part designing equipment in board CAD according to the present invention is completed.
Figure 4E:
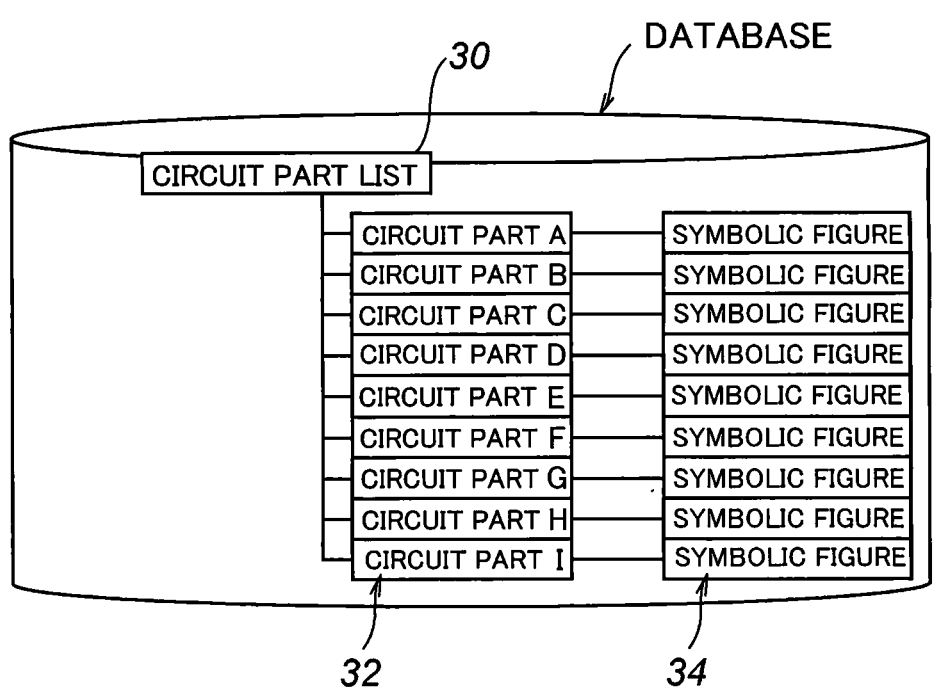
FIG. 4(e) is a conceptual explanatory view illustrating a data structure of database after finishing circuit part input.

FIG. 4(d) shows a display state of the circuit design information screen 24a in the case where the nine circuit parts of circuit part A to I were inputted, and further, FIG. 4(e) shows a state where the circuit part information 32 of the nine circuit parts of circuit part A to I was added to the circuit part list on database.

Then, in the judgment processing of step S516, in the case of judgment that there is no circuit part input command from outside, the circuit part input mode is cancelled, and the processing routines regarding circuit part input end. When the processing routines regarding the circuit part input ended, processing routines when connection between circuit parts is performed is subsequently executed for the input of circuit part connection.

(2) Input of Inter-Circuit-Part Connection by the User (Processing Routines when Connection Between Circuit Parts is Performed (FIG. 7))

Figure 7:
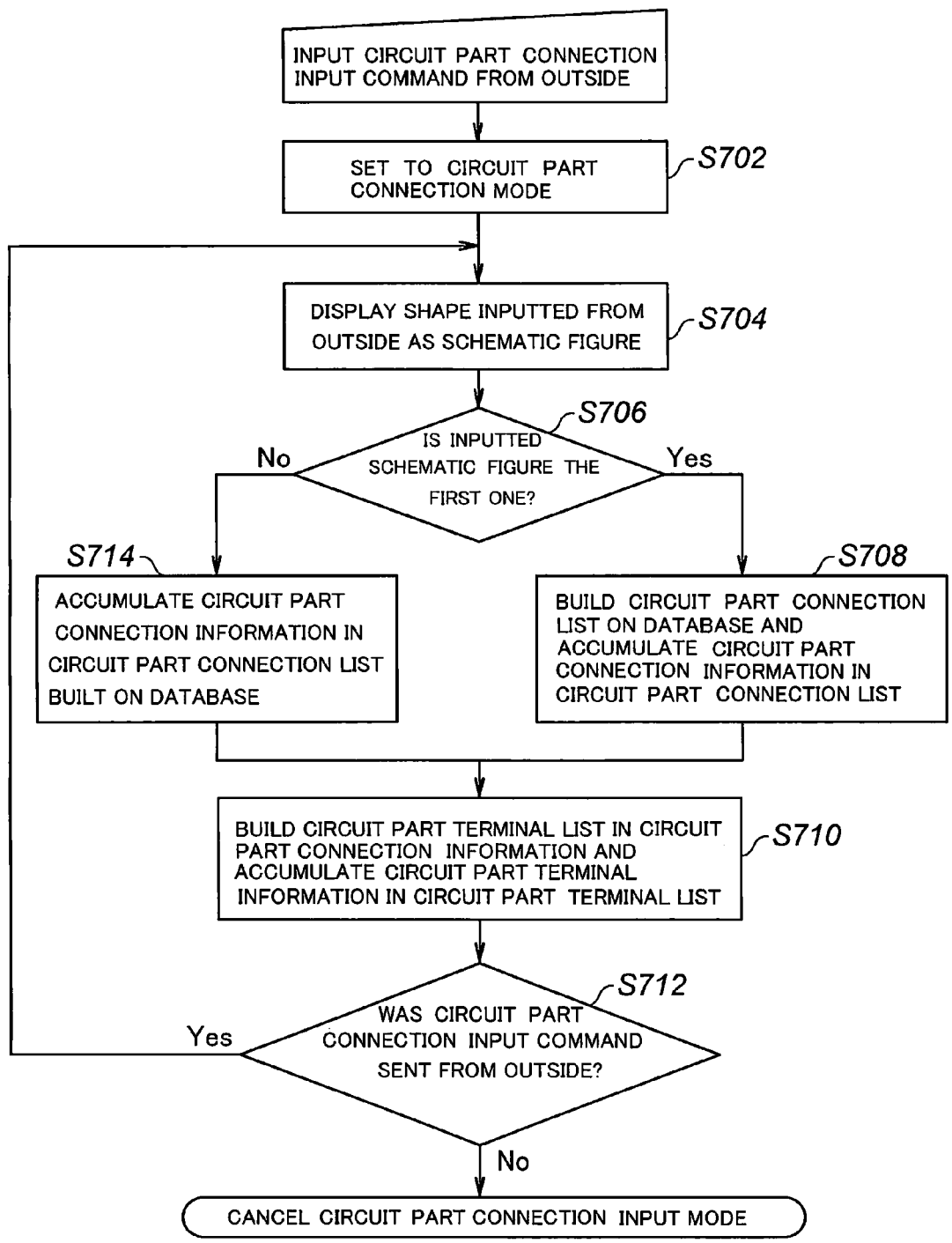
FIG. 7 is a flowchart showing processing routines executed in performing the input of inter-circuit-part connection.

FIG. 7 shows a flowchart of processing routines regarding an inter-circuit-part connection. When the user inputs inter-circuit-part connection input command by using the pointing device 20 or the character input device 22, circuit part connection input mode in which processing routines regarding inter-circuit-part connection are executed becomes ready.

More specifically, when the inter-circuit-part connection input command by using the pointing device 20 or the character input device 22 is inputted, the circuit part connection input mode is set by the processing on step S702, and the user is enabled to input circuit part connection.

Next, by the user's operation of the pointing device 20 such as a mouse, a terminal that a circuit part has is connected to a terminal that another circuit part has, and description will be made referring to the input method of circuit part connection in FIG. 8 in which circuit parts are connected to each other.

Firstly, one terminal of a circuit part is selected and its end portion is clicked, and the end portion is directly moved (drag) so as to draw a straight line parallel with X-axis (refer to FIG. 8(a) "drag a circuit part terminal" and FIG. 8(b) "click a mouse. Build lines between two points in straight lines parallel with X-axis or Y-axis.").

Next, to bend the inputted connecting line, a button of the pointing device 20 such as a mouse is clicked, and it is moved so as to draw a straight line parallel with Y-axis (refer to FIG. 8(c) "click a mouse. Build lines between two points in straight lines parallel with X-axis or Y-axis.").

Furthermore, to bend the connecting line again, the button of the pointing device 20 such as a mouse is clicked, it is moved so as to draw a straight line parallel with X-axis, and the button of the pointing device 20 such as a mouse is clicked at the point where the pointer of the pointing device 20 reached a terminal of the circuit part to be connected, (refer to FIG. 8(d) "click a circuit part terminal. Build lines between two points in straight lines parallel with X-axis or Y-axis.").

The user inputs connection between circuit parts by the above-described procedure. Further, by repeatedly performing the operation from FIG. 8(b) to FIG. 8(c), inputting of complicated connecting lines is made possible.

In this embodiment, since circuit part connection A to be inputted first is a straight line, it is inputted as follows according to the above-described procedure.

Figure 6A:
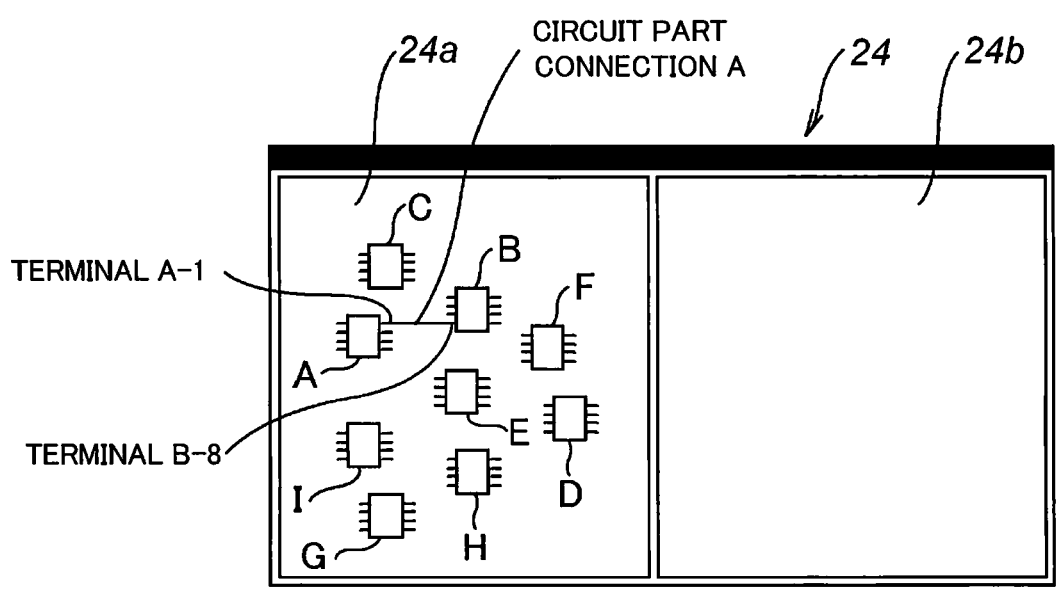
FIG. 6(a) is an explanatory view showing a circuit design information screen in inputting inter-circuit-part connection.

The pointer of the pointing device 20 is brought to the end portion of a terminal A-1 of the circuit part A and it is clicked. Furthermore, the connecting line is extended while the pointer is kept clicked, the pointer of the pointing device 20 is brought to the end portion of a terminal B-8 of the circuit part B and it is clicked. The circuit part connection A inputted in this manner is displayed on the screen as a linear schematic figure connecting the circuit part A with the circuit part B as shown in FIG. 6(a).

Meanwhile, in the processing equipment 10, a figure selectable as a schematic figure expressing the connecting line of circuit part connection is the symbolic figure, the two-dimensional actual size figure and the three-dimensional actual size figure, and in this embodiment, the symbolic figure is used as the schematic figure expressing the connecting line of circuit part connection.

Next, when the processing of step S702 ends the procedure advances to the processing of step S704, a shape inputted from outside is displayed as a schematic figure on step S704, and in this embodiment, the circuit part connection A being connecting line that connects the circuit part A with the circuit part B is displayed on the circuit information design screen 24a as a symbolic figure.

On the subsequent step S706, judgment whether or not the circuit part connection inputted in this processing routine is the first input is performed.

In this judgment processing, procedure advanced to the processing of step S708 in the case where the inputted circuit part connection is judged as the first one.

It is to be noted that the input of the circuit part connection A is the first input, so that the processing routine advances to step S708.

Figure 6B:
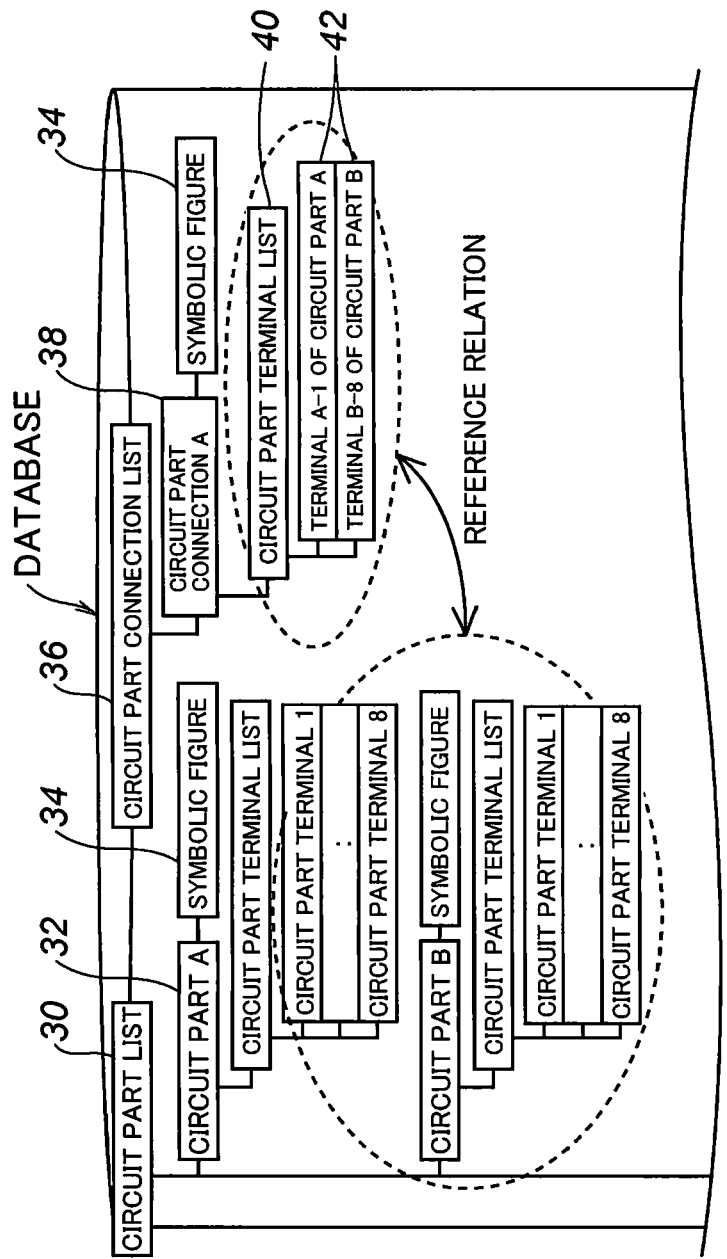
FIG. 6(b) is a conceptual explanatory view showing a data structure inside database in inputting inter-circuit-part connection.
Figure 6C:
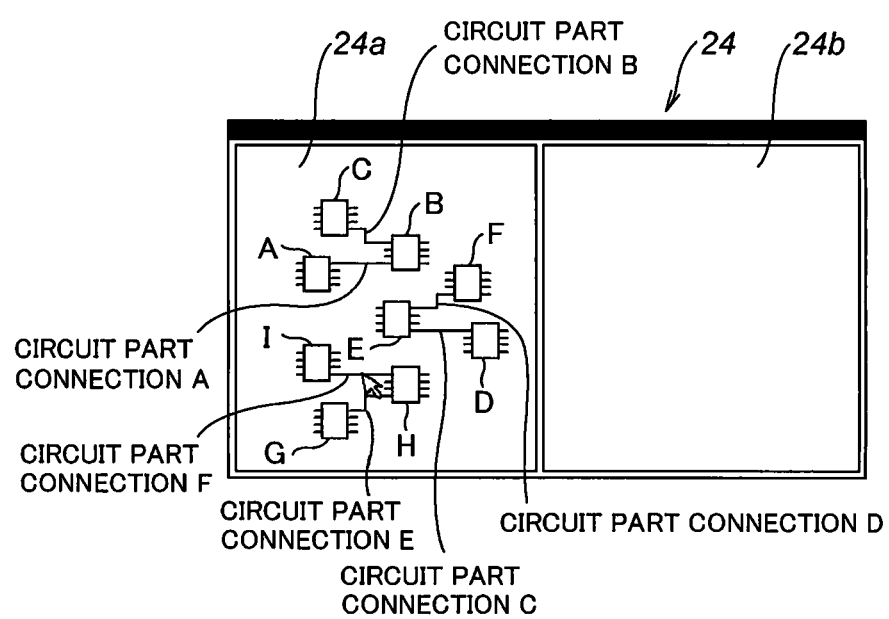
FIG. 6(c) is an explanatory view showing a circuit design information screen after inputting inter-circuit-part connection.
Figure 6D:
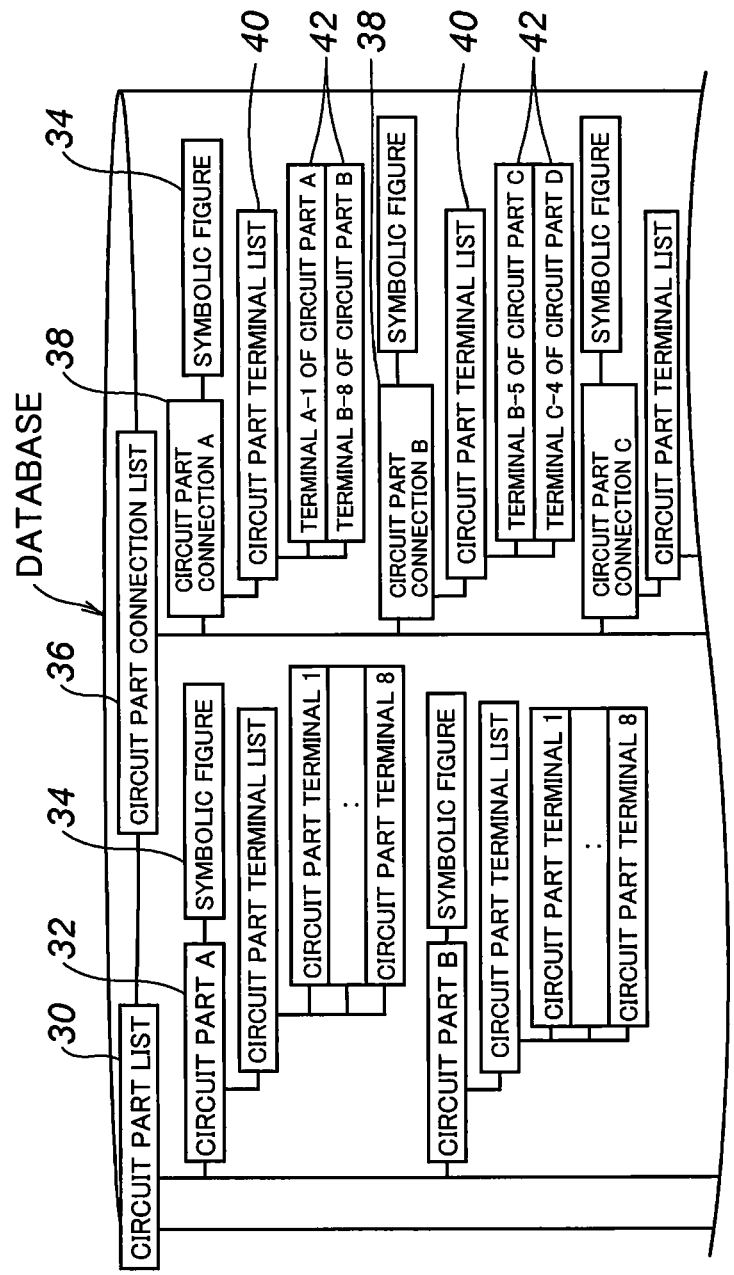
FIG. 6(d) is a conceptual explanatory view showing a data structure inside database after finishing the input of inter-circuit-part connection.

In the processing of step S708, as shown in FIG. 6(b), a circuit part connection list 36 is newly built on database in the storage 16, and the name of circuit part connection, that is, the circuit part connection A and the display method 34 of the circuit part connection A are accumulated in the circuit part connection list 36 as a circuit part connection information 38. In this embodiment, since the display method of the circuit part connection A is in symbolic figures, information that a symbolic figure is allocated for the circuit part connection A is accumulated in the display method 34 of FIG. 6(b).

When the processing of step S708 ends, procedure advances to the processing of step S710, and in the processing of step S710, a circuit part terminal list 40 is built in the circuit part connection information 38 that was registered on step S708, and the information relating to a terminal A-1 of the circuit part A and a terminal B-8 of the circuit part B, which are terminals involved in the circuit part connection A, is accumulated in the circuit part terminal list 40 as connection terminal information 42.

When the processing of step S710 ends, procedure advances to the processing of step S712, and whether or not there is a new circuit part connection input command from outside is judged.

In this judgment processing, in the case of judgment that there was a new inter-circuit-part connection input command from outside, procedure returns to step S704 and processing on and after step S704 is performed again.

Next, the user connects a terminal B-5 of the circuit part B with a terminal C-4 of the circuit part C, and inputs circuit part connection B. On step S704, the shape of the inputted circuit part connection B is displayed on the display unit 18 as a schematic figure. In this case, since the inputted schematic figure is the second one, the inputted circuit part connection is not judged as the first one in the judgment processing of step S706, and procedure advances to the processing of step S714.

Regarding the processing of step S714, a circuit part connection name called the circuit part connection B that was newly inputted as the circuit part connection information 38 and information that the display method 34 is in a symbolic figure is accumulated in the circuit part connection list 36 already built on database on step S708.

Next, on step S710, the circuit part terminal list 40 is newly built in the circuit part connection information 38 of the circuit part connection B, which was accumulated on the circuit part connection list 36, and the information relating to the terminal B-5 of the circuit part B and the terminal C-4 of the circuit part C as connection terminal information 42 is accumulated in the circuit part terminal list 40.

Thus, on the circuit design information screen 24*a*, the circuit part connection A and the circuit part connection B being two connecting lines connecting a circuit part with a circuit part are displayed as a symbolic figure, and the information is also built on database.

In this embodiment, to further connect circuit parts with each other by using four circuit part connections in addition to the above-described two circuit part connections, it is necessary to repeatedly perform the operation of the above-described from step S704 to step S710 four times.

Then, in the case of judgment that there is no circuit part connection input command in the processing of step S712, the circuit part connection input mode is cancelled, and the processing routine regarding inter-circuit-part connection ends. Display as shown in FIG. 6(*c*) is made on the circuit design information screen 24*a*, and information having a database structure shown in FIG. 6(*d*) is accumulated on database. More specifically, since circuit part connection from the circuit part connection A to circuit part connection F is inputted, the circuit part connection information 38 of six connections in total is accumulated in the circuit part connection list 36.

By performing such input of circuit part connection, circuit parts that were not electrically connected have circuit part connection, the circuit part B is electrically connected with the circuit part A and the circuit part C, the circuit part E is electrically connected with the circuit part D and the circuit part F, and the circuit part H is electrically connected with the circuit part G and the circuit part I.

(3) Input of Printed Circuit Board by the User
(Processing Routines when Input of Printed Circuit Board is Performed (FIG. 9))

FIG. 9 shows a flowchart of processing routines regarding the input of printed circuit board. When the user inputs a board input command by using the pointing device 20 or the character input device 22, a board input mode in which the processing routines regarding the input of printed circuit board are executed is set on step S902.

More specifically, this processing routine is started by the input of a board input command by using the pointing device 20 or the character input device 22, and when it is set to the board input mode, the user is enabled to input printed circuit board.

When the processing of step S902 ends, procedure advances to step S904, and whether or not the user wishes to use existing data of board shape accumulated inside the storage 16 is asked. In this embodiment, since the user himself/herself should input a board shape, procedure advances from step S904 to step S906.

Figure 10A:
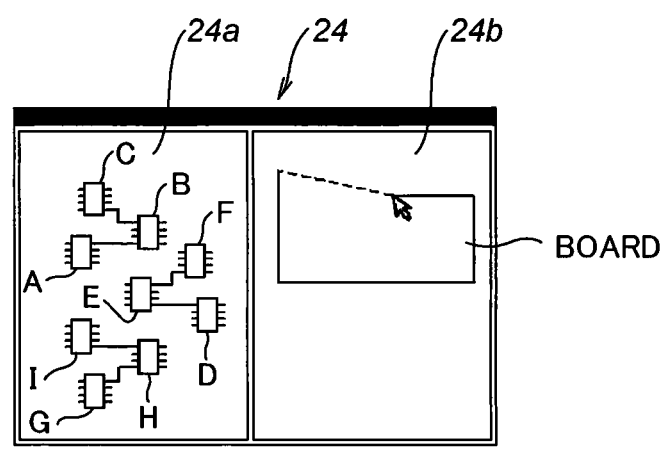
FIG. 10(a) is an explanatory view showing a layout design information screen in performing board input.
Figure 10B:
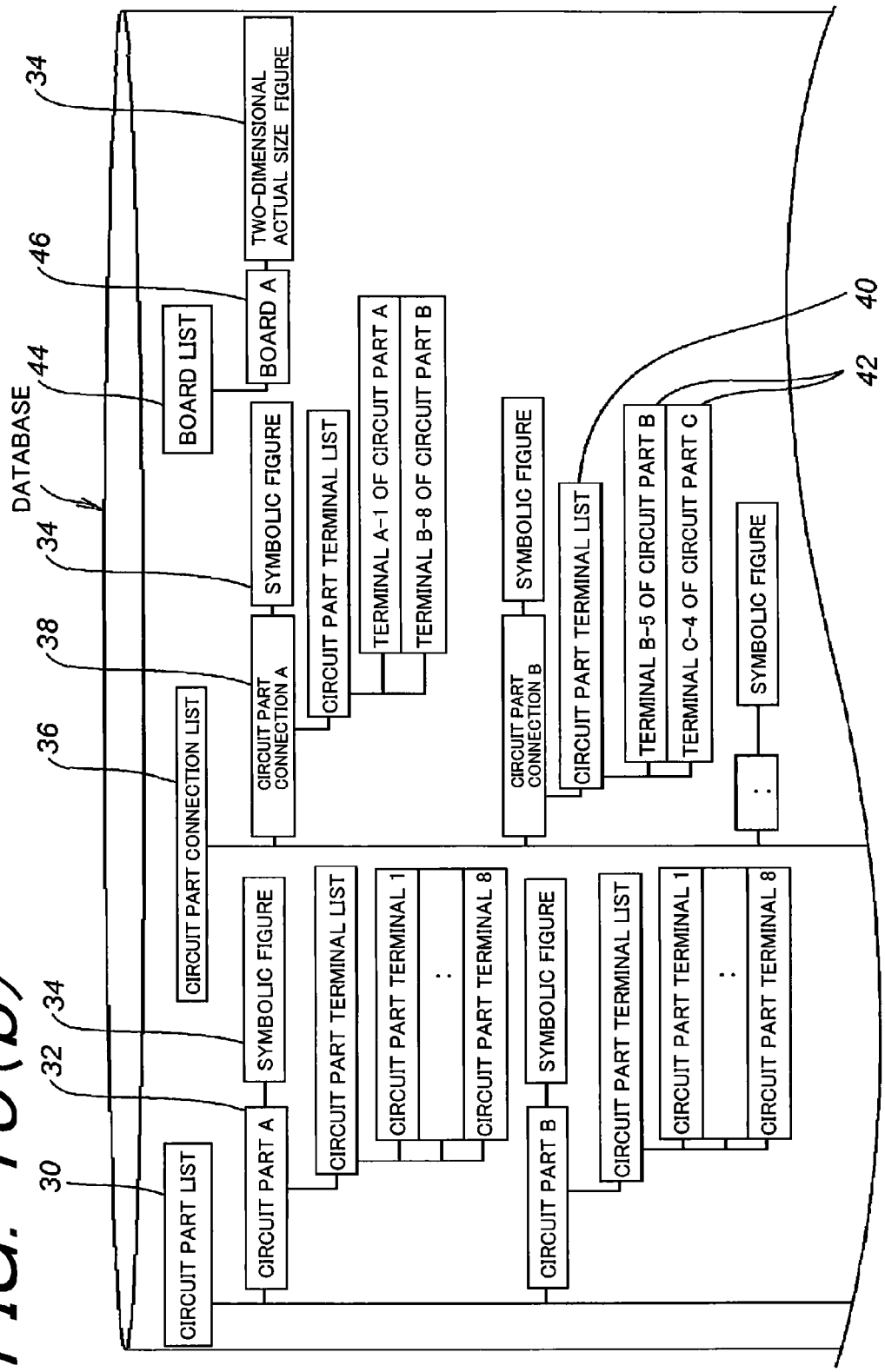
FIG. 10(b) is a conceptual explanatory view showing a data structure inside database in performing board input FIGS. 11(a), (b), (c), (d), and (e) are schematic explanatory views showing a procedure when the designer inputs board by using the mouse.
Figure 11A:
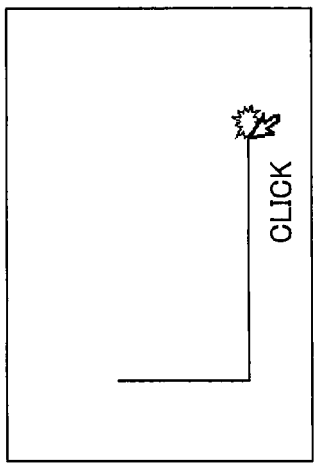
Figure 11B:
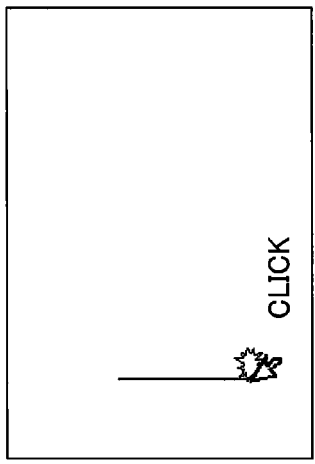
Figure 11C:
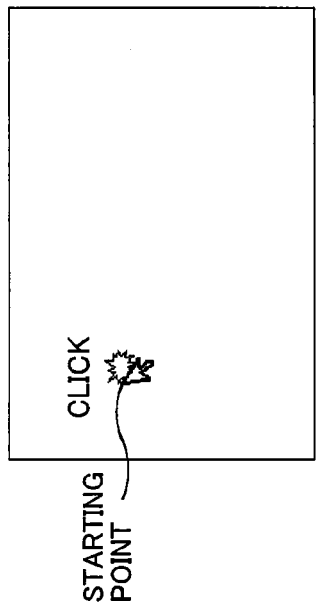
Figure 11D:
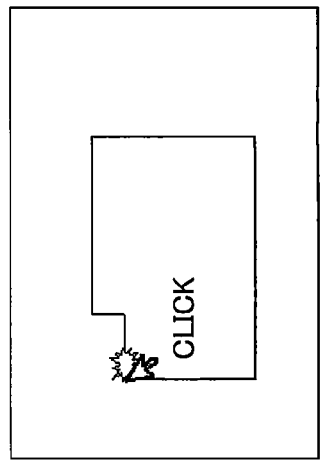
Figure 11E:
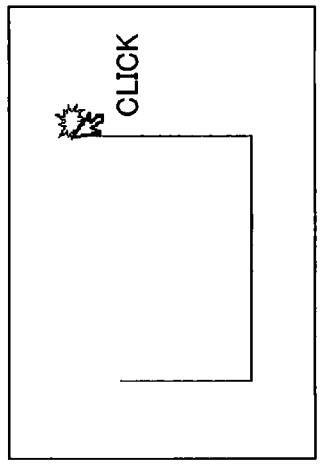

In the processing of step S906, as illustrated in FIG. 10 (*a*), the user inputs the shape of board on the layout design information screen 24*b* by the operation of the pointing device 20 such as mouse. FIG. 11 shows the input procedure of printed circuit board at this point. This input of printed circuit board is sequentially clicking vertexes of board external shape by using the pointing device 20.

The input method of printed circuit board is described in more detail referring to FIG. 11, in which a starting point is clicked first as shown in FIG. 11(*a*), the next vertex is subsequently clicked as shown in FIG. 11(*b*), and a straight line is generated between the clicked points.

Furthermore, click is repeated in the order shown in FIG. 11(*c*) and FIG. 11(*d*), finally returns to the starting point as shown in FIG. 11(*e*), and closing lines are clicked so as to connect them all, and then a board figure having the shape of trace of the pointer of the pointing device 20 as in FIG. 11(*e*) can be completed. Herein, the name of the inputted board should be a board A.

Subsequently, on step S906, the shape of the inputted board A is displayed on the layout design information screen 24*b* as a schematic figure.

It is to be noted that a figure selectable as the display method is the symbolic figure, the two-dimensional actual size figure and the three-dimensional actual size figure in the processing equipment 10, and in this embodiment, the two-dimensional actual size figure of the board A is displayed on the layout design information screen 24*b* because the two-dimensional actual size figure is selected as the display method of board.

Then, when the processing of step S906 ends, procedure advances to step S908, and whether or not the displayed board A is the first printed circuit board in this processing routine is judged on step S908. In this case, since the displayed board A is the first printed circuit board, procedure advances to the processing of step S910.

In the processing of step S910, a board list 44 is built on database as a new list. Then, information that the inputted board has a board name called the board A and the display method is in a two-dimensional actual size figure is stored in the board list 44 as the board information 46 being information relating to printed circuit board.

When the processing of step S910 ends, procedure advances to the processing of step S912, and whether or not a board input command was inputted from outside is judged.

Meanwhile, in this embodiment, two printed circuit boards are designed in addition to the board A and a board input command is inputted from outside in order to input the two printed circuit boards, so that procedure returns from step S912 to step S904, processing on and after step S904 is performed repeatedly again.

Herein, assuming that a board B is inputted by using existing data, procedure advances from the processing of step S904 to the processing of step S914, and reading out of board data from the storage 16 is performed on step S914.

It is to be noted that the existing board data is a board figure that is copied from another design screen and pasted on the layout design screen, a previously designed board that is read out and selected from a storage, or the like.

On step S914, the user selects board data read out from the storage 16, or the user selects and copies board data from inside the storage 16, and a printed circuit board that the user selected or copied is pasted on the layout design information screen 24b.

When the processing of step S914 ends, procedure advances to the processing of step S916, and as the processing of step S916, processing is performed so as to display the printed circuit board that was selected or copied by the above-described method as a schematic figure. In this case, since the two-dimensional actual size figure is selected as the display method of a schematic figure, the board B expressed in the two-dimensional actual size figure is displayed on the layout design information screen 24b.

Since the board B that was displayed in this manner is the second board in this processing routine, it is not judged as the first one in the judgment of step S908, and procedure advances to processing of step S918.

On step S918, the board information 46 is accumulated in the board list 44 that is already built on database, and information that the inputted board has a board name called the board B the display method 34 is in the two-dimensional actual size figure is accumulated in the board information 46.

Then, in this embodiment, since a board input command is inputted from outside in order to further input one more board in addition to the above-described the board A and the board B, procedure returns from step S912 step to S904 to perform processing on and after step S904 repeatedly, and input of a board C is performed by either method of the above-described ones.

Then, on S912, in the case of judgment that there is no board input command from outside, the board input mode is cancelled, and processing routine of board input ends.

Figure 12A:
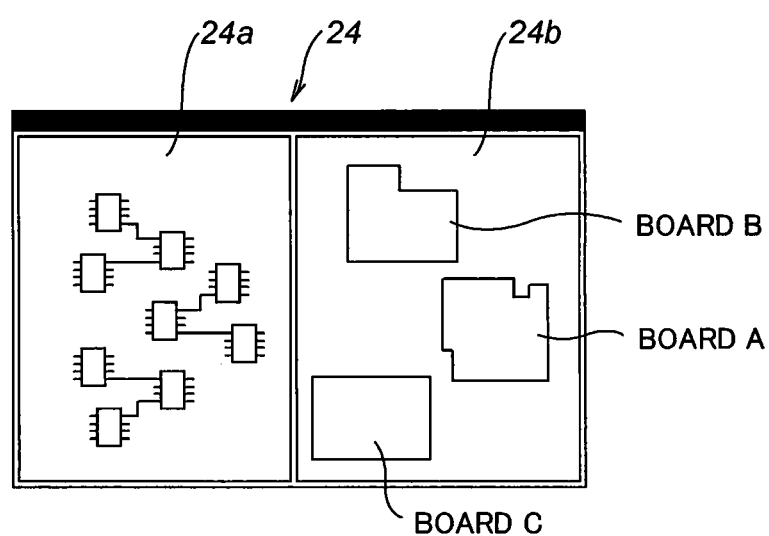
FIG. 12(a) is an explanatory view showing the layout design information screen after board input.
Figure 12B:
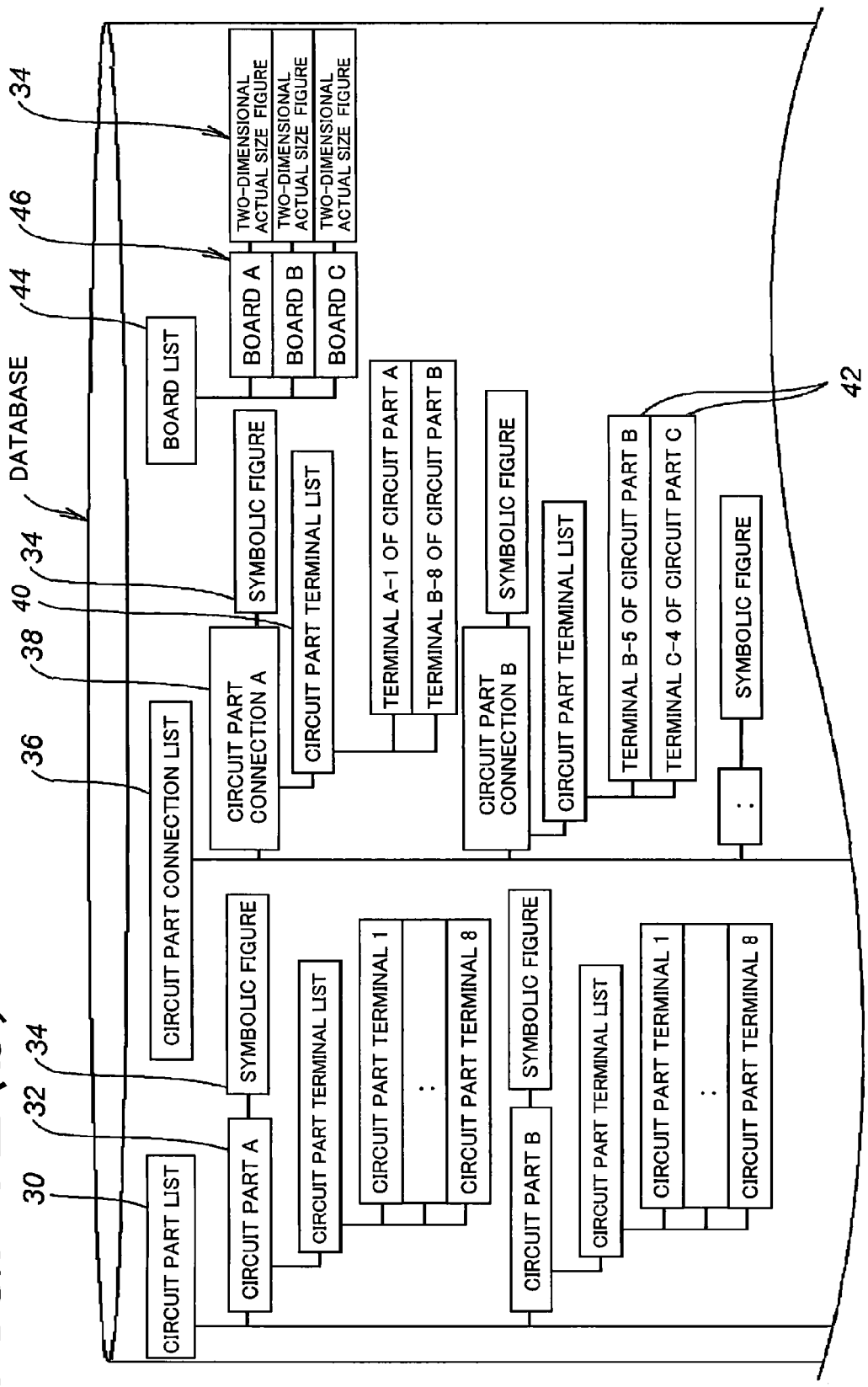
FIG. 12(b) is a conceptual explanatory view showing a data structure inside database after board input.

When such processing routine of board input ends, three boards are displayed on the layout design information screen 24b as shown in FIG. 12(a), and furthermore on database, the board information 46 of the board B and the board C is added in the board list 44 (refer to FIG. 12(b)).

(4) Input of Inter-Board Connection by the User
(Processing Routines when Connection of Board is Performed (FIG. 13))

Figure 13:
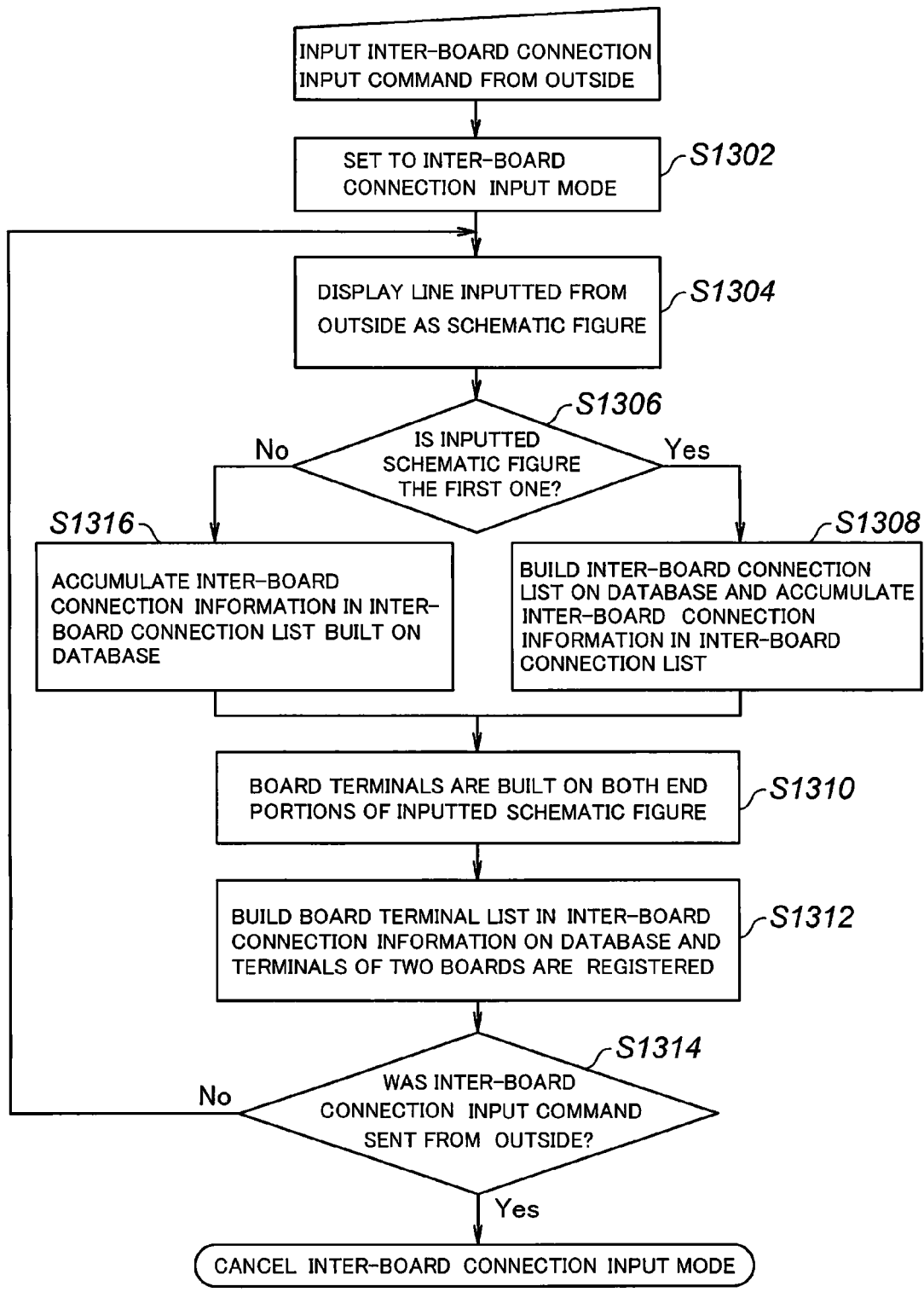
FIG. 13 is a flowchart showing processing routines executed in performing the input of inter-board connection.

FIG. 13 shows the flowchart of processing routines regarding the input of inter-board connection. When the user inputs an inter-board connection input command by using the pointing device 20 or the character input device 22, an inter-board connection input mode in which processing routines when the connection of board is performed are executed becomes ready.

More specifically, when the circuit part input mode is set on step S1302 by inputting the inter-board connection input command using the pointing device 20 or the character input device 22, the user is enabled to input inter-board connection.

Next, an inter-board connection line connecting between boards is inputted by the user's operation of the pointing device 20.

FIG. 15 shows the input method of inter-board connection, and description will be made in detail for the method of inputting inter-board connection line connecting between boards while referring to this FIG. 15.

For example, in the case of connecting two printed circuit boards by inter-board connection on the layout design information screen 24b, the connecting line is inputted so as to connect the two printed circuit boards.

First, a point near the circumference of a printed circuit board is clicked by the pointing device 20 (refer to FIG. 15(a)), the pointer is moved to a printed circuit board, to which connection needs to be made, so as to draw a straight line (refer to FIG. 15(b)), and a point near the circumference of the printed circuit board, to which he/she wants to connect, is clicked by the pointing device 20 (refer to FIG. 15(c)). It is to be noted that explanation that "when building of inter-board connection is succeeded, a board terminal 52 is built at an endpoint node where connection was generated" is inserted in the area of "a" of FIG. 15(c)).

In short, by continuously clicking arbitrary points of the two printed circuit boards, inter-board connection can be inputted. Then, after the inter-board connection was inputted, the board terminals 52 are built at the both end portions of generated connecting line.

Further, it is also possible to connect the existing inter-board connection with a new board, an arbitrary point of the existing inter-board connection figure is clicked by the pointing device 20 (refer to FIG. 15(d)), the pointing device 20 is moved to the printed circuit board, to which he/she wants to connect, so as to draw a straight line (refer to FIG. 15(e)), and a point near the circumference of the printed circuit board, to which he/she wants to connect, is clicked by the pointing device 20 (refer to FIG. 15(f). It is to be noted that explanation that "when building of inter-board connection is succeeded, the board terminals 52 are built at endpoint nodes where connection was generated" is inserted in the area of "β" of FIG. 15(f)).

Furthermore, it is also possible to connect between boards by continuously clicking arbitrary points of the existing inter-board connection by the pointing device 20.

Even in the case where the inter-board connection is built on a newly connected board in this manner, the board terminals 52 are built at the both end portions of the generated connecting line.

When the inter-board connection A was inputted on step S1302, procedure advances to step S1304, and processing is performed on step S1304 such that the shape of the inputted connecting line is displayed on the layout design information screen 24b as a schematic figure. Herein, it is assumed that the name of the inputted inter-board connection is inter-board connection A.

Figure 14A:
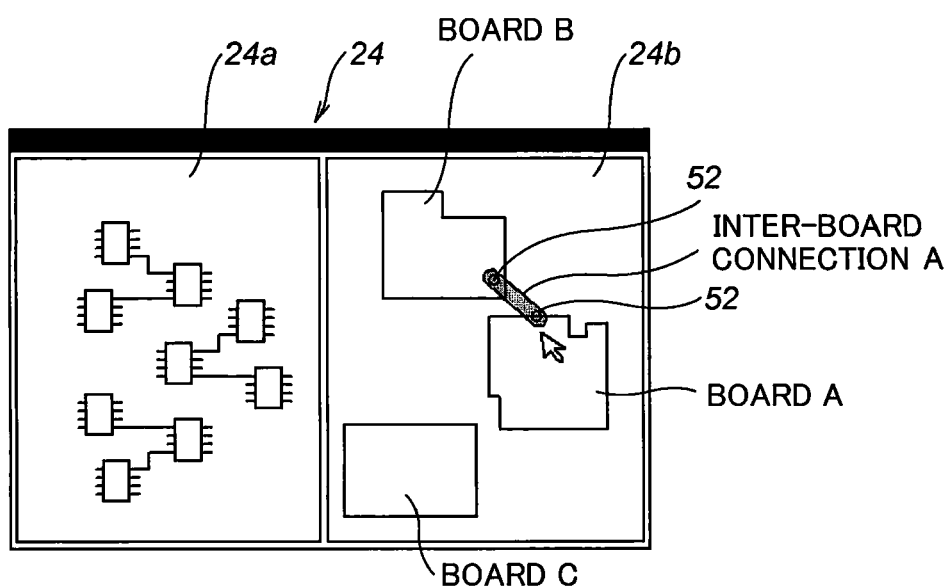
FIG. 14(a) is an explanatory view showing the layout design information screen in inputting inter-board connection.

The inter-board connection A to which such processing was performed is displayed on the layout design information screen 24b as shown in FIG. 14(a).

Meanwhile, in the processing equipment 10 according to the present invention, a figure selectable as the schematic figure of inter-board connection is the symbolic figure, the two-dimensional actual size figure and the three-dimensional actual size figure, and in this embodiment, the two-dimensional actual size figure should be used as the schematic figure of inter-board connection.

When the processing of step S1304 ends, procedure advances to the processing of step S1306, and judgment processing whether or not the inter-board connection A inputted by the above-described procedure is the first input of a schematic figure in this processing routine is performed.

Herein, since the input of the inter-board connection A is the first input of a schematic figure in this processing routine, procedure advances to step S1308.

Figure 14B:
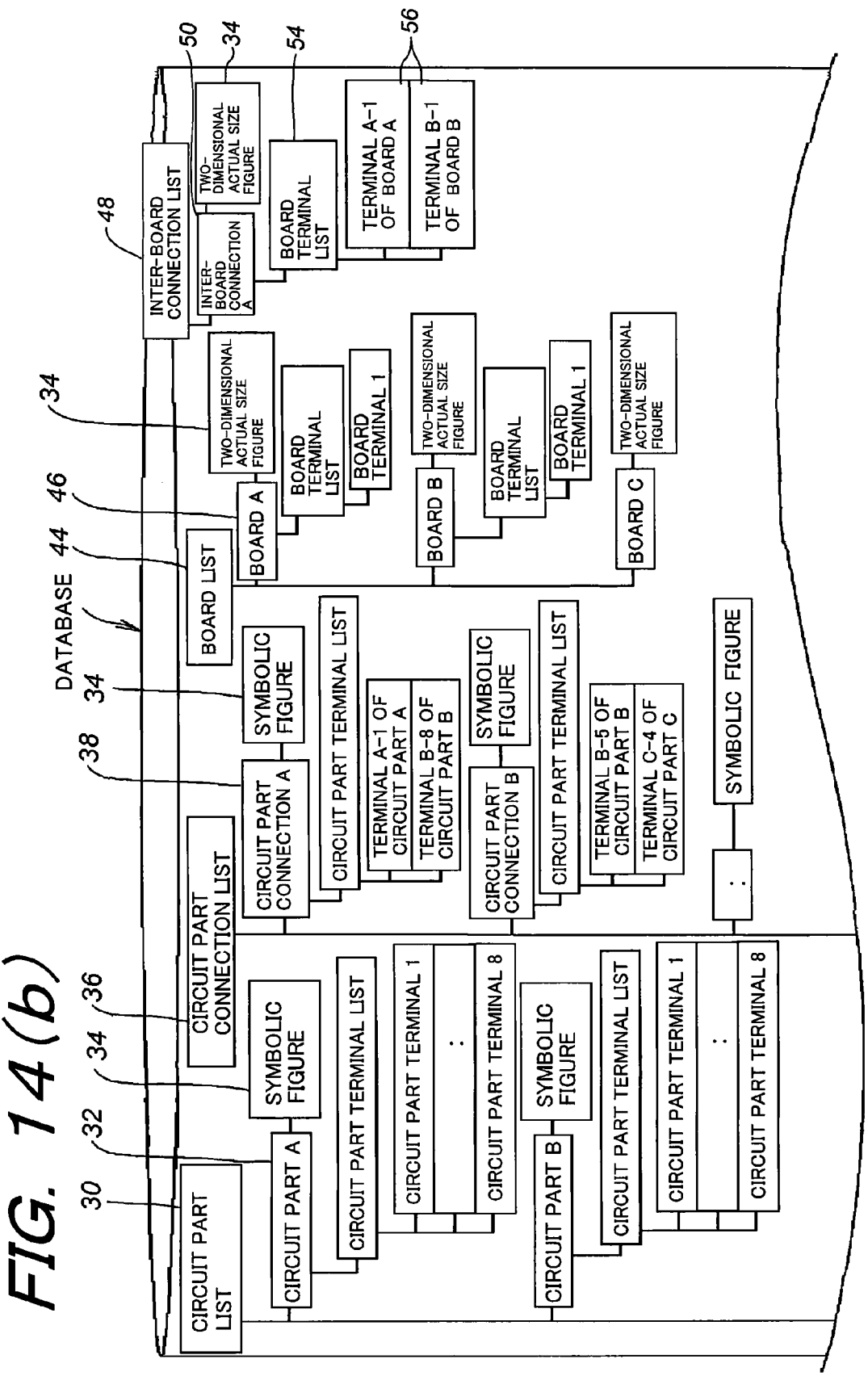
FIG. 14(b) is a conceptual explanatory view showing data a structure inside database in inputting inter-board connection.

On step S1308, as shown in FIG. 14(b), an inter-board connection list 48 is built on database inside the storage 16 first, an inter-board connection information 50 is stored in the inter-board connection list 48, where information that the inputted board has a name being the inter-board connection A and information that a two-dimensional actual size figure is selected as the display method 34 are accumulated.

Then, when the inter-board connection is inputted, the board terminals 52 showing that the connected boards have electrical connection to each other are built on the both end portions of the inter-board connection (step S1310).

Further, the information of the board terminal 52 built on step S1310 is also accumulated on database on step S1312. On step S1312, a board terminal list 54 is newly built in the inter-board connection information 50 on database, and the two board terminals 52 at the both end portions of the inter-board connection A are registered with the board terminal information 56 in the board terminal list 54 as a terminal A-1 of the board A and a terminal B-1 of the board B.

Next, on step S1314, judgment whether or not there is an inter-board connection command inputted from outside is performed. In this embodiment, design is performed in order to provide the inter-board connection between the board B and board C, it is judged that there is the inter-board connection input command outside on step S1314, and procedure returns to S1304 sequentially performed processing.

Then, on step S1314, in the case of judgment that there is no inter-board connection input command from outside, the inter-board connection input mode is cancelled, and processing routines regarding the input of the inter-board connection ends.

Figure 16A:
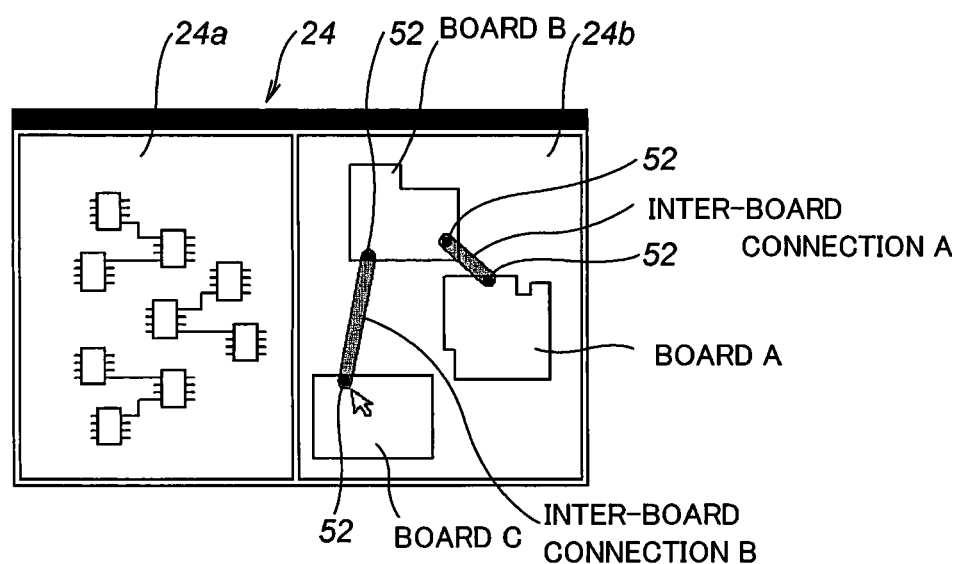
FIG. 16(a) is an explanatory view showing the layout design information screen after inputting inter-board connection.
Figure 16B:
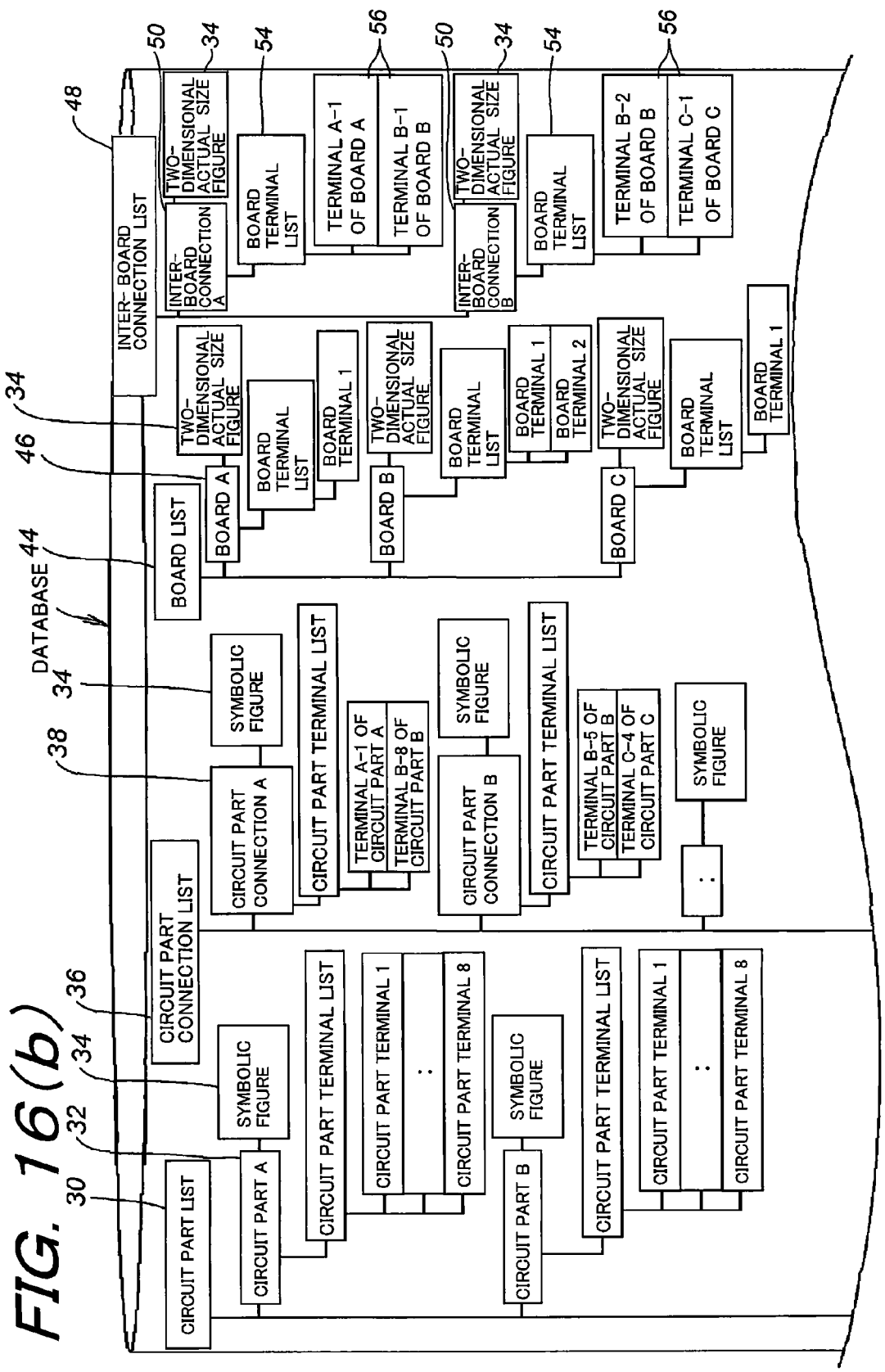
FIG. 16(b) is a conceptual explanatory view showing a data structure inside database after inputting inter-board connection.

FIG. 16 (*a*) shows display on the window 24 in the state where the processing routines, which are performed when the inter-board connection input command is executed, ended, and FIG. 16 (*b*) shows the data structure of database when the input of the inter-board connection ended.

More specifically, since the two inter-board connections (A and B) are provided at the end of the processing routines of the inter-board connection input, the inter-board connection B is added to the inter-board connection list 48 on database as the inter-board connection information 50 comparing with the data structure of FIG. 14(*b*), and furthermore, the board terminal list 54 of the inter-board connection B is built in the inter-board connection information 50, and the two board terminals 52 on the both end portions of the inter-board connection B are accumulated in the board terminal information 56 in the board terminal list 54 of the inter-board connection B as a terminal B-2 of the board B and a terminal C-1 of board C.

By the inter-board connection A that was inputted in this manner, the board A and the board B are electrically connected, and further, the board B and board C are electrically connected by the inputted inter-board connection B.

(5) Input of Mounting Connection by the User
(Processing Routines when Connection Between Board and Circuit Part is Performed (FIG. 17)).

Herein, two types of connection exist in electric parts, which are electric connection showing that the parts have electrical linkage to each other and mounting connection showing that the parts have mount-state linkage to each other.

The connection between circuit parts and connection between boards that were described above are the electric connection out of the two types of connection. On the other hand, the mounting connection means connection in installing circuit parts on board as shown in FIG. 33(*a*) and connection provided to install a board in a enclosure.

Herein, a plurality of methods are possible as a method expressing the state that "circuit parts is mounted on a board". For example, there are a method expressed by layer relation (refer to FIG. 33 (*b*) "method expressed by layer relation"), a method expressed by binding condition (refer to FIG. 33(*c*) "method expressed by binding condition") or a method expressed by connection of mounting terminal (refer to FIG. 33 (*d*) "method expressed by connection of mounting terminal") and the like.

It is to be noted that the binding in the method expressed by binding condition (refer to FIG. 33(*c*) "method expressed by binding condition") is information that two figures must always be included or crossed each other.

Further, a pair in the method expressed by connection of mounting terminal (refer to FIG. 33 (*d*) "method expressed by connection of mounting terminal") is information expressing that two mounting terminals are one set.

A plurality of examples can be given as a method showing the state of mounting connection between the board and circuit parts. In this embodiment, as a method of showing such state of mounting connection, a method in which the state of mounting connection is expressed by building mounting terminals on the board and circuit part and by connecting the board with circuit parts in a mounting manner via the mounting terminals. In this specification, information showing this state of mounting connection is referred to as "mounting connection state information". It is to be noted that a method showing another state of mounting connection will be described later.

In the following, description will be made in detail for the method of building mounting connection.

Figure 17:
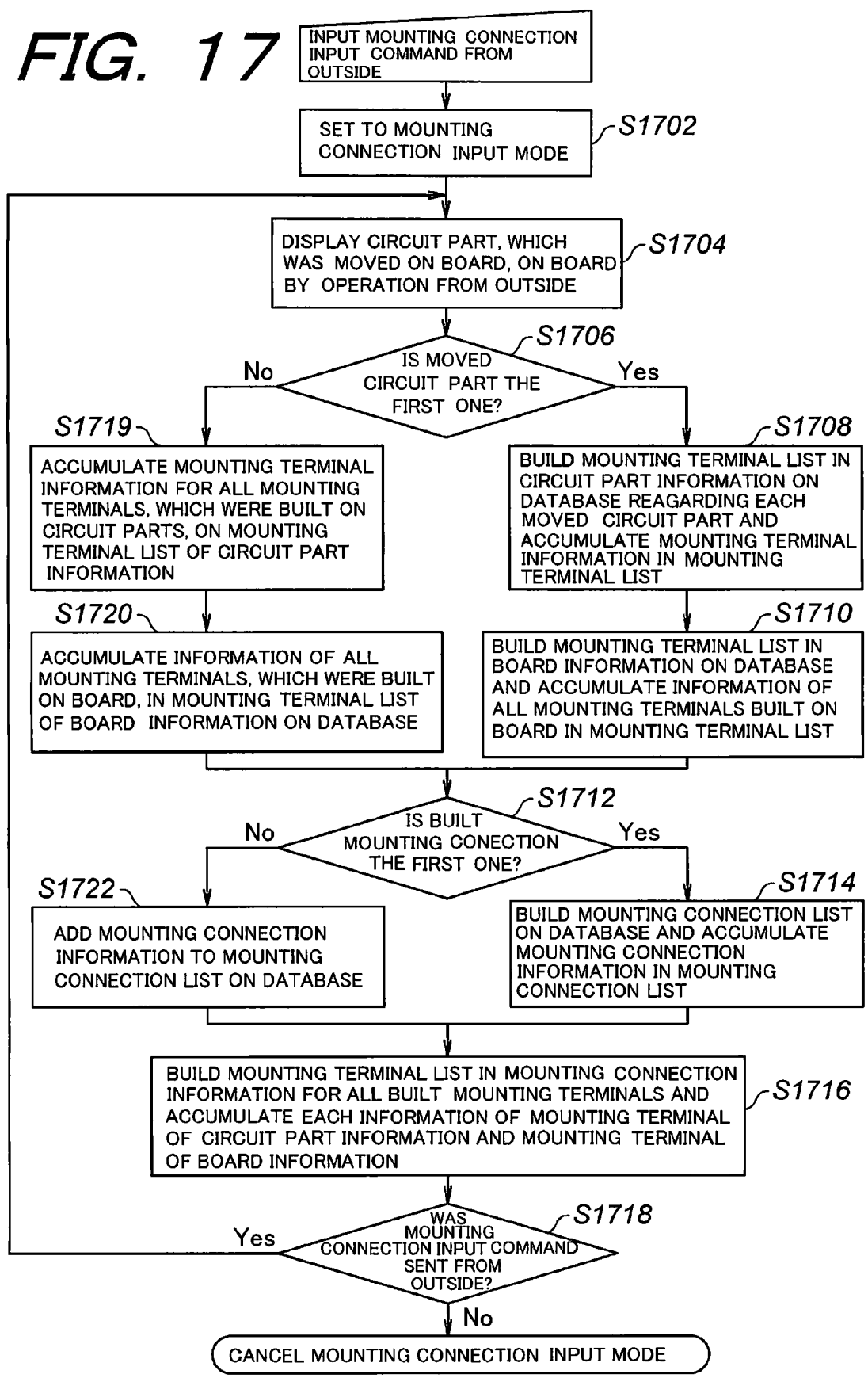
FIG. 17 is a flowchart showing processing routines executed when the input of mounting connection is performed.

FIG. 17 shows the flowchart of the processing routines regarding mount-state connection between circuit parts and a board. When the user inputs a mounting connection input command by using the pointing device 20 or the character input device 22, a mounting connection input mode in which a processing routines when connection between the board and circuit parts is performed is executed becomes ready.

More specifically, the input of a mounting connection input command by using the pointing device 20 or the character input device 22 starts this processing routine, and the mounting connection input mode is set on step S1702.

Next, the user moves a circuit part on printed circuit board by an operation from outside using the pointing device 20 or the like, and the circuit part that was moved on the board is displayed on the board (step S1704).

Figure 18A:
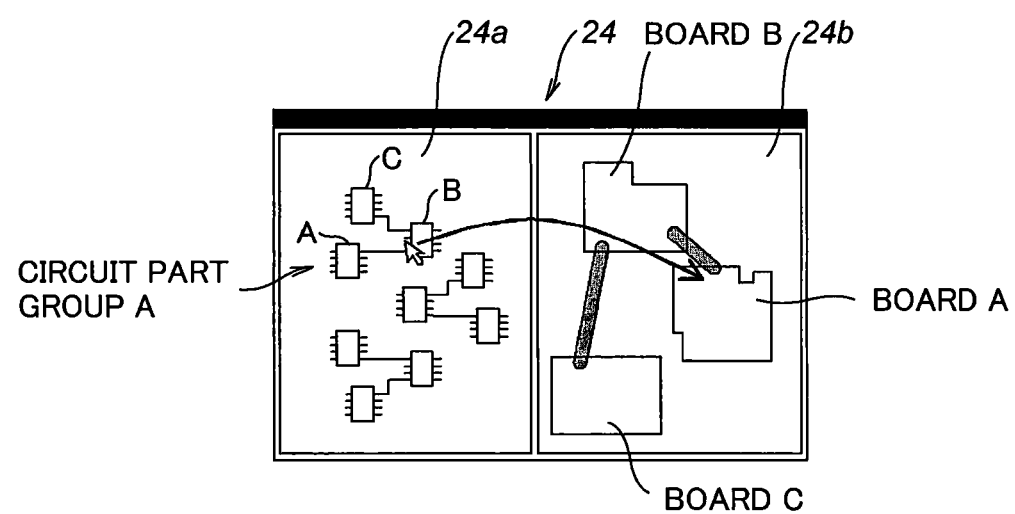
FIG. 18(a) is an explanatory view showing a circuit design screen and the layout design information screen in inputting mounting connection.
Figure 18B:
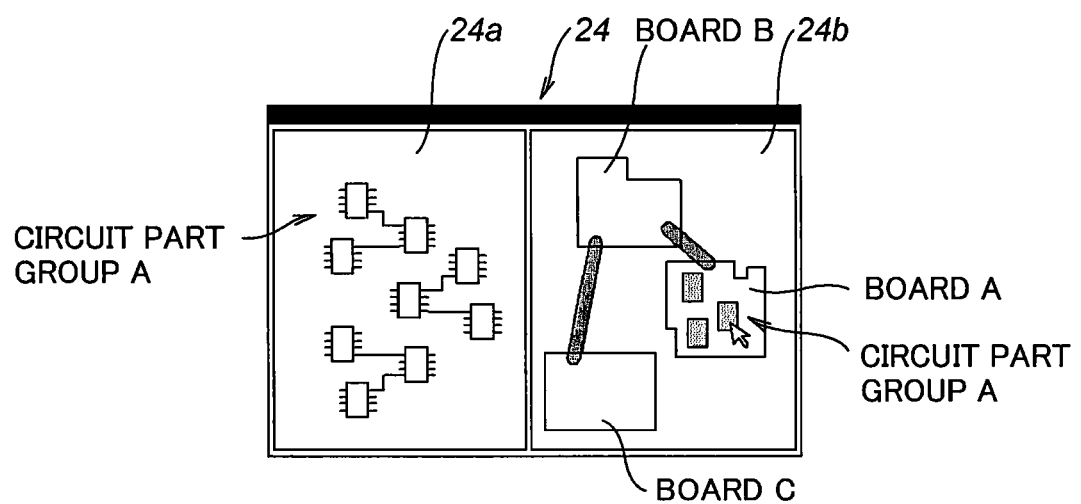
FIG. 18(b) is an explanatory view showing the circuit design screen and the layout design information screen in inputting mounting connection.

Specifically, the user selects a circuit part group and a printed circuit board that he/she wants to connect in a mounting manner, clicks inside the range of the circuit part group displayed on the circuit design information screen 24*a* by using the pointing device 20 and moves it while it is kept on clicking (refer to FIG. 18(*a*)), moves into the range of a printed circuit board, on which he/she want to mount the part, on the layout design information screen 24*b*, and cancels click (refer to FIG. 18(*b*)). In the embodiment shown in these FIGS. 18(*a*)(*b*), the above-described operation allows a circuit part group A to be connected with the board A, and the selected circuit part group A is displayed on the board A (refer to FIG. 18(*b*)).

When the processing of step S1704 ends, procedure advances to the processing of step S1706, judgment whether or not the circuit part group A moved on the printed circuit board is the first circuit part moved in this processing routine is performed.

In this embodiment, the circuit part group A is the first circuit part group moved, so procedure advances from step S1706 to step S1708.

Herein, in the mounting connection of the circuit part group A and the board A, the circuit part group A has three of the circuit part A, the circuit part B and the circuit part C, so that mounting connection is built between the circuit parts and the printed circuit board. It is assumed that mounting connection built between the circuit part A and the board A be a mounting connection A, mounting connection built between the circuit part B and the board A be a mounting connection B, and mounting connection built between the circuit part C and the board A be a mounting connection C.

On step S1708, for all circuit parts moved, a mounting terminal list is built in each circuit part information of the parts on database, and the mounting terminal information is stored in the mounting terminal list.

More particularly, a mounting terminal list 58 is newly built in the circuit part information 32 of the circuit part A in the circuit part list 30 that is already built on database, and the information of a mounting terminal A-A built in the circuit part A is accumulated in the mounting terminal list 58 of the circuit part A as mounting terminal information 60.

Similarly, the mounting terminal list 58 is newly built in the circuit part information 32 of the circuit part B, and the information of a mounting terminal B-A built in the circuit part B is accumulated in the mounting terminal list 58 of the circuit part B as the mounting terminal information 60.

Furthermore similarly, the mounting terminal list 58 is newly built in the circuit part information 32 of the circuit part C, and the information of a mounting terminal C-A built in the circuit part C is accumulated in the mounting terminal list 58 of the circuit part C as the mounting terminal information 60.

Thus, on step S1708, mounting terminals necessary for mounting connection are built on each of the three circuit parts that belong to the circuit part group A.

When the processing of step S1708 ends, procedure advances to the processing of step S1710, a mounting terminal list 62 is newly built in the board information 46 of the board A in the board list 44 that is already built on database, and furthermore, in the mounting terminal list 62, the information of a mounting terminal A-a built on the board A as the mounting terminals of the mounting connection A being connection between the board A and the circuit part A, a mounting terminal A-b built on the board A as the mounting terminal of the mounting connection B being connection between the board A and the circuit part B, and a mounting terminal A-c built on the board A as the mounting terminal of the mounting connection C being connection between the board A and the circuit part C is accumulated as board mounting terminal information 64.

When the processing of step S1710 ends, procedure advances to the processing of step S1712, and judgment processing whether or not the mounting connection inputted between the board and the circuit part group is the first mounting connection in this processing routine is performed.

In the judgment processing of step S1712, in the case where the mounting connection inputted between the board and the circuit part group is judged to be the first mounting connection in this processing routine, procedure advances to the processing of step S1714, a mounting connection list 66 is newly built on database, the mounting connection A is accumulated in the mounting connection list 66 as the mounting connection information 68, the mounting connection B is accumulated in the mounting connection list 66 as mounting connection information 68 similarly, and the mounting connection C is stored in the mounting connection list 66 as the mounting connection information 68 similarly.

Figure 18C:
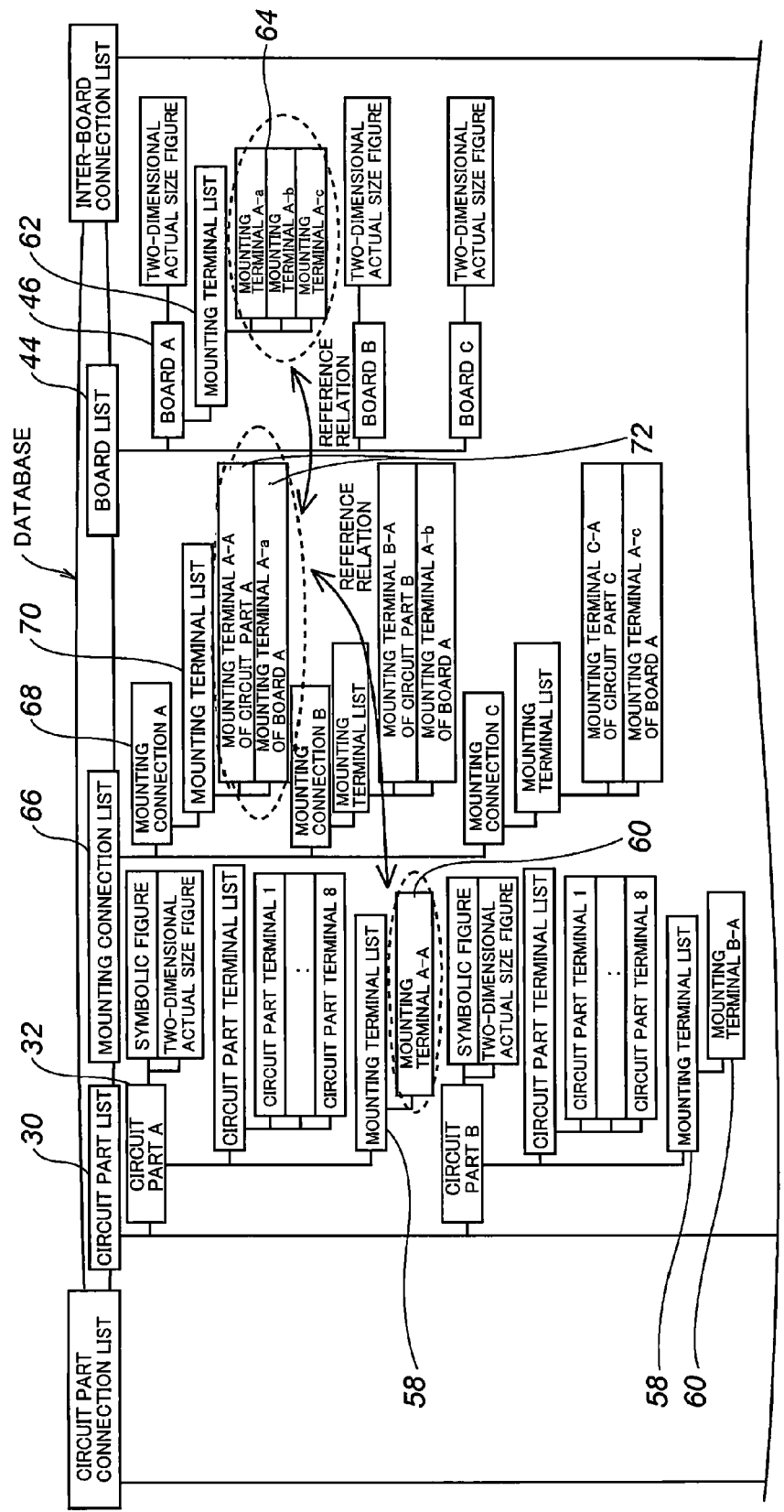
FIG. 18(c) is a conceptual explanatory view showing a data structure inside database during mounting connection input.

When the processing of step S1714 ends, procedure advances to the processing of step S1716, a mounting terminal list 70 is built in the mounting connection information 68 of the mounting connection A in the mounting connection list 66, and mounting terminal information 72 is accumulated in the mounting terminal list 70, the mounting terminal A-A built in the circuit part A and the mounting terminal A-a built on the board A are accumulated as this mounting terminal information 72, the mounting terminal list 70 is built in the mounting connection information 68 of the mounting connection B in the mounting connection list 66, the mounting terminal information 72 is accumulated in the mounting terminal list 70, a mounting terminal B-A built in the circuit part B and a mounting terminal A-b built on the board A are accumulated as this mounting terminal information 72, the mounting terminal list 70 is built in the mounting connection information 68 of the mounting connection C in the mounting connection list 66, the mounting terminal information 72 is accumulated in the mounting terminal list 70, and a mounting terminal C-A built in the circuit part C and a mounting terminal A-c built on the board A are stored as this mounting terminal information 72 (refer to FIG. 18(c)).

It is to be noted that the mounting terminal A-A and the mounting terminal A-a, which are accumulated on the mounting terminal list 70 in the mounting connection information 68, are the mounting terminal A-A built on the circuit part group A and the mounting terminal A-a built on the board A respectively, the mounting connection A registered with the mounting connection information 68 shows a connection connecting the mounting terminal A-A with the mounting terminal A-a, and the same applies to the mounting connection B and the mounting connection C.

Figure 20:
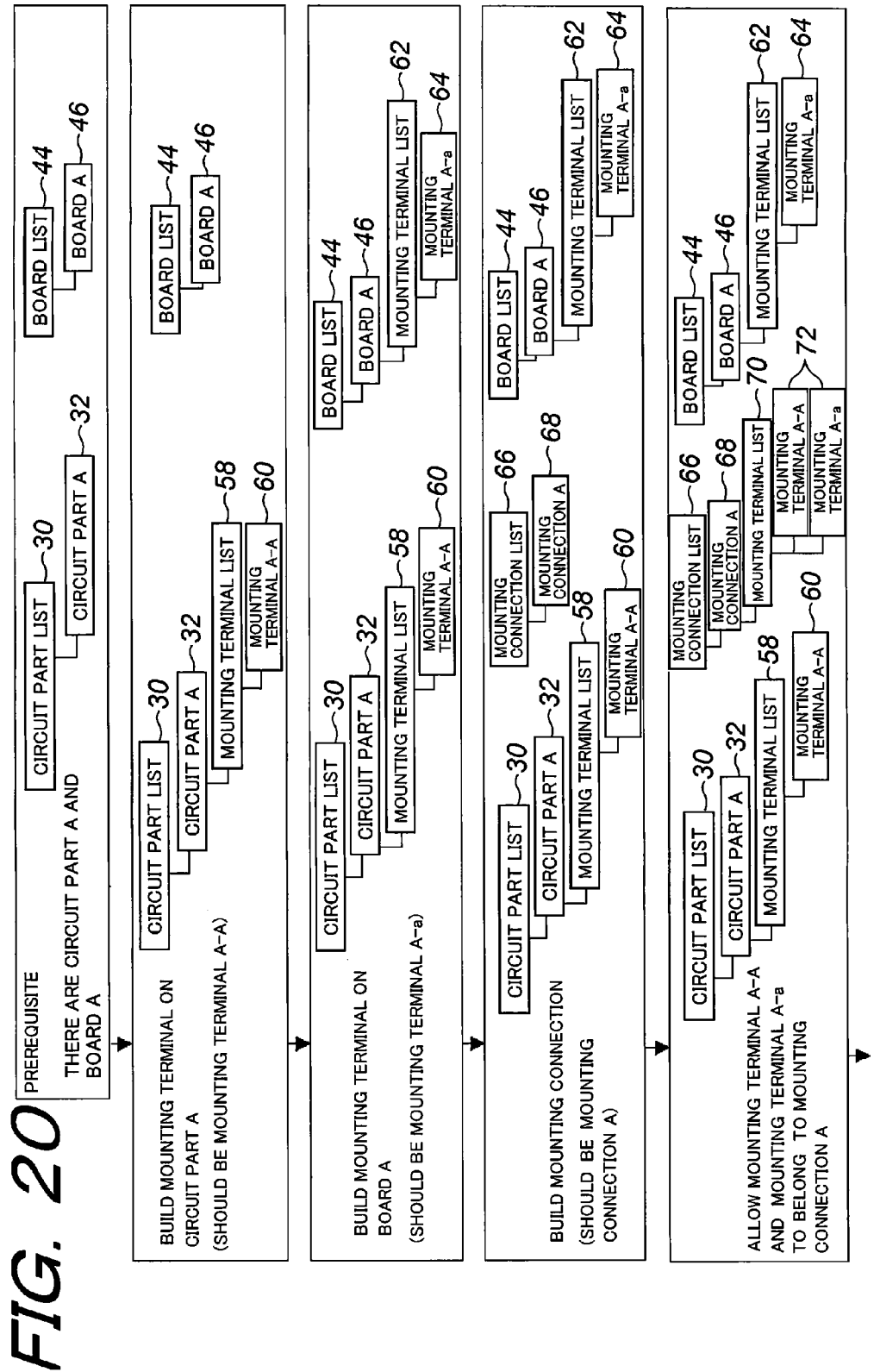
FIG. 20 shows mounting connection information built on database mounting connection is made between the circuit part A and the board A.

Further, FIG. 20 shows how data structure on database changes, which is accumulated when mounting connection between the circuit part A and the board A is built.

When the processing of step S1716 ends, procedure advances to the processing of step S1718, and whether or not another mounting connection input command exists is judged.

In this embodiment, since another mounting connection input command exists in order to connect the other two circuit part groups to the board, judgment is made that another mounting connection input command exists on step S1718, and processing on and after step S1704 is performed repeatedly.

Herein, supposing that a circuit part group B and the board B are allowed to make mounting connection, movement of the circuit part group B onto the board B is performed by an operation of the user, and on step S1704, the circuit part group B is displayed on the board B on the layout design information screen 24b. Herein, since the two-dimensional actual size figure is selected as the display method, the circuit part group B is displayed on the layout design information screen 24b in the two-dimensional actual size figure here.

In the mounting connection between the board B and the circuit part group B, the circuit part group B has three of the circuit part D, the circuit part E and the circuit part F, so that mounting connection is severally built between the three circuit parts and the board. It is assumed that mounting connection built between the circuit part D and the board B be mounting connection D, mounting connection built between the circuit part E and the board B be a mounting connection E, and mounting connection built between the circuit part F and the board B be a mounting connection F.

Next, the moved circuit part is not judged to be the first one on step S1706, procedure advances from step S1706 to step S1719, the mounting terminal list 58 is newly built in the circuit part information 32 of the circuit part D in the circuit part list 30 on database, and the information of a mounting terminal D-A built in the circuit part D is accumulated as the mounting terminal information 60 in the mounting terminal list 58 in the circuit part D on step S1719.

Similarly, the mounting terminal list 58 is newly built in the circuit part information 32 of the circuit part E, and the information of a mounting terminal E-A built in the circuit part E is accumulated in the mounting terminal list 58 of the circuit part E as the mounting terminal information 60.

Similarly, the mounting terminal list 58 is newly built in the circuit part information 32 of the circuit part F, and, information of mounting terminal F-A built in the circuit part F is accumulated in the mounting terminal list 58 of the circuit part F as the mounting terminal information 60.

Thus, on step S1719, mounting terminals necessary for mounting connection are built on each of the three circuit parts that belong to the circuit part group B.

Furthermore, on step S1720, the mounting terminal list 62 is built in the board information 46 of the board B on database, and information of a mounting terminal B-a, a mounting terminal B-b and a mounting terminal B-c being three mounting terminals built on the board B are accumulated.

After that, since judgment is made that the built mounting connection is not the first one on step S1712, procedure advances from step S1712 to step S1722, and processing of adding the mounting connection B as a new mounting connection information 68 to the mounting connection list 66 already built on database is performed on step S1722.

When the processing of step S1722 ends, procedure advances to the processing of step S1716, and on step S1716, the information of a mounting connection D is newly accumulated in the mounting connection information 68 inside the already built mounting connection list 66, a new mounting terminal list 70 is built in the mounting connection information 68 of the mounting connection D, and the information of a mounting terminal D-A built in the circuit part D and information of mounting terminal B-a built on the board B are accumulated as the mounting terminal information 72.

Further, in the mounting connection list 66, the information of a mounting connection E is newly built in the mounting connection information 68, a new mounting terminal list 70 is built in the mounting connection information 68 of the mounting connection E, the information of a mounting terminal E-A built on the circuit part E and the information of the mounting terminal B-b built on the board B are accumulated as the mounting terminal information 72.

Further, in the mounting connection list 66, the information of a mounting connection F is newly built in the mounting connection information 68, a new mounting terminal list 70 is built in the mounting connection information 68 of the mounting connection F, and the information of a mounting terminal F-A built in the circuit part F and the information of the mounting terminal B-c built on the board B are accumulated as the mounting terminal information 72.

Then, when the processing of step S1716 ends, procedure advances to the processing of step S1718, judgment whether or not another command of mounting connection input exists is performed on step S1718.

In this embodiment, since a mounting connection input command for performing the processing of mounting connection between the circuit part group C and the board C exists, judgment is made that another mounting connection input command exists on step S1718, and processing on and after step S1704 is performed repeatedly.

Then, similar to the case of the processing of mounting connection between the circuit part group B and the board B, procedure returns to step S1704 and the processing of mounting connection between the circuit part group C and the board C is performed.

Furthermore, on step S1718, in the case of judgment that there is no mounting connection input command, the mounting connection input mode is cancelled, and the processing routine regarding mount-state connection of the circuit parts and the board ends.

Figure 19A:
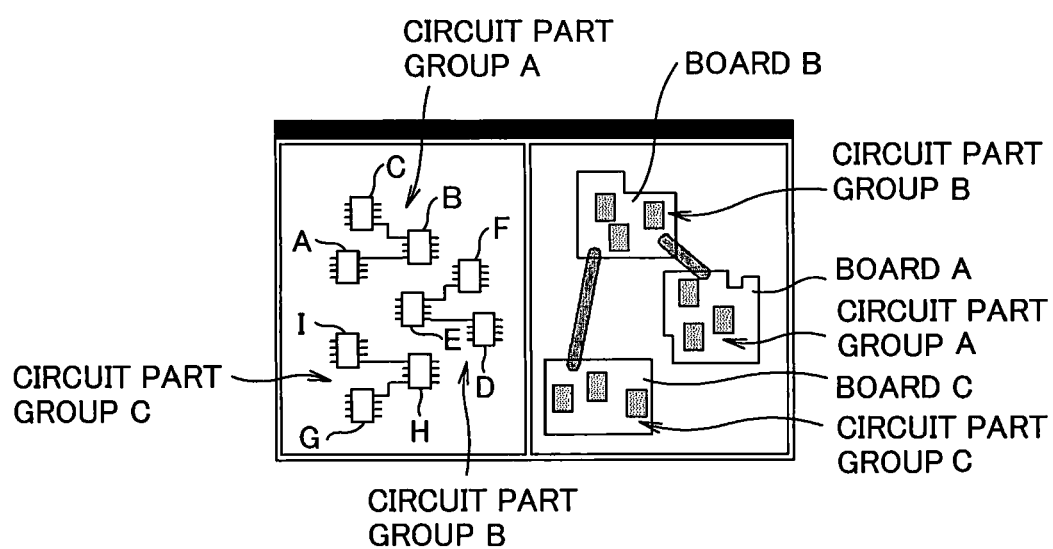
FIG. 19(a) is an explanatory view showing the circuit design screen and the layout design information screen after finishing mounting connection input.
Figure 19B:
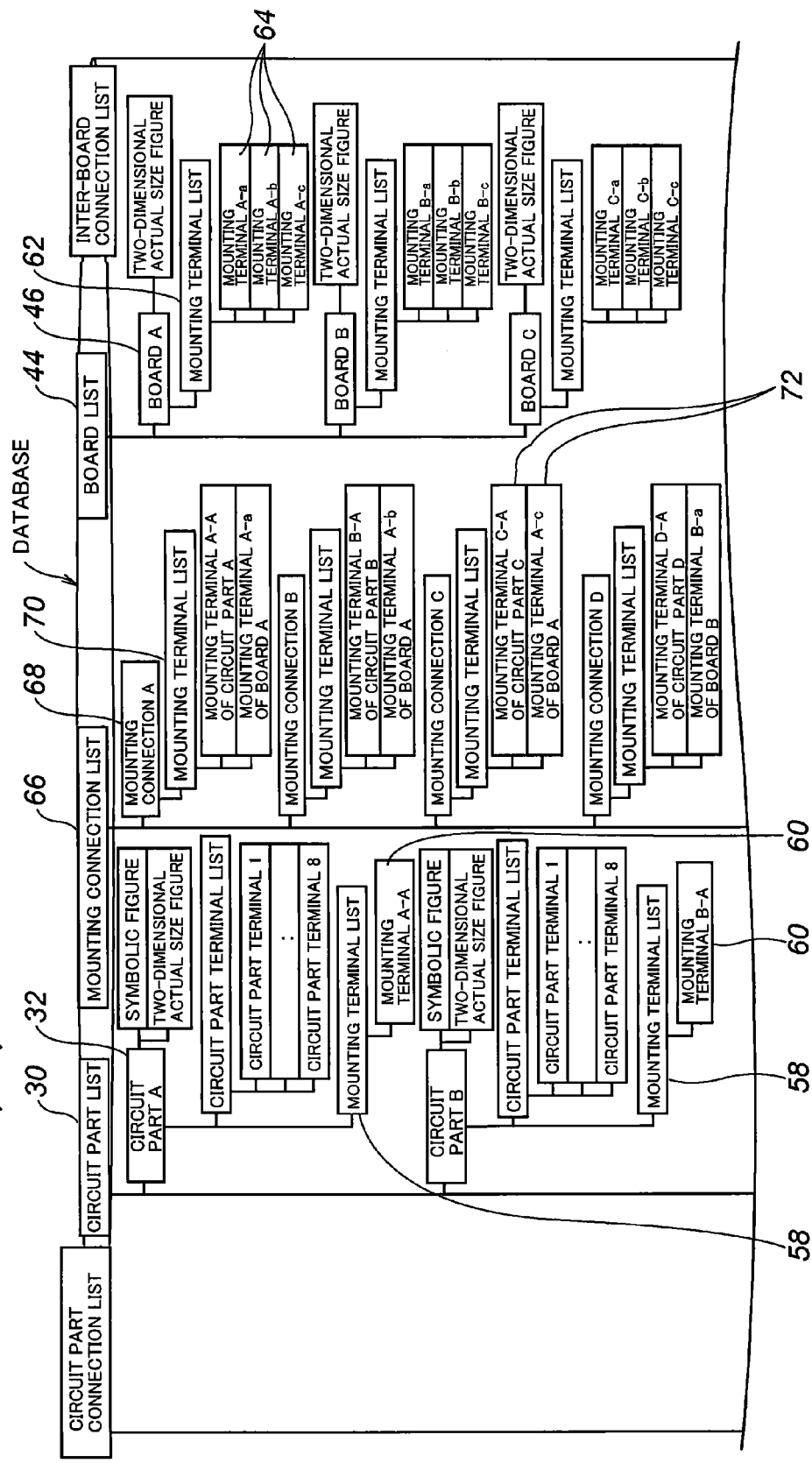
FIG. 19(b) is a conceptual explanatory view showing a data structure inside database after finishing mounting connection input.

Herein, regarding the connection of the circuit part group C and the board C, when the processing to step S1716 ends, a screen is displayed as shown in FIG. 19(*a*), and the fact that each circuit part group is connected in a mounting manner on each board can be seen on the screen as well.

Further, FIG. 19(*b*) shows a part of the data structure in database after the processing routine of mounting connection ended.

(6) Display of Connection Information (Rats)
(Processing Routines in Displaying Inter-Circuit-Part Connection on Board (FIG. 21))

Figure 21:
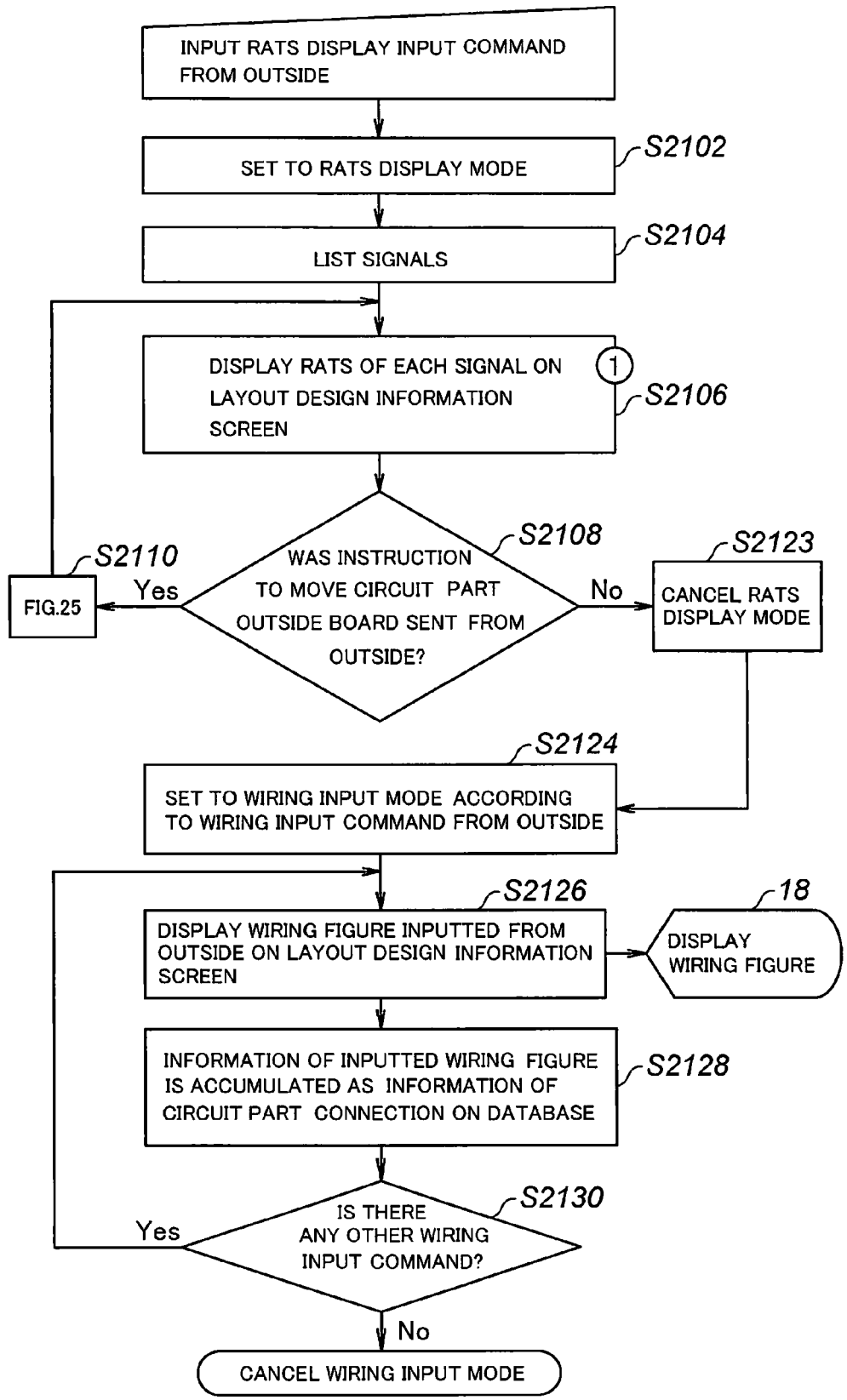
FIG. 21 is a flowchart showing processing routines executed when rats display and wiring input are performed.

FIG. 21 shows the flowchart of processing routines regarding connection information (rats) display.

More specifically, in the case where the user inputted a rats display command, a rats display mode is set on step S21012. It is to be noted that read-out of data for rats display use being the data of rats display stored in the storage 16 is performed when the rats display mode is set. Herein, the data for rats display use shows electrical connection information, specifically, and such data for rats display use is accumulated inside the storage 16.

Next, on step S2104, processing of listing signals on circuit part and on board is performed. Herein, the signals show connection information connecting a terminal with a terminal and connection information connecting a board with a board, and connection between terminals and between boards are listed on step S2104.

Then, on step S2106, rats of listed signals are displayed on the layout design information screen 24*b*. Herein, it is assumed that the two-dimensional actual size figure is elected as a display method. FIG. 22(*a*) illustrates a screen on which rats are displayed.

It is to be noted that even more detail processing contents of the processing contents executed on step S2106 are expressed in the flowcharts shown in FIG. 23 and FIG. 24.

The processing routine regarding display of rats advances from step S2106 to step S2108, and the detail processing contents regarding rats display on step S2106 will be described referring to the flowcharts shown in FIG. 23 and FIG. 24.

First, FIG. 23 shows the processing routines in displaying rats. FIG. 23(*a*) shows the processing routines of wiring information input, which is shown in FIG. 21, by taking out a part of the routines. Display of rats is performed in routines that signals are listed (step S2104) and rats of the listed signals are displayed (step S2106).

The detail procedure of the processing of displaying rats of each signal on step S2106 is expressed in the flowchart shown in FIG. 23(*b*).

More specifically, FIG. 23(*b*) shows the detail processing routines of step S2106. To display rats of each signal, processing of listing terminals that belong to signals by each board is performed first on step S2106-2. Terminals of signal are listed on boards.

Then, on subsequent step S2106-4, rats between circuit parts in each board are built.

Herein, regarding the processing of building rats between circuit parts, which is performed on step S2106-4, the flowchart in FIG. 23(*c*) shows detail processing.

Description will be made referring to the flowchart shown in FIG. 23(*c*). To build rats between circuit parts in each board, processing that routes connecting all terminals that exist in the board are computed and one having the state of the shortest total sum of route lengths is selected from them is performed on step S2106-6.

Figure 24A:
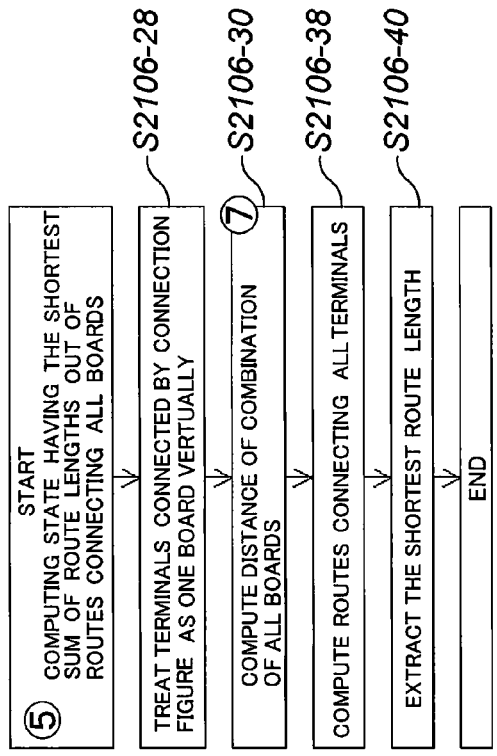
FIG. 24 shows a processing in the case of displaying rats on step S2106 of FIG. 21 in detail.

Furthermore, FIG. 24(a) shows a detail processing routine for the processing of step S2106-6, and as the processing of computing routes connecting all terminals that exist in the board and selecting one having the state of the shortest total sum of route lengths from them, terminals connected by connecting line should be virtually regarded as one terminal on step S2106-8, and combined distance of all terminals is computed on subsequent step S2106-10.

Figure 24B:
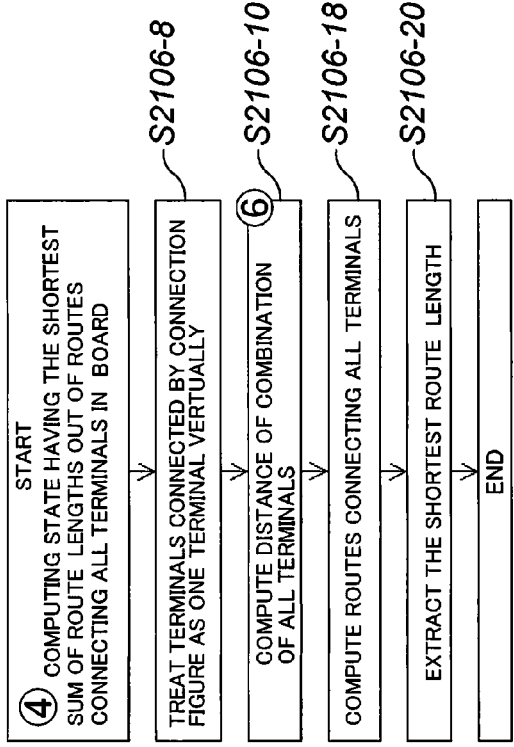

FIG. 24(b) shows further detail processing routines for the processing of this step S2106-10, and a constituent point of each terminal is extracted in order to obtain the combined distance of all terminals (step S2106-12).

Then, on step S2106-14, the shortest distance between constituent points is extracted.

Further, on step S2106-16, processing is done such that the combination of extracted constituent points are treated as a route. Thus, the processing of computing the combined distance of all terminals is performed.

When the processing of FIG. 24(b) ends, processing routine advances to step S2106-18 of the processing routines in FIG. 24(a).

On step S2106-10, once the combined distance of all terminals is computed, processing of computing all routes connecting all terminals is performed on subsequent step S2106-18.

Furthermore, processing is performed so as to extract one that is set to the shortest route length out of them (step S2106-20).

When the processing of computing the state of the shortest total sum of route lengths out of routes connecting all terminals in the board, which is shown in FIG. 24(a), ended, processing routine advances to subsequent step S2106-22 because it means that the processing of step S2106-6 shown in FIG. 23(c) ended.

On step S2106-22, a route having the state of the shortest computed total sum of route lengths is displayed by a plurality of straight line figures.

Because the processing routine of building rats between circuit parts in each board, which is shown in FIG. 23(c), ends, it means that step S2106-4 shown in FIG. 23(b) ended, and procedure advances to subsequent step S2106-24.

On step S2106-24, processing of building rats between boards in each board block is performed.

The detail processing procedure of the processing of this step S2106-24 is shown in FIG. 23(d).

To build rats between boards, the processing of computing the state of the shortest total sum of route lengths out of routes connecting all the board blocks is performed first on step S2106-26.

Figure 24C:
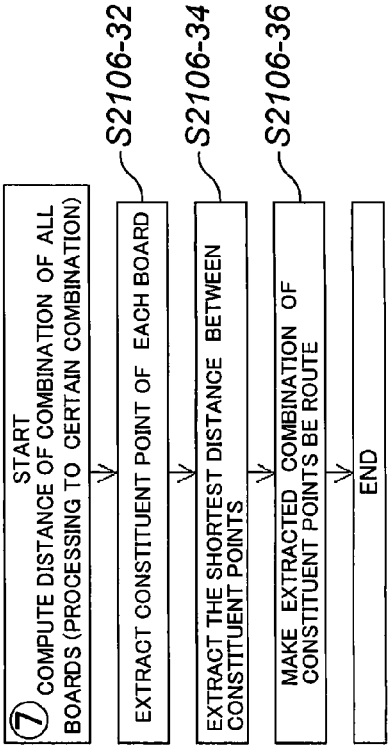

The processing of this step S2106-26 is also further explained in more details in FIG. 24(c).

To compute the state of the shortest total sum of route lengths out of routes connecting all boards, processing of treating boards connected by connection figures as virtually one board is performed on step S2106-28.

Figure 24D:
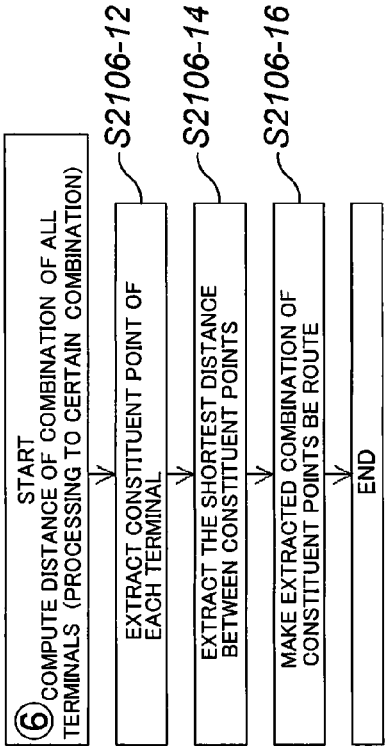

Then, on step S2106-30, the combined distance of all boards is computed. The details of this step S2106-30 are shown in FIG. 24(d). To compute the combined distance of all boards, constituent points of each board are extracted first (step S2106-32).

Then, on the next step S2106-34, the shortest distance between constituent points is extracted, further more on step S2106-36, processing that the combination of extracted constituent points is made to be a route is performed.

When the processing for computing the combined distance of all boards shown in FIG. 24(d) ended, procedure advances to step S2106-38 (refer to FIG. 24(c)), and all routes connecting all boards are computed.

Then, on step S2106-40, one having the shortest route length is extracted, and processing for computing the state of the shortest total sum of route lengths out of routes connecting all boards ends.

Processing advances to step S2106-42 shown in FIG. 23(d), and the computed route is displayed by a plurality of straight line figures.

Thus, the processing of building rats between boards shown in FIG. 23(d) ends, and simultaneously, the processing of displaying rats of each signal shown in FIG. 23(b) ends, so that the processing on step S2106 that connection information (rats) of each signal shown in FIG. 21 and FIG. 23(a) is displayed on the layout design information screen ends.

Next, procedure advances to step S2108 (refer to FIG. 21), and judgment whether or not the user made an instruction to move a circuit part outside board is performed.

Herein, in the case where inconvenience occurs on board due to the arrangement of circuit parts or displayed rats, positions of circuit parts arranged on board can be changed.

In this embodiment, movement of the circuit part A crossing over boards from the board A to the board B is performed, judgment is made on the judgment processing of step S2108 that the user made an instruction to move a circuit part outside board, and procedure advances to the processing of step S2110.

Figure 22A:
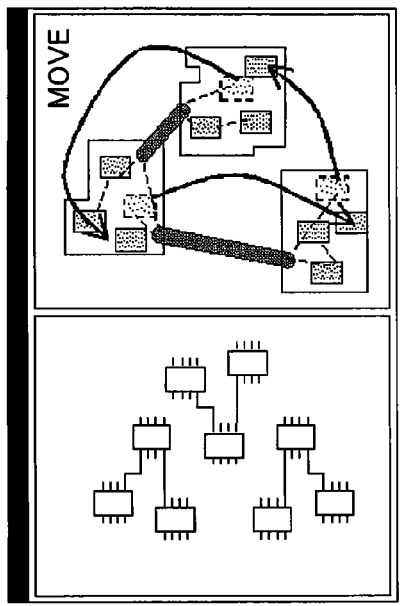
FIG. 22(a) illustrates the circuit design information screen and the layout design information screen in displaying rats display.
Figure 22B:
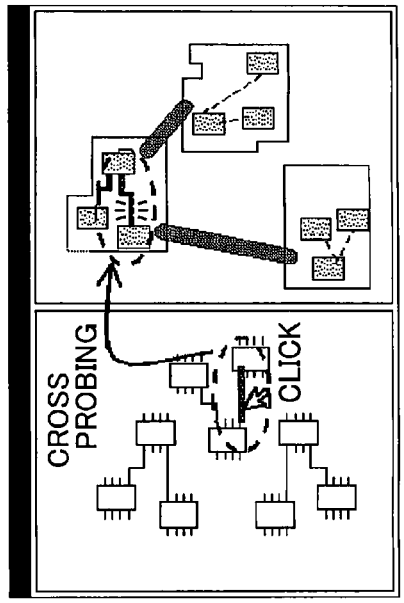
FIG. 22(b) illustrates how the positions of circuit parts are changed after rats display.
Figure 22C:
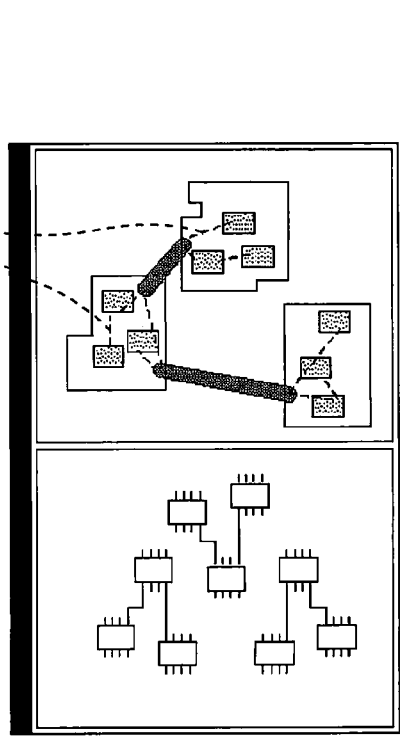
FIG. 22(c) illustrates a display after wiring input is performed.
Figure 22D:
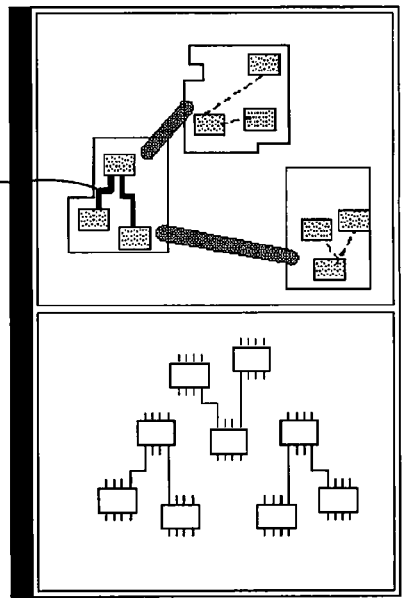
FIG. 22(d) illustrates relation between the circuit design information screen and the layout design information screen.

Herein, FIG. 22(b) illustrates how a circuit part is moved to a board different from the original board. Instruction of movement is made by drag and drop by the user's operation of the pointing device 20.

FIG. 25 shows the flowchart on step S2110 showing the processing routines of detail processing in which circuit part is moved to the outside of board. Further, FIG. 26 illustrates change contents in database in the case of moving the circuit part to the outside of board.

First, on step S2111, the mounting terminal A of the mounting terminal information 60, which was built in the circuit part information 32 of the circuit part A, is deleted from the mounting terminal list 58 of the circuit part information 32 of the circuit part A to which instruction of movement was made.

Similarly, on step S2112, the mounting terminal information 64 of a mounting terminal a that was built on the board A is deleted from the mounting terminal list 62 of the board information 46 that the board A, which is the source board of the moved circuit part, has.

At the same time, on step S2114, the mounting connection information 68 of the mounting connection A is deleted from the mounting connection list 66 on database.

As described above, the mounting connection A-A that was built on the circuit part A, the mounting connection A-a that was built on the circuit part A, and the mounting connection information 68 of the mounting connection A that was built between the circuit part A and the board A on the mounting connection list are deleted, and information that mount-state connection does not exist between the circuit part A and the board A is stored on database.

Next, since the circuit part A is arranged on another board B, processing for the arrangement is performed on and after step S2116.

More specifically, on step S2116, based on the operation that the designer moved the circuit part A onto the board B, display is made on the layout design information screen 24b such that the circuit part A is arranged on the board B (refer to FIG. 22(b)).

Then, on step S2118, the mounting terminal information of a mounting terminal A-B is newly built in the mounting terminal list 58 in the circuit part information 32 of the circuit part A.

Further, on step S2120, the mounting terminal list 62 is built in the board information 46 of the board B being the destination of the circuit part A, and a mounting terminal B-d is newly registered as the mounting terminal information 64.

Furthermore, on step S2122, the mounting connection B is newly registered with the mounting connection list 66 as the mounting connection information 68, the mounting terminal list 70 is built in the mounting connection information 68, and the mounting terminal A-B of the circuit part A and the mounting terminal B-d of the board B are registered as the mounting terminal information 72.

More specifically, in the case where a circuit part moved between boards, old information is deleted and new information is built on database as described above. Then, after the processing routines in the case of moving the circuit part outside board as shown in FIG. 25, procedure returns to step S2106 of FIG. 21, and display of connection information (rats) is newly performed.

In the case where there is no circuit part that needs to be moved other than the above-described one, judgment is made on step S2108 to advance to step S2123, and processing of canceling rats display mode is performed.

Subsequently, procedure advances to step S2124, read-out of data for wiring input use is performed, and preparation for performing wiring input is made.

(7) Input of Wiring Connection Information by the User (Processing Routines when Inter-Circuit-Part Wiring is Inputted by the User (FIG. 21))

Processing on and after step S2124 of the flowchart shown in FIG. 21 shows processing routines regarding the input of inter-circuit-part wiring.

More specifically, in the case where an inter-circuit-part wiring input command is inputted by the user, a wiring input mode is set on step S2124. Meanwhile, when the wiring input mode is set, read-out of data for wiring input use being data for input use of inter-circuit-part wiring stored in the storage is performed. Herein, the data for wiring input use specifically shows information such as the shape, the size, the function or the like of wiring, and such data for wiring input use is accumulated inside the storage 16.

Then, on step S2126, wiring figure that the user inputted by the operation of the mouse or the like is displayed on the layout design information screen 24*b*.

Herein, description will be made for the input method of inter-circuit-part wiring by referring to the input method of inter-circuit-part wiring shown in FIG. 27.

In the case of inputting inter-circuit-part wiring that exists in the same board, it is assumed that rats are displayed between terminals of circuit parts based on the connection information inputted in the circuit information first.

Next, when one of terminals on one of two circuit parts connected by rats is clicked and dragged, a straight line is inputted. Click and drag are repeated, a straight line is inputted so as to bent at arbitrary places, a terminal of the other circuit part is clicked to make it be an end point, and the input of inter-circuit-part wiring ends.

As described above, although it is possible to connect between circuit parts that exist in the same board, performing wiring between circuit parts that exist on different boards cannot be done.

Figure 27:
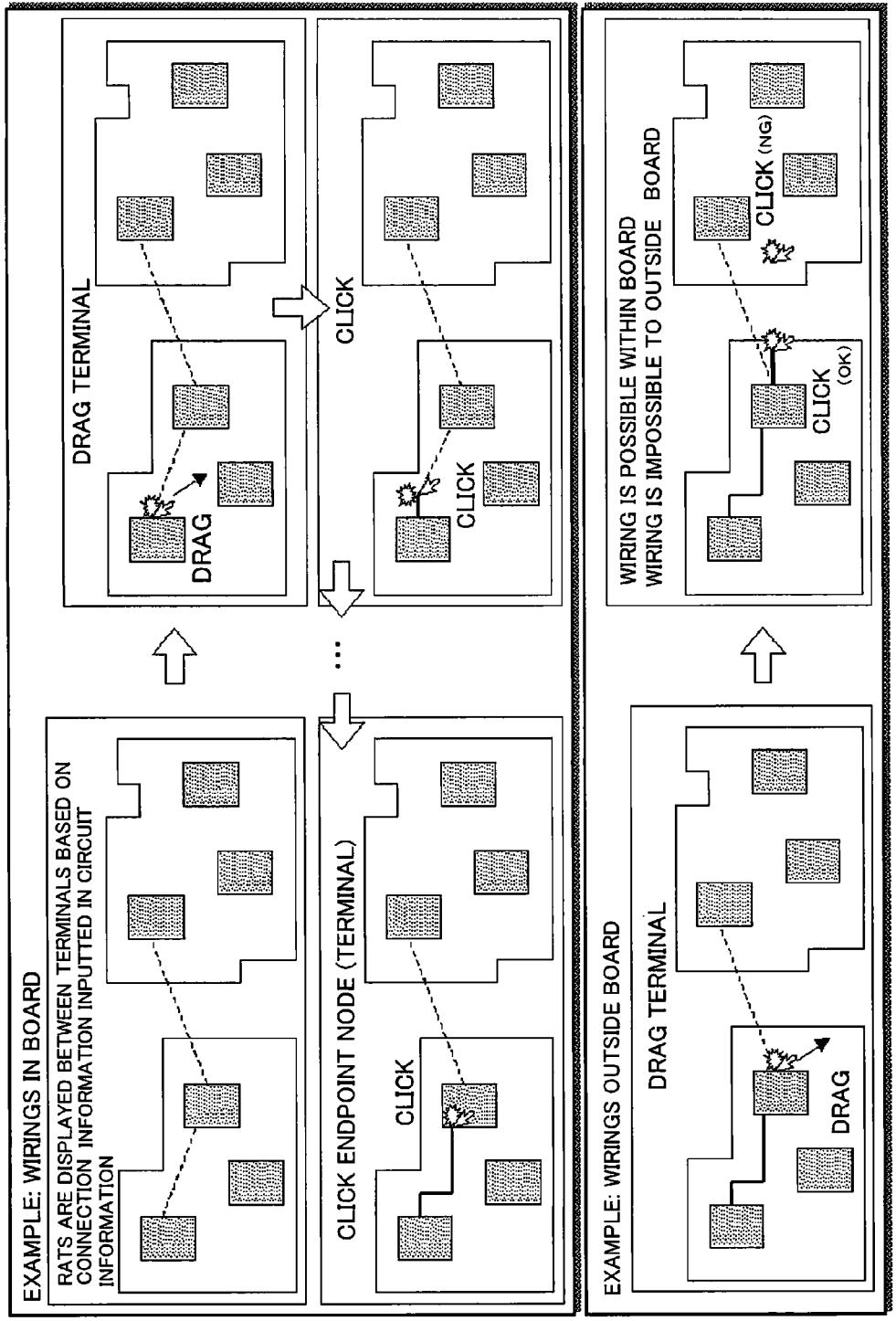
FIG. 27 shows an input method of wiring figures.

As shown in the example of wiring outside board of FIG. 27, when an attempt is made to click a terminal of a circuit part that exists on a board and click a terminal of a circuit part that exists on a different board, setting is made such that wiring is not inputted in clicking on the different board and an operation of the mouse becomes invalid.

The wiring inputted in this manner is displayed as a wiring figure on the layout design information screen 24*b* of FIG. 22(*c*). In FIG. 22(*c*), the line shown in thick solid line on the layout design information screen 24*b* is the wiring inputted on step S2126.

As a display method of such a wiring figure, it is possible to select from the symbolic figure, the two-dimensional actual size figure or the three-dimensional actual size figure, and in this embodiment, it is assumed that the figure is displayed in the two-dimensional actual size figure.

Subsequently, on step S2128, processing to storing the fact that wiring was inputted in database is performed on the screen. More particularly, when a wiring figure is inputted, the information of the wiring figure is accumulated in the circuit part connection information 38 of the circuit part connection A on database. FIG. 28(*a*) shows the data structure of circuit part connection list accumulated on database, FIG. 28(*b*) shows the data structure of the circuit part connection list accumulated on database after the wiring figure was inputted.

Before the wiring figure was inputted, the circuit part connection A was only displayed as a symbolic figure on the circuit design information screen 24*a*, but after the wiring figure was inputted, the circuit part connection A was added as a wiring figure that is displayed as a two-dimensional actual size figure on the layout design information screen 24*b*, so the same information is registered so as to be displayed in different modes on database.

In short, it is possible to allocate the symbolic figure and the two-dimensional actual size figure for one connection information, and when the three-dimensional display necessary, it is also possible to allocate the three-dimensional actual size figure simultaneously.

They are displayed as symbolic figures on a circuit information screen 24*a*, and displayed as two-dimensional actual size figures on the layout design information screen 24*b*, but they are interlocked to each other because they are regarded as one circuit part connection on database, and when a circuit part connection (symbolic figure) on the circuit information screen 24*a* is clicked, for example, a corresponding circuit part connection (two-dimensional actual size figure) on the layout design information screen 24*b* blinks or the like (cross probing), and corresponding connection can be easily visually recognized.

Further, an operation from an opposite direction is also possible, and when a circuit part connection (two-dimensional actual size figure) on the layout design information screen 24*b* is clicked, for example, a corresponding circuit part connection (symbolic figure) on the circuit information screen 24*a* makes reaction such as blinking (refer to FIG. 22(*d*)).

Figure 29:
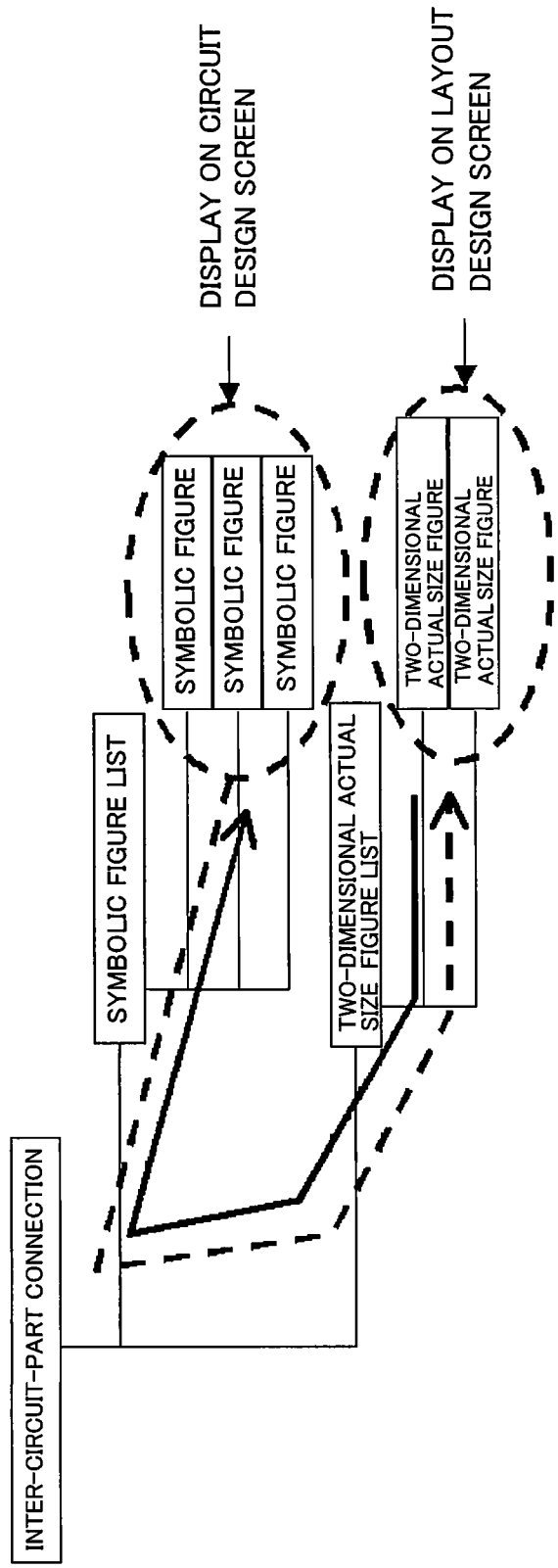
FIG. 29 is a conceptual explanatory view showing relation between display methods of two types of wiring figures built on database.

Database in which a circuit part connection having such relation is built is equipped with a data structure as shown in FIG. 29. Regarding a figure expressing circuit part connection, a plurality of figures exist severally on the circuit design screen and the layout design screen.

Using the data structure shown in FIG. 29 makes it possible to find the other figure from one figure even if figures are expressed in different states such as the symbolic figure and the two-dimensional actual size figure. Further, since not only the inter-circuit-part connection but also all elements such as a circuit part and a board has the data structure shown in FIG. 29, it is possible to realize a similar structure for any part.

Finally on step S2130, judgment processing whether or not there is a wiring input command other than the above-described one is performed, procedure returns to step S1216 and processing is performed in the case of judgment that there was another wiring input command. The wiring input mode is cancelled in the case of judgment that there was no wiring input command, and this processing routine ends.

Next, description will be made for operational effects that occur by performing design by using the processing equipment according to the present invention.

As shown in FIG. 30, according to the conventional method, because there was a need of dividing information of one product into a plurality of database models, it was difficult to edit database crossing between each database model, but in the processing equipment according to the present invention 10, because all part information of enclosure, circuit parts, board and the like are built in one database model, it becomes possible to edit and exchange all part information from one database, and design of a plurality of boards can be simultaneously performed.

Further, as shown in FIG. 31, according to the conventional method, in the case of three types of display methods, database suitable for each expressing method individually existed. Because of different database models, there were items that could be expressed and could not be expressed. For example, information that a circuit part is displayed in the two-dimensional actual size figure cannot be built in a database model for symbolic figure use, so that in the case of building information that the circuit part is displayed in the two-dimensional actual size figure on database, it had to be built in a database model for two-dimensional actual size figure use. Further, because of different database models, it was difficult to utilize the three databases in an integrated manner.

On the other hand, there are three types of expressing method of figure in the processing equipment 10 according to the present invention similarly to the conventional method, and it became possible to achieve commonality of each database model into one and utilize the entire models in an integrated manner.

Further, since it is possible to express figures in the three-dimensional actual size figure, judgment whether or not circuit parts or the like are housed in the enclosure in actual assembly can be performed on a design stage, so that it becomes possible to perform more accurate design.

Furthermore, in the conventional method, in the case of performing design of single board, design was performed by placing circuit parts on a board and design was performed on the assumption that the board and the circuit parts were connected in a mounting manner, but in the case of performing design of a plurality of boards, the circuit parts and the board move in a constantly changing manner, it was difficult to simultaneously design a plurality of boards unless each item expresses that it has mount-state connection.

On the other hand, in the processing equipment 10 according to the present invention, electrical connection is built, mount-state connection is further built, and the equipment can have each information simultaneously, so that it is possible to realize an electric part designing equipment having the characteristic of electric CAD capable of expressing electrical connection and the characteristic of mechanical CAD capable of expressing mount-state connection.

Furthermore, in the processing described above, it is possible to store an area of circuit parts on database as circuit part information and to store an area necessary for circuit part connection as circuit part connection information, and furthermore, a necessary board area can be automatically calculated and stored on database based on an occupancy area calculated from the area of circuit parts and the area of circuit part connection information.

Figure 34:
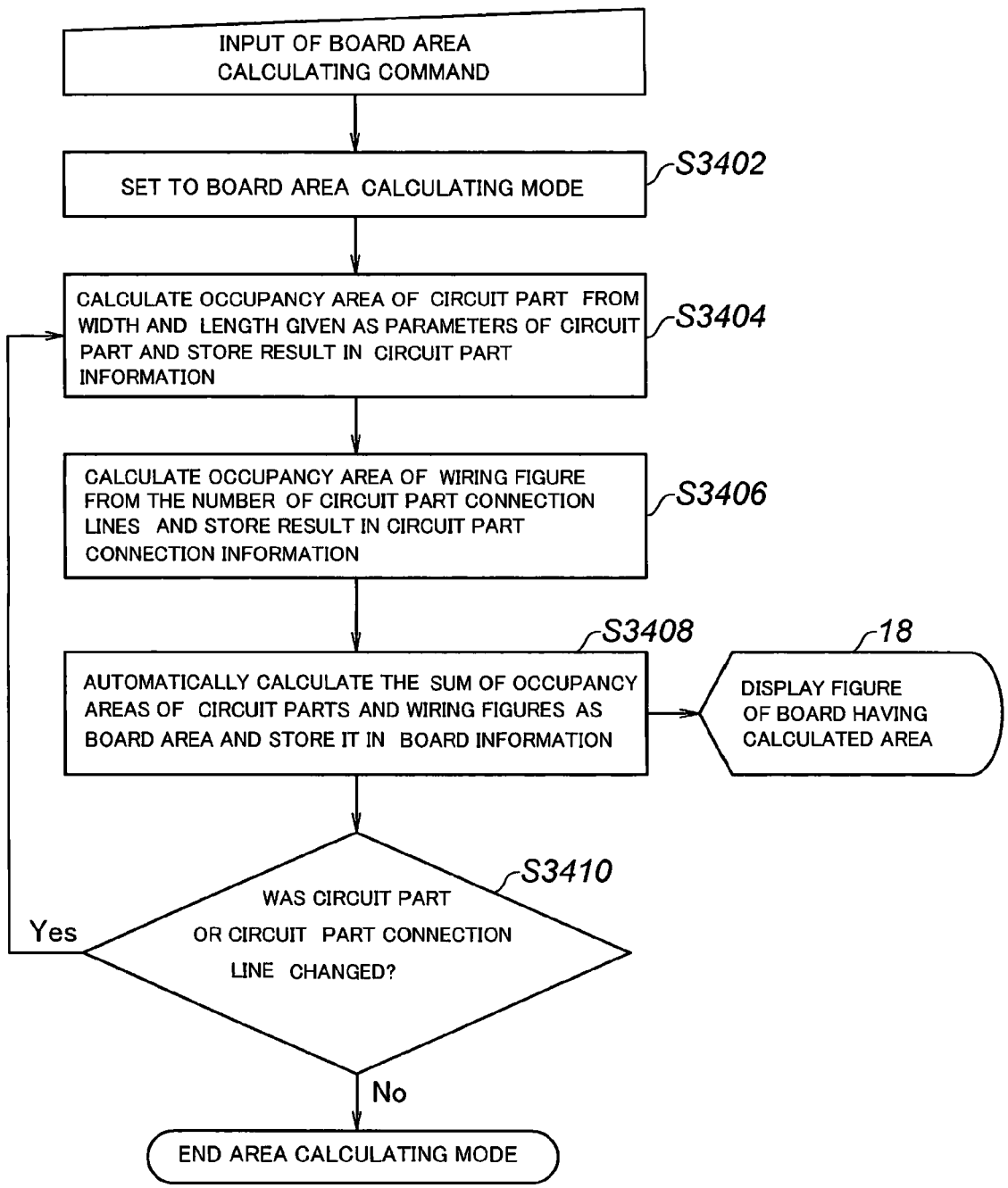
FIG. 34 is a flowchart showing processing routines performed in calculating a board area.

FIG. 34 shows the flowchart of processing routines regarding the calculation method of the occupancy area of parts. When the user inputs a board area calculating command by using the pointing device 20 or the character input device 22, a board area calculating mode in which processing routines regarding the calculation method of the occupancy area of circuit parts are executed is set on step S3402.

More specifically, when the processing routines are started by the input of the board area calculating command using the pointing device 20 or the character input device 22, and the board area calculating mode is set, and the user is enabled to input a printed circuit board.

When the board area calculating mode is set, the occupancy area of a circuit part is calculated based on width and length that were given as the parameter of the circuit part. Then, processing of recording the calculated occupancy area of the circuit part in the circuit part information is performed (step S3404).

On the subsequent step S3406, based on the number of circuit part connection lines that exist on the board, processing of calculating the occupancy area of a wiring figure is performed. At this point, the width of the wiring figure should be decided in proportion to given electric capacitance. Therefore, one obtained by multiplying the width of the wiring figure with the length of circuit part connection line is the area, and the accumulating total of the area is calculated as the occupancy area of the wiring figure. The result at this point is stored in the circuit part connection information.

Next, the sum of the occupancy area of the circuit part and the occupancy area of the wiring figure obtained in the above manner is automatically calculated as the board area, and processing of storing the result in board information is performed (step S3408). At this point, a board figure having the calculated area is displayed on the screen.

Next, on step S3410, judgment whether or not the circuit part or the circuit part connection line was changed is performed. It is to be noted that the change here indicates a change in the size of a circuit part, the connection position of the inter-board connection or the like, addition of a circuit part and an inter-board connection, and deletion of a circuit part and an inter-board connection.

Herein, in the case where the user performed an operation of changing the circuit parts or the circuit part connection after the board area calculation, processing advances from step S3410 to step S3404, the processing of step S3404, step S3406 and step S3408 are sequentially performed, and a board figure having an area calculated by re-calculation is displayed on the screen again.

Further, in the case where a change was not particularly performed, a result calculated on the processing up to step S3408 is regarded as the final occupancy area, and the area calculation mode is ended.

Meanwhile, in the above-described area calculation, the occupancy area can be calculated by including addition of areas such as clearance, land, resist, via and through hole, and division of the occupancy area of the wiring figure taking the number of wiring layers in consideration (divide into two in the case of two wiring layers) or the like.

By performing such calculation of the occupancy area of parts, design of electronic equipment can be performed more easily.

As described above, the present invention can simultaneously perform design of a plurality of printed circuit boards by previously storing design information relating to the circuit and the layout of a plurality of printed circuit boards on the same database and by performing design while exchanging design information relating to the circuit and the layout of the plurality of printed circuit boards, which are stored on database, between the circuit and layout of the plurality of printed circuit boards.

According to the present invention, the plurality of printed circuit boards can be simultaneously designed, and work efficiency can be improved.

Further, according to the invention, since printed circuit board can be designed while a state closer to a product is imaged, accuracy of the constitution of mounting objects increases, rework in detail design is eliminated, and it becomes possible to shorten lead time in overall product design.

More specifically, the processing method according to the present invention is the processing method of electric information in a CAD system, in which design information relating to the circuit and the layout regarding a plurality of printed circuit boards is stored on the same database, design is performed while the design information relating to the circuit and the layout of the plurality of printed circuit boards, which are stored on the above-described database, is exchanged between the circuit and layout of the above-described plurality of printed circuit boards, and design of the above-described plurality of printed circuit boards is simultaneously performed.

Further, the processing method according to the present invention is the processing method of electric information in a CAD system, in which regarding the circuit and the layout of a plurality of printed circuit boards, the first list in which mounting connection state information showing the state of mounting connection of circuit parts that constitute the circuit onto a printed circuit board is stored, the second list in which mounting connection state information showing the state of mounting connection of the printed circuit board with the circuit parts is stored, and amounting connection list in which mounting connection information relating to mounting connection between the circuit parts and the printed circuit board is stored are built on the same database, mounting connection state information of the state of mounting connection, which was used for mounting a circuit part that was instructed to move to the printed circuit board of movement source is deleted, from the above-described first list of the above-described circuit part that was instructed to move, mounting connection state information of the state of mounting connection, which is used for mounting the above-described circuit part that was instructed to move, is deleted from the second list of the above-described printed circuit board of movement source of the above-described circuit part that was instructed to move, the mounting connection information of mounting connection between the above-described circuit part that was instructed to move and the above-described printed circuit board of movement source is deleted from the mounting connection list, and the state of mounting connection relating to the above-described circuit part that was instructed to move is reflected on the state of mounting connection of the above-described plurality of printed circuit boards.

Further, the processing method according to the present invention is the processing method of electric information in a CAD system, in which regarding the circuit and the layout of a plurality of printed circuit boards, the first list in which mounting connection state information showing the state of mounting connection of circuit parts that constitute the circuit onto a printed circuit board is stored, the second list in which mounting connection state information showing the state of mounting connection of the printed circuit board with the circuit parts is stored, and amounting connection list in which mounting connection information relating to mounting connection between the circuit parts and the printed circuit board is stored are built on the same database, mounting connection state information of the state of mounting connection, which was used for mounting a circuit part that was instructed to move to the printed circuit board of movement source is deleted, from the above-described first list of the above-described circuit part that was instructed to move, mounting connection state information of the state of mounting connection, which is used for mounting the above-described circuit part that was instructed to move, is deleted from the second list of the above-described printed circuit board of movement source of the above-described circuit part that was instructed to move, the mounting connection information of mounting connection between the above-described circuit part that was instructed to move and the above-described printed circuit board of movement source is deleted from the mounting connection list, mounting connection state information of the state of mounting connection, which is used for mounting the above-described circuit part that was instructed to move onto the printed circuit board of a destination, is added to the first list of the above-described circuit part that was instructed to move, mounting connection state information of the state of mounting connection, which is used for mounting the above-described circuit part that was instructed to move, is added to the second list of the printed circuit board of the above-described destination of the above-described circuit part that was instructed to move, mounting connection information of mounting connection between the above-described circuit part that was instructed to move and the printed circuit board of the above-described destination is added to the mounting connection list, and the state of mounting connection relating to the above-described circuit part that was instructed to move is reflected on the state of mounting connection of the above-described plurality of printed circuit boards.

Further, the processing method according to the present invention further has display means for displaying circuit and layouts relating to the above-described plurality of printed circuit boards, in which changes in the first list of the above-described circuit part that was instructed to move, the second list of the printed circuit board of the above-described destination and the above-described mounting connection list are reflected on the above-described display means.

Further, the processing method according to the present invention further has: the first step in which the occupancy area of the circuit part is calculated from values of width and length that the above-described circuit part has and the occupancy area of the above-described circuit part is stored on the above-described database; the second step in which the occupancy area of the wiring figure is calculated from the number of the above-described circuit part connection and the above-described occupancy area of the wiring figure is stored on the above-described database; the third step in which the area of the above-described printed circuit board is calculated based on the occupancy area of the above-described circuit part and the occupancy area of the above-described wiring figure and the area of the above-described printed circuit board is stored on the above-described database; and the fourth step in which the layout of a printed circuit board having the area of the above-described printed circuit board, which was calculated on the above-described third step, is displayed on the above-described display means.

Further, the processing method according to the present invention further deletes the area of the above-described printed circuit board having the above-described circuit part or the above-described circuit part connection, which was instructed to change, from the above-described database, and the re-calculated area of the printed circuit board is stored on the above-described database as a new area of the printed circuit board.

Further, the processing equipment according to the present invention is the processing equipment of electric information in a CAD system, which has: database in which design information relating to the circuit and the layout of a plurality of printed circuit boards is stored; and designing means for designing design information relating to the circuit and the layout of the above-described plurality of printed circuit boards, which is stored on the above-described database, while exchanging the information between the circuit and the layout of the above-described plurality of printed circuit boards, and design of the above-described plurality of printed circuit boards is simultaneously performed.

Further, the processing equipment according to the present invention is the processing equipment of electric information in a CAD system, which has: regarding the circuit and the layout of a plurality of printed circuit boards, database that stores the first mounting terminal list in which mounting terminal information showing the mounting terminals of circuit parts that constitute the circuit onto a printed circuit board is stored, the second mounting terminal list in which mounting terminal information showing the mounting terminals of the printed circuit board with the circuit parts is stored, and a mounting connection list in which mounting connection information relating to mounting connection between the circuit parts and the printed circuit board is stored; first deleting means for deleting the mounting terminal information of mounting terminals, which was used for mounting the circuit part that was instructed to move to the printed circuit board of movement source, from the first mounting terminal list of the above-described circuit part that was instructed to move; second deleting means for deleting the mounting terminal information of mounting terminals, which was used for mounting the above-described circuit part that was instructed to move from the second mounting terminal list of the above-described printed circuit board of movement source of the above-described circuit part that was instructed to move; and third deleting means for deleting the mounting connection information of mounting connection between the above-described circuit part that was instructed to move and the above-described printed circuit board of movement source from the mounting connection list, and the state of mounting connection relating to the above-described circuit part that was instructed to move is reflected on the state of mounting connection of the above-described plurality of printed circuit boards.

Further, the processing equipment according to the present invention is the processing equipment of electric information in a CAD system, which has: regarding the circuit and the layout of a plurality of printed circuit boards, database that stores the first mounting terminal list in which mounting terminal information showing the mounting terminals of circuit parts that constitute the circuit onto a printed circuit board is stored, the second mounting terminal list in which mounting terminal information showing the mounting terminals of the printed circuit board with the circuit parts is stored, and a mounting connection list in which mounting connection information relating to mounting connection between the circuit parts and the printed circuit board is stored; first deleting means for deleting the mounting terminal information of mounting terminals, which was used for mounting the circuit part that was instructed to move to the printed circuit board of movement source, from the first mounting terminal list of the above-described circuit part that was instructed to move; second deleting means for deleting the mounting terminal information of mounting terminals, which was used for mounting the above-described circuit part that was instructed to move from the second mounting terminal list of the above-described printed circuit board of movement source of the above-described circuit part that was instructed to move; and third deleting means for deleting the mounting connection information of mounting connection between the above-described circuit part that was instructed to move and the above-described printed circuit board of movement source from the mounting connection list; first adding means for adding the mounting terminal information of mounting terminals, which is used for mounting the above-described circuit part that was instructed to move onto the printed circuit board of a destination, to the first mounting terminal list of the above-described circuit part that was instructed to move; the second adding means for adding the mounting terminal information of mounting terminals, which is used for mounting the above-described circuit part that was instructed to move to the second mounting terminal list of the printed circuit board of the above-described destination of the above-described circuit part that was instructed to move; third adding means for adding the mounting connection information of mounting connection between the above-described circuit part that was instructed to move and the printed circuit board of the above-described destination to the mounting connection list, and the state of mounting connection relating to the above-described circuit part that was instructed to move is reflected on the state of mounting connection of the above-described plurality of printed circuit boards.

Further, the processing equipment according to the present invention further has: display means for displaying circuit and layouts relating to the above-described plurality of printed circuit boards, and display controlling means for reflecting changes in the above-described first mounting terminal list, the above-described second mounting terminal list and the above-described mounting connection list on the above-described display means.

Further, the processing equipment according to the present invention is the processing equipment of electric information in a CAD system, which has: database storing design information relating to the circuit and the layout of a plurality of printed circuit boards therein; display means capable of displaying a plurality of printed circuit boards based on the design information stored in the above-described database; input means for inputting connecting line that electrically connects between arbitrary printed circuit boards that are displayed by the above-described display means; display controlling means for displaying the connecting line inputted by the above-described input means on the above-described means; and register means for saving the electrical connection state of the arbitrary printed circuit boards that were connected by the connecting line on the above-described database as design information based on the input of connecting line by the above-described input means.

Further, the processing equipment according to the present invention is the processing equipment of electric information in a CAD system, which has: database storing design information relating to the circuit and the layout of a plurality of printed circuit boards therein; display means having the first display region capable of displaying one or more circuit parts based on the design information stored in the above-described database and the second display region capable of displaying one or more printed circuit boards based on the design information stored in the above-described database; arranging means for designating an arbitrary circuit part displayed in the above-described first display region of the above-described display means and arranging the designated circuit part on a position specified on an arbitrary printed circuit board that is displayed in the above-described second display region of the above-described display means; display controlling means for displaying the circuit part arranged by the above-described arranging means on the arbitrary printed circuit board that is displayed in the above-described second display region of the above-described display means on which the circuit part is arranged; and register means for saving the arrangement state of the circuit part on the printed circuit board on the above-described database as design information based on the arrangement of the circuit part on the printed circuit board by the above-described arranging means.

In other words, it can be concluded that this embodiment shows the processing method executed by the display unit displaying the theoretical information that constitutes circuit relating to the printed circuit board and physical information that constitutes layout relating to the printed circuit board, and the processing equipment having the control means for controlling display on the above-described display unit, in which the above-described control means executes the first displaying step of displaying theoretical information that constitutes circuits relating to a plurality of printed circuit boards; the second displaying step of displaying physical information that constitutes layouts relating to the above-described plurality of printed circuit boards; an arranging operation detecting step of performing detection of an arranging operation of the above-described theoretical information to predetermined board display information out of a plurality of board display information being the physical information according to the above-described plurality of printed circuit boards; and a display controlling step of performing control of displaying physical information corresponding to the above-described theoretical information on the above-described predetermined board display information when the detection of an arranging operation is performed by the above-described arranging operation detecting step.

It is to be noted that the above-described embodiments can be modified as shown in (1) to (4) below.

(1) In the above-described embodiments, as shown in FIG. 32(a), circuit parts, boards and interconnects were used as element blocks that constitute an electronics product, circuit part terminals and board terminals were used as electric terminals having electrical interface, inter-circuit-part connection and the inter-board connection were used as electric connection information having electrical association, mounting terminal (between circuit part and board) was used as mounting terminals having physical interface, and mounting connection (between circuit part and board) were used as mounting connection information having physical association, but it goes without saying that the invention is not limited to this. As shown in FIG. 32(b), as items to be used for designing a semiconductor system, it is also possible to use semiconductor chips, package boards and buses for element blocks, use semiconductor chip terminals and package board terminals as electric terminals, use inter-semiconductor-chip connection and inter-package-board connection as electric connection information, use mounting terminals (between chip and package board) as mounting terminals, and use mounting connection (between chip and package board) is used as mounting connection information. Further, as shown in FIG. 32(c), as items to be used for designing an automobile, a board/module parts, enclosure parts and an outer/interconnects can be used as element blocks, use board/module part terminals can be used as electric terminals, inter-board/module-part connection can be used as electric connection information, enclosure part terminals and mounting terminals (between board/module part and enclosure part) can be used as mounting terminals, and inter-enclosure-part connection and mounting connection (between board/module part and enclosure part) can be used as mounting connection information.

Then, it is also possible to use items showing these examples in combination, and a more complicated structure can be expressed.

(2) In the above-described embodiments, as mounting connection state information showing the state of mounting connection that connects the board with the circuit part in a mounting manner, a method in which mounting terminals are severally built on the board and on the circuit parts and the both are connected in a mounting manner via the mounting terminals was used, but it goes without saying that the invention is not limited to this. As long as the board and the circuit parts can make mounting connection, mounting connection state information that expresses the state of mounting connection between the board and the circuit parts may be built by using another means. In the following, description will be made for another example of the mounting connection state information showing the state of mounting connection between the board and the circuit parts.

First, an example of the mounting connection state information in which circuit part information is built in the board information on database is given. In the case of connecting three circuit parts on one board in a mounting manner as in FIG. 33(a), three pieces of circuit part information are allowed to belong to board information as a circuit part list (refer to FIG. 33(b)). In this case, the three circuit parts severally belong to layer under a board list, and it expresses that the board owns the three circuit parts and they are connected in a mounting manner.

Next, there is an example of mounting connection state information expressing that surface that the board has and surface of circuit parts are bound on database and the both are connected in a mounting manner (refer to FIG. 33(c)). In this case, it is assumed that the boards are expressed by surface (figure) on the layout design information screen 24b, and circuit parts are expressed by surface (figure) on the circuit design information screen 24a. In the case where there are such surface (figure) in the board information and surface (figure) in the circuit part information, surfaces that each item has are allowed to have binding relation. More specifically, it is considered that the surface being the board is bound to the surface of one circuit part. It is to be noted that the binding is information that two figures must always include or cross each other. More particularly, the state where two figure must always include each other is the state where the other surface (figure) makes mounting connection onto one surface (figure) in a completely housed manner, for example, and the state where two figure must always cross each other shows the state where a part of one surface (figure) and a part of the other surface (figure) make mounting connection so as to overlap with each other, for example. In the state shown in FIG. 33(c), the surface being the board is bound to the surfaces being three circuit parts, so that the three circuit parts are included by or cross the board, and connected in a mounting manner.

In this embodiment, an example of the mounting connection state information expressing that the board has a mounting terminal capable of mounting connection, the circuit part also has a mounting terminal similarly, the mounting terminal on the board and the mounting terminals on the circuit part make a pair and are connected in a mounting manner was used (refer to FIG. 33 (d)). Herein, the pair is information expressing that two mounting terminals are one set, and in the case where mounting terminals built on the board and mounting terminals built on the circuit part make a pair as shown in FIG. 33 (d), and it is understood that the board and the circuit part are connected in a mounting manner via the mounting terminals. More specifically, in this embodiment description was made above that mounting connection terminal is built for each items in the case where the circuit part and the board made mounting connection. The case where the circuit part A and the board A make mounting connection is taken as an example, in which the mounting terminal list 58 is built in the circuit part information 32 of the circuit part list 30 on database regarding the circuit part A, and the mounting terminal list 62 is built in the board information 46 of the board list 44 on database regarding the board A. At this point, mounting connection information is accumulated in the mounting connection list 66 on database.

Thus, the mounting terminal of the circuit part A is stored in the mounting terminal list 58 as the mounting terminal A-A, the mounting terminal of the board A is stored in the mounting terminal list 62 as the mounting terminal A-a.

Along with this, in the mounting terminal list 70 stored in the mounting connection information 68 of the mounting connection A, the information of the mounting terminal A-A of the circuit part A and the information of the mounting terminal A-a of the board A are stored in a pair as mounting connection terminals involved in the mounting connection A.

As described, the very fact that two mounting terminals are stored in a pair in the mounting terminal list expresses that they are one set, and with such processing, information that circuit parts that exist in plural numbers should be arranged onto which board is stored.

Therefore, in this embodiment, because the information of the mounting terminal of the circuit part A and the information of the mounting terminal of board A are stored in the same mounting terminal list, the two mounting terminals are stored in one set, that is, a pair.

(3) In the above-described embodiments, the two-dimensional actual size figure was used as a figure displayed on the layout design information screen 24b, but it goes out without saying that the invention is not limited to this, and the three-dimensional actual size figure may be used. By using the three-dimensional actual size figure, it becomes possible to perform design while including enclosure parts. In short, since circuit parts, boards, cables and the like can be handled in a sterically captured structure, a status where parts are actually assembled can be easily grasped, and it becomes possible to obtain information, which could not be obtained from the two-dimensional actual size figure, from the three-dimensional actual size figure.

(4) In the above-described embodiments, board input was performed after the circuit part input was performed, it goes without saying that the invention is not limited to this, and it is also possible to perform the circuit part input after the input of board was performed.

(5) The above-described embodiment and the modified examples shown in (1) to (4) may be appropriately combined.

INDUSTRIAL APPLICABILITY

The present invention can be utilized in performing design of various products equipped with electrical connection relation.

The invention claimed is:

1. A processing method of electric information in a CAD system, comprising:
a first displaying step of displaying the symbolic figure of a circuit part that a user selected as circuit part information being theoretical information that constitutes circuits relating to a plurality of printed circuit boards on a first window on a display screen, out of circuit part information stored in a circuit part library;
a second displaying step of displaying circuit part connection lines connecting between the circuit parts inputted by the user on the first window;
a third displaying step of displaying figures that express a plurality of board shapes inputted by the user as board shape information being physical information that constitutes layouts relating to the plurality of printed circuit boards side by side on a second window on the display screen;
a display controlling step of, when an arranging operation of the symbolic figure of the circuit part displayed on the first window onto a figure that expresses the board shape displayed on the second window by drag-and-drop, performing control of displaying a two-dimensional actual size figure or a three-dimensional actual size figure being physical information for each of the circuit parts and wiring figures expressing the circuit board connection lines on the figure that expresses the board shape;
a first accumulating step of, when the symbolic figure of the circuit part is displayed on the first window, accumulating information about the circuit parts and the circuit part connection lines displayed on the first window in database as the first list;
a second accumulating step of, when the two-dimensional actual size figure or the three-dimensional actual size figure expressing the substrate shape is displayed on the second window, accumulating information about the substrate displayed on the second window as the two-dimensional actual size figure or the three-dimensional actual size figure in the database as the second list;
a third accumulating step of calculating the occupied area of the circuit part arranged on the figure expressing the substrate shape, which is displayed on the second window, and accumulating the occupied area in the database;
a fourth accumulating step of calculating the occupied area of wiring figures expressing the circuit part connection lines and accumulating the occupied area of the wiring figures in the database;
a fifth accumulating step of calculating the sum of the occupied area of the circuit part and the occupied area of the wiring figures as a substrate area, and accumulating the sum in the database; and
a changing step of changing the size of the figure expressing the substrate shape based on the substrate area.

2. The processing method of electric information in a CAD system according to claim 1, the method comprising:
a deleting operation detecting step of performing detection of an operation of deleting a part or all of the physical information displayed on the second window, wherein
when a deleting operation is detected in the deleting operation detecting step, a change of information relating to physical information to which the deleting operation was performed is allowed to reflect on the first list and the second list.

3. The processing method of electric information in a CAD system according to claim 1, the method comprising:
a re-arranging operation detecting step of performing detection of an operation to re-arrange the circuit part, which is arranged on the figure that expresses the first board shape displayed on the second window, on a figure that expresses the second board shape different from the figure that expresses the first board shape, wherein a change of information relating to physical information that was re-arranged in the re-arranging operation detecting step is allowed to reflect on the first list and the second list.

4. A processing equipment of electric information in a CAD system, comprising:

first displaying means for displaying the symbolic figure of a circuit part that a user selected as circuit part information being theoretical information that constitutes circuits relating to a plurality of printed circuit boards, on a first window on a display screen, out of circuit part information stored in a circuit part library;

second displaying means for displaying circuit part connection lines connecting between the circuit parts inputted by the user on the first window;

third displaying means for displaying a plurality of board shapes inputted by the user as board shape information being physical information that constitutes layouts relating to the plurality of printed circuit boards side by side, on a second window on the display screen;

display controlling means for, when an arranging operation of the symbolic figure of the circuit part displayed on the first window on a figure that expresses the board shape displayed on the second window by drag-and-drop, performing control of displaying a two-dimensional actual size figure or a three-dimensional actual size figure being physical information for each of the circuit parts and the circuit part connection lines on the figure that expresses the board shape;

first accumulating means for, when the symbolic figure of the circuit part is displayed on the first window, accumulating information of the circuit parts and the circuit part connection lines, displayed on the first window in database as the first list; and second accumulating means for, when the two-dimensional actual size figure or the three-dimensional actual size figure expressing the substrate shape is displayed on the second window, accumulating information about the substrate displayed on the second window as the two-dimensional actual size figure or the three-dimensional actual size figure in the database as the second list;

third accumulating means for calculating the occupied area of the circuit part arranged on the figure expressing the substrate shape, which is displayed on the second window, and accumulating the occupied area in the database;

fourth accumulating means for calculating the occupied area of wiring figures expressing the circuit part connection lines and accumulating the occupied area of the wiring figures in the database;

fifth accumulating means for calculating the sum of the occupied area of the circuit part and the occupied area of the wiring figures as a substrate area, and accumulating the sum in the database; and changing means for changing the size of the figure expressing the substrate shape based on the substrate area.

5. The processing equipment of electric information in a CAD system according to claim 4, comprising:

deleting operation detecting means for performing detection of an operation of deleting a part or all of the physical information displayed on the second window, wherein when a deleting operation is detected in the deleting operation detecting means, a change of information relating to physical information to which the deleting operation was performed is allowed to reflect on the first list and the second list.

6. The processing equipment of electric information in a CAD system according to claim 1, the equipment comprising:

re-arranging operation detecting means for performing detection of an operation to re-arrange the circuit part, which is arranged on the figure that expresses the first board shape displayed on the second window, on a figure that expresses the second board shape different from the figure that expresses the first board shape, wherein a change of information relating to physical information that was re-arranged in the re-arranging operation detecting means is allowed to reflect on the first list and the second list.

\* \* \* \* \*